United States Patent
Peterson et al.

(10) Patent No.: US 10,226,759 B2
(45) Date of Patent: Mar. 12, 2019

(54) OVERPOTENTIAL AND SELECTIVITY IN THE ELECTROCHEMICAL CONVERSION OF $CO_2$ INTO FUELS

(71) Applicant: BROWN UNIVERSITY, Providence, RI (US)

(72) Inventors: Andrew Peterson, Providence, RI (US); Yin-Jia Zhang, Providence, RI (US); Seok Ki Kim, Providence, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 14/850,752

(22) Filed: Sep. 10, 2015

(65) Prior Publication Data

US 2016/0067689 A1  Mar. 10, 2016

Related U.S. Application Data

(60) Provisional application No. 62/048,664, filed on Sep. 10, 2014.

(51) Int. Cl.
| | |
|---|---|
| *C10G 2/00* | (2006.01) |
| *B01J 27/22* | (2006.01) |
| *B01J 21/18* | (2006.01) |
| *B01J 35/00* | (2006.01) |
| *C01B 32/914* | (2017.01) |
| *C01B 32/921* | (2017.01) |
| *C01B 32/949* | (2017.01) |

(52) U.S. Cl.
CPC ............ *B01J 27/22* (2013.01); *B01J 21/18* (2013.01); *B01J 35/0013* (2013.01); *C01B 32/914* (2017.08); *C01B 32/921* (2017.08); *C01B 32/949* (2017.08); *C10G 2/332* (2013.01); *C10G 2/50* (2013.01); *B01J 35/0033* (2013.01)

(58) Field of Classification Search
CPC .............. B01J 27/22; C07C 1/10; C07C 1/12
See application file for complete search history.

(56) References Cited

U.S. PATENT DOCUMENTS

| | | | |
|---|---|---|---|
| 2012/0065052 A1* | 3/2012 | Ewald ................ | B01J 27/22 502/5 |
| 2012/0245236 A1* | 9/2012 | Suib .................. | B01J 23/34 518/717 |
| 2013/0045865 A1* | 2/2013 | Thompson ........... | B01J 37/08 502/177 |

OTHER PUBLICATIONS

Chai, S-J. et al. Microporous and Mesoporous Materials 2013, 170, pp. 141-149; Available online Dec. 8, 2012.*

* cited by examiner

*Primary Examiner* — Medhanit W Bahta
(74) *Attorney, Agent, or Firm* — Adler Pollock & Sheehan P.C.; Daniel J. Holmander, Esq.

(57) ABSTRACT

The invention provides a catalyst and method for producing hydrocarbons from a carbon dioxide source comprising carbides, in particular one or more metal carbides. The one or more metal carbides are formed with one or more elements selected from the group consisting of molybdenum, titanium, tungsten, iron, and tantalum. In one embodiment, the one or more metal carbides are nanostructures. In another embodiment, the one or more metal carbide nanostructures are supported by a carbon substrate. In a further embodiment, the one or more metal carbides nanostructures is dimolybdenum carbide. In still another embodiment, the carbon substrate is graphene or graphene oxide. In another embodiment, the dimolybdenum carbide nanostructures are supported by the graphene or graphene oxide substrate.

5 Claims, 41 Drawing Sheets

OVERPOTENTIAL AND SELECTIVITY IN THE ELECTROCHEMICAL CONVERSION OF $CO_2$ INTO FUELS

CROSS-REFERENCE TO RELATED APPLICATION

This application claims priority to U.S. Provisional Patent Application No. 62/048,664 filed Sep. 10, 2014, which is incorporated herein by reference.

STATE REGARDING FEDERALLY SPONSORED RESEARCH

This invention was made with government support under N00014-12-1-0851 awarded by Office of Naval Research. The government has certain rights to this invention.

BACKGROUND

The invention relates to catalysts and methods for the conversion of carbon dioxide to valuable products. More particularly, the invention relates to carbide catalysts, in particular metal carbide catalysts, for the production of hydrocarbons from carbon dioxide or carbon monoxide.

According to the United States Environmental Protection Agency carbon dioxide is the primary greenhouse gas emitted by humans, accounting for greater than 80% of all greenhouse gases. Therefore, decreasing the emission of carbon dioxide is a priority to reduce and/or avoid the adverse effects of global climate change. One approach to reducing carbon dioxide emissions is electrochemically converting it to fuels and other valuable products. Electrochemical conversion could also provide a method for making renewable biomass fuels (ethanol and biodiesel) and fossil fuels carbon neutral, reducing fossil fuel demand and carbon dioxide emissions. Another option is to transition to renewable energy sources, such as hydro, wind, geothermal, solar, etc. Unfortunately, renewable sources tend to be intermittent and lack portability requiring large scale energy storage to meet energy demands. Conversion of carbon dioxide to fuels could be used with or as an alternative to the energy storage requirements.

A key technological challenge to industrial application of electrochemical conversion of carbon dioxide to useful fuels and other products is the development of catalysts to make the process cost effective. Efficient catalysts enable electrochemical conversions at low overpotential and reasonable current densities. Due to the low reactivity and high stability of carbon dioxide, identification of efficient catalysts to convert carbon dioxide to hydrocarbons has been challenging. For example, copper, a commonly used catalyst for carbon dioxide reduction to hydrocarbons, requires an overpotential on the order of 1 V.

According to the United States Department of Energy, "[t]he major obstacle preventing the efficient conversion of carbon dioxide into energy-bearing products is lack of catalysts" with satisfactory activity at low overpotentials and high electron conversion (US Dept. of Energy, *Basic Research Needs: Catalysts for Energy*, Report PNNL17712, 2008). Overpotential is related to the loss of energy during the process, so efficient conversion requires low overpotentials. Therefore, it is necessary to find catalytic materials having lower overpotentials to produce hydrocarbons from carbon dioxide more efficiently.

BRIEF SUMMARY OF THE INVENTION

The invention is directed to catalysts and methods that can overcome the high overpotentials that limits the conversion of carbon dioxide to hydrocarbons. The invention provides a catalyst and method for producing hydrocarbons from a carbon dioxide source comprising carbides, in particular one or more metal carbides. The one or more metal carbides are formed with one or more elements selected from the group consisting of molybdenum, titanium, tungsten, iron, and tantalum. In one embodiment, the one or more metal carbides are nanostructures. In another embodiment, the one or more metal carbide nanostructures are supported by a carbon substrate. In a further embodiment, the one or more metal carbides nanostructures is dimolybdenum carbide. In still another embodiment, the carbon substrate is graphene or graphene oxide. In another embodiment, the dimolybdenum carbide nanostructures are supported by the graphene or graphene oxide substrate.

The method for producing hydrocarbons comprises forming one or more metal carbide catalysts and exposing the one or more metal carbide catalyst with one or more sources of carbon dioxide or carbon monoxide. The method includes forming the one or more metal carbides with one or more elements selected from the group consisting of molybdenum, titanium, tungsten, iron, and tantalum. The method may further comprise forming nanostructures of the one or more metal carbide catalysts. The method may also further comprise forming a carbon substrate to support the metal carbide nanostructures. The method may also further comprise forming the metal carbide nanostructures of dimolybdenum carbide. The method may further comprise forming the carbon substrate with graphene or graphene oxide.

BRIEF DESCRIPTION OF THE DRAWINGS

The invention, will be best understood by reference to the following detailed description taken in connection with the accompanying drawings in which.

DETAILED DESCRIPTION OF EMBODIMENTS

Figure 1:
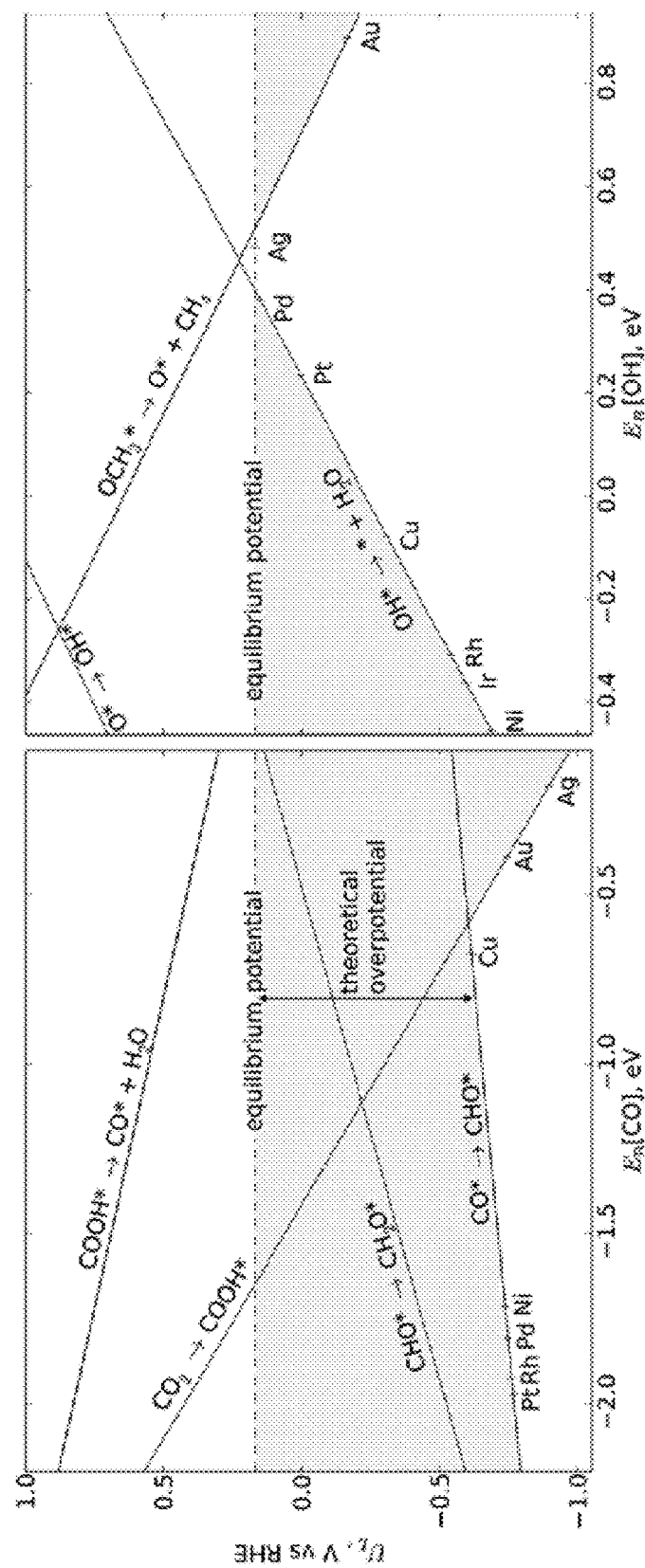
FIG. 1 shows a diagram of the limiting potentials ($U_L$) of each elementary step of the overall $CO_2$ to $CH_4$ reaction. Specifically, $U_L$ is the potential at which each elementary proton-transfer step becomes exergonic. The left and right plots display the absorption energies of carbon-bound species ($E_B[CO]$) and oxygen-bound species $E_B[OH]$, respectively. The equilibrium potential is +0.17 V for the overall electrochemical reduction of $CO_2$ to $CH_4$ versus reversible hydrogen electrode (RHE), displayed with the dashed line. The reactive step with the most negative $U_L$ dictates the overpotential requirement of the entire reaction. The reduction of $CO_2$ to $CH_4$ is primarily dictated by the overpotential of the protonation of CO* to CHO*. Therefore, $CO_2$ conversion to hydrocarbons is limited to CO hydrogenation.
Figure 2:
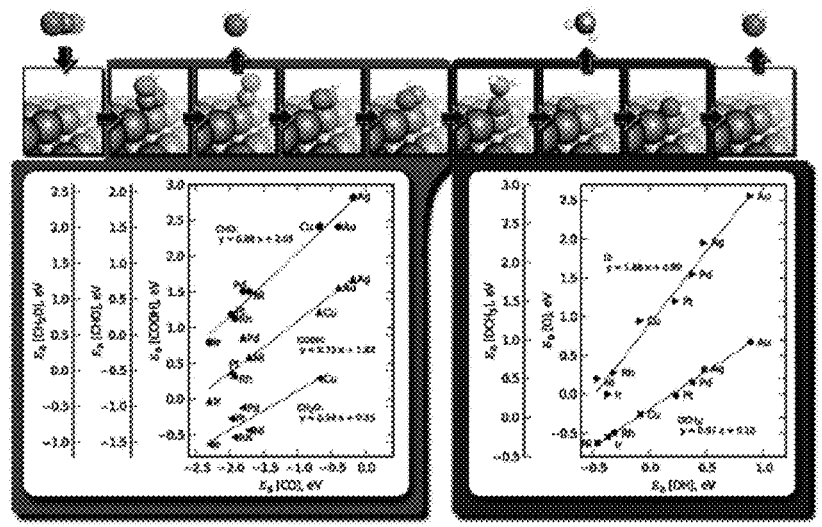
FIG. 2 shows adsorption energy scaling. The proposed pathway from $CO_2$ to $CH_4$ on copper surfaces is shown at the top of the figure, and the calculated adsorption energies of the key bound intermediates on fcc (211) facets are shown in the two lower figures. (More tightly bound adsorbates correspond to more negative binding energies.) The adsorption energies of those adsorbates binding to the surface through carbon can be correlated and are plotted against the binding energy of CO in the left plot. Similarly, the adsorption energies of those adsorbates binding through oxygen can be correlated and are plotted versus the binding energy of OH in the right plot.
Figure 3:
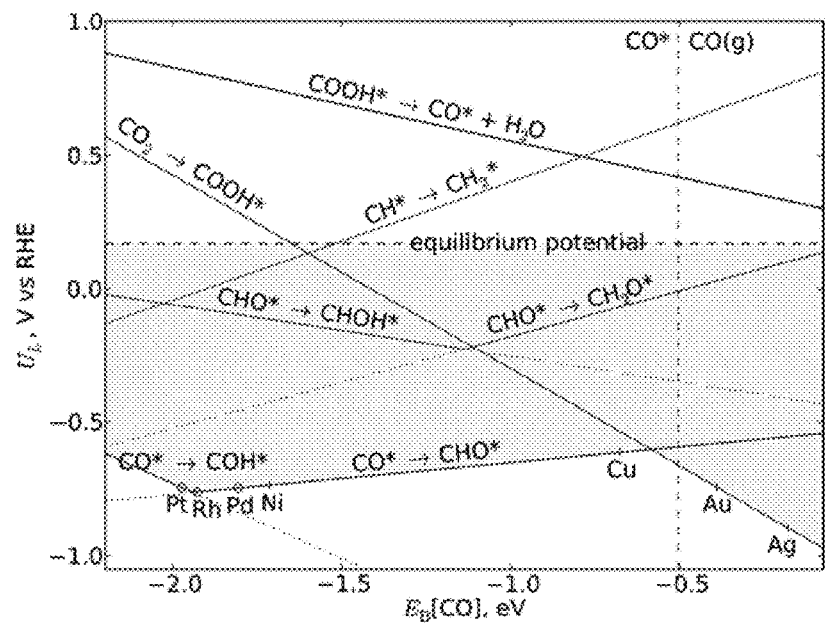
FIG. 3 shows Limiting potentials ($U_L$), allowing for competitive reaction mechanisms. Free-energy neutrality lines are plotted, but multiple pathways are possible. Competitive pathways are shown as lines of the same color, and the more favorable route is shown as a solid line, while the less favorable route is shown dotted. Also shown is the binding energy at which adsorbed CO is in equilibrium with gaseous CO (at a partial pressure of 1%); the CO would be predicted to desorb at binding energies weaker than this line. As in FIG. 2 the $E_B[CO]$ values are shown for each metal. The open circles correspond to surfaces that have an experimental exchange current density in the hydrogen evolution reaction greater than $10^{-4}$ A cm$^{-2}$; in these materials, the hydrogen evolution reaction would be expected to dominate over $CO_2$ reduction.
Figure 68:
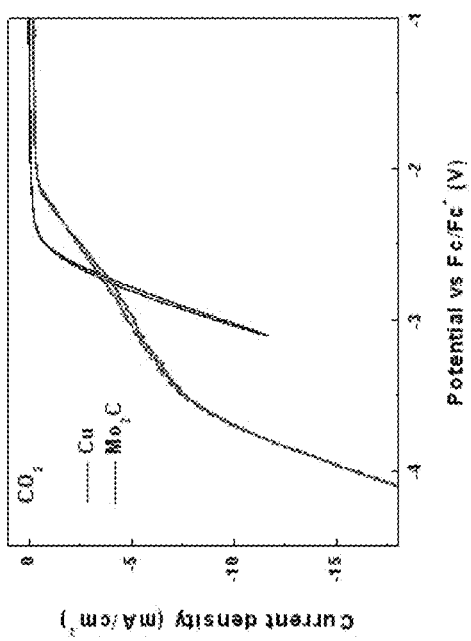
FIG. 68 shows linear sweep voltammograms of Cu and $Mo_2C$ electrodes.

Generally referring to FIGS. 1-68, the invention is directed to catalysts and methods that can overcome the high overpotentials that limits the conversion of carbon dioxide to hydrocarbons. The invention provides a catalyst and method for producing hydrocarbons from a carbon dioxide source comprising carbides, in particular one or more metal carbides. The one or more metal carbides are formed with one or more elements selected from the group consisting of molybdenum, titanium, tungsten, iron, and tantalum. In one embodiment, the one or more metal carbides are nanostructures. In another embodiment, the one or more metal carbide nanostructures are supported by a carbon substrate. In a further embodiment, the one or more metal carbides nanostructures is dimolybdenum carbide. In still another embodiment, the carbon substrate is graphene or graphene oxide. In another embodiment, the dimolybdenum carbide nanostructures are supported by the graphene or graphene oxide substrate.

The method for producing hydrocarbons comprises forming one or more metal carbide catalysts and exposing the one or more metal carbide catalyst with one or more sources of carbon dioxide or carbon monoxide. The method includes forming the one or more metal carbides with one or more elements selected from the group consisting of molybdenum, titanium, tungsten, iron, and tantalum. The method may further comprise forming nanostructures of the one or more metal carbide catalysts. The method may also further comprise forming a carbon substrate to support the metal carbide nanostructures. The method may also further comprise forming the metal carbide nanostructures of dimolybdenum carbide. The method may further comprise forming the carbon substrate with graphene or graphene oxide.

The metal carbides are formed with at least one or more of the following elements: molybdenum (Mo), titanium (Ti), tungsten (W), iron (Fe), and tantalum (Ta). The metal carbides catalysts may include, but are not limited to: $Mo_2C$, TiC, WC, $Fe_3C$, and TaC. The metal carbide catalysts can be in the form of a foil or powder. To further optimize the surface exposure of the catalysts, the one or more metal carbides may be a nanostructure (having one dimension that is less than 1000 nm). The one or more nanostructured metal carbide catalysts may be supported by a carbon substrate, such as graphene or graphene oxide. Dimolybdenum carbide foil, powder (44 μm), and suspended nanostructures has a low overpotential compared to copper for carbon dioxide conversion to hydrocarbons.

In one embodiment, for optimum catalyst surface exposure, $Mo_2C$/Graphene nanocomposites were formed by synthesizing dimolybdenum carbide nanoparticles was on the surface of graphene oxide. First, molybdenyl acetylacetolate ($MoO_2(acac)_2$) and carbon substrates (oxidized graphene oxide or graphite) were dissolved in 2-methyl-1-propanol. Then, $MoO_2$ nanoparticles were deposited on the carbon substrate utilizing the supercritical-alcohol method. Finally, MoO$_2$ nanoparticles were converted to Mo$_2$C nanoparticles by carbothermal hydrogen reduction forming Mo$_2$C/Graphene nanocomposites.

Figure 4:
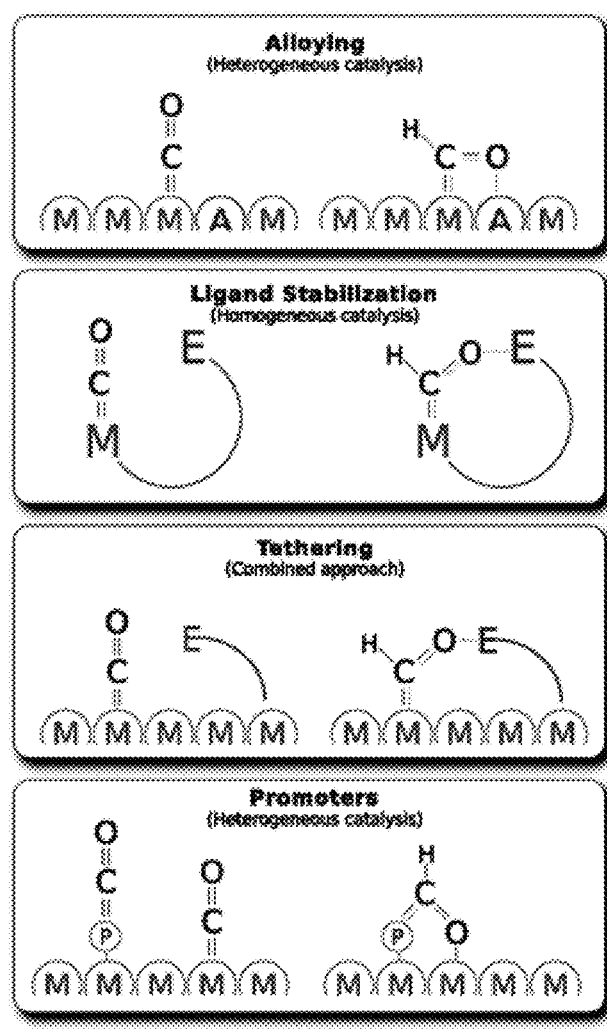
FIG. 4 shows decoupling strategies exploiting the geometric differences between adsorbed CHO and adsorbed CO.
Figure 5:
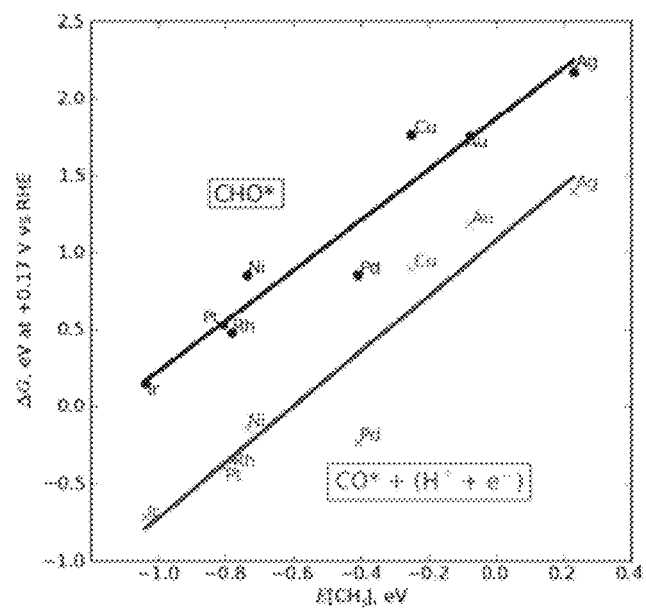
FIG. 5 shows a diagram showing that CO* hydrogenation is more energetically favorable than CHO* across most catalysts (including Ir, Pt, Rh, Ni, Pd, Cu, Au, Ag). The coupling of CO and CHO binding energies limits the production of hydrocarbons from $CO_2$.
Figure 6:
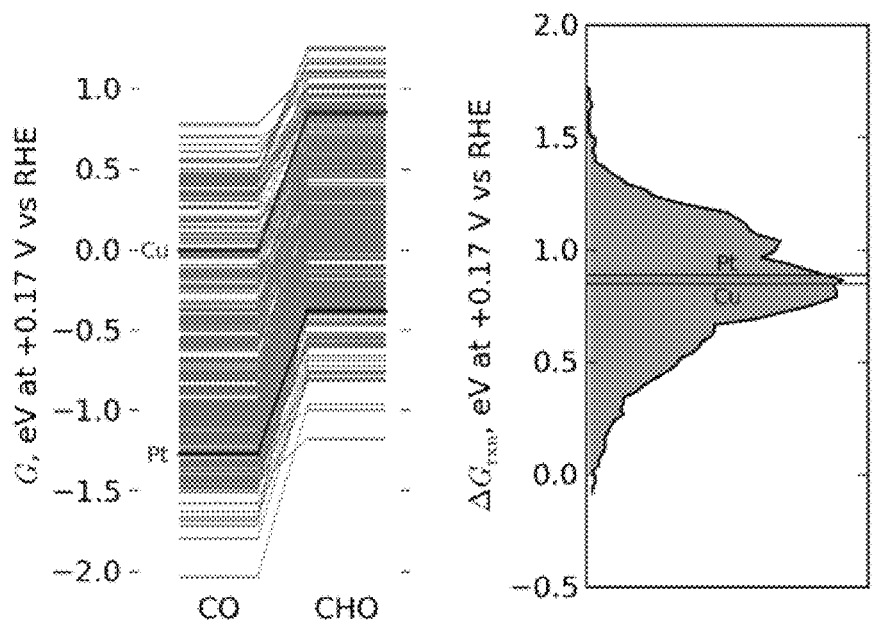
FIG. 6 shows a diagram displaying the large overpotential needed to convert CO to CHO with Cu and Pt catalysts.

Now referring to FIGS. 1-16, the electrochemical conversion of CO$_2$ to hydrocarbons with catalysts, such as Pt, Rh, Pd, Ni, Cu, Au, and Ag, is governed by the elementary protonation reactions described in FIG. 1. Effective catalysts must be capable of efficiently catalyzing the protonation of adsorbed CO to adsorbed CHO or COH and exhibit simultaneous poor activity for the competitive hydrogen evolution reaction (HER). After the formation of CHO or COH, products that are more reduced than CO, such as hydrocarbons and alcohols, will be produced as long as the subsequent products desorb from the electrocatalyst surface. For more efficient electrocatalytic reduction of CO$_2$ to CH$_4$, a catalyst capable of strengthening the binding energy of CHO ($E_B$[CHO]) relative to the binding energy of CO ($E_B$[CO]). The binding energies of CHO and CO are shown in FIG. 5.

Figure 7:
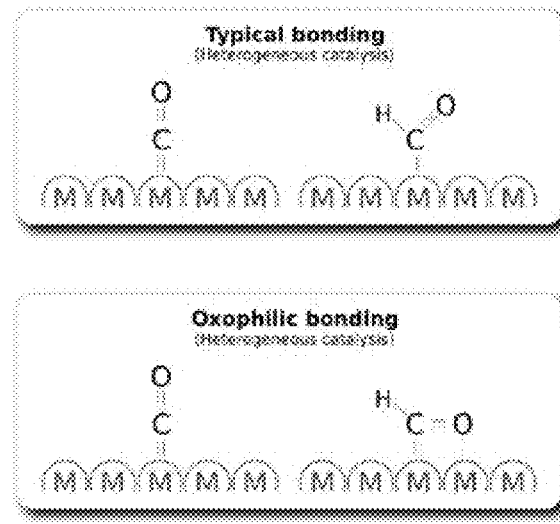
FIG. 7 shows decoupling strategies exploiting the geometric differences between adsorbed CHO and adsorbed CO.

Efficient catalysts for the reduction of CO$_2$ to hydrocarbons will also need to be selective, having poor HER activity in the presence of CO$_2$. Conversion of CO$_2$ to CH$_4$ has a standard potential of +0.17 V versus reversible hydrogen electrode (RHE). Whereas, HER has a standard potential of 0 V versus RHE (at any pH). Therefore, CO$_2$ reduction will be in competition with HER at all negative potentials. Schematics of preferable catalyst surface activity is depicted in FIGS. 4 and 7.

Figure 8:
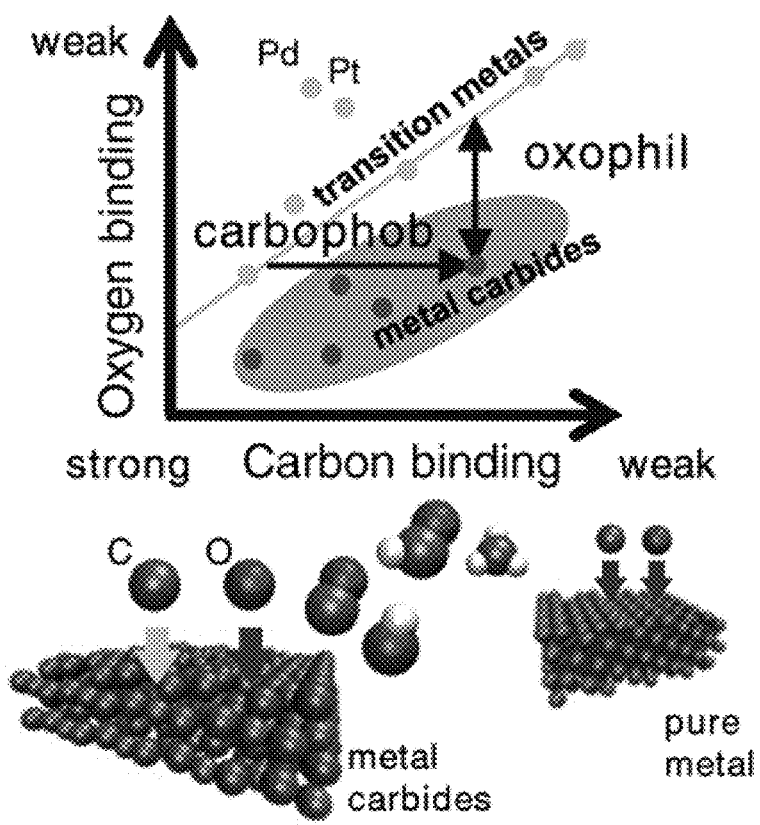
FIG. 8 shows a graph of carbon binding vs. oxygen binding depicting how metal carbides deviate from the scaling relations and the carbophobic/oxophilic properties common to transition metals.
Figure 9:
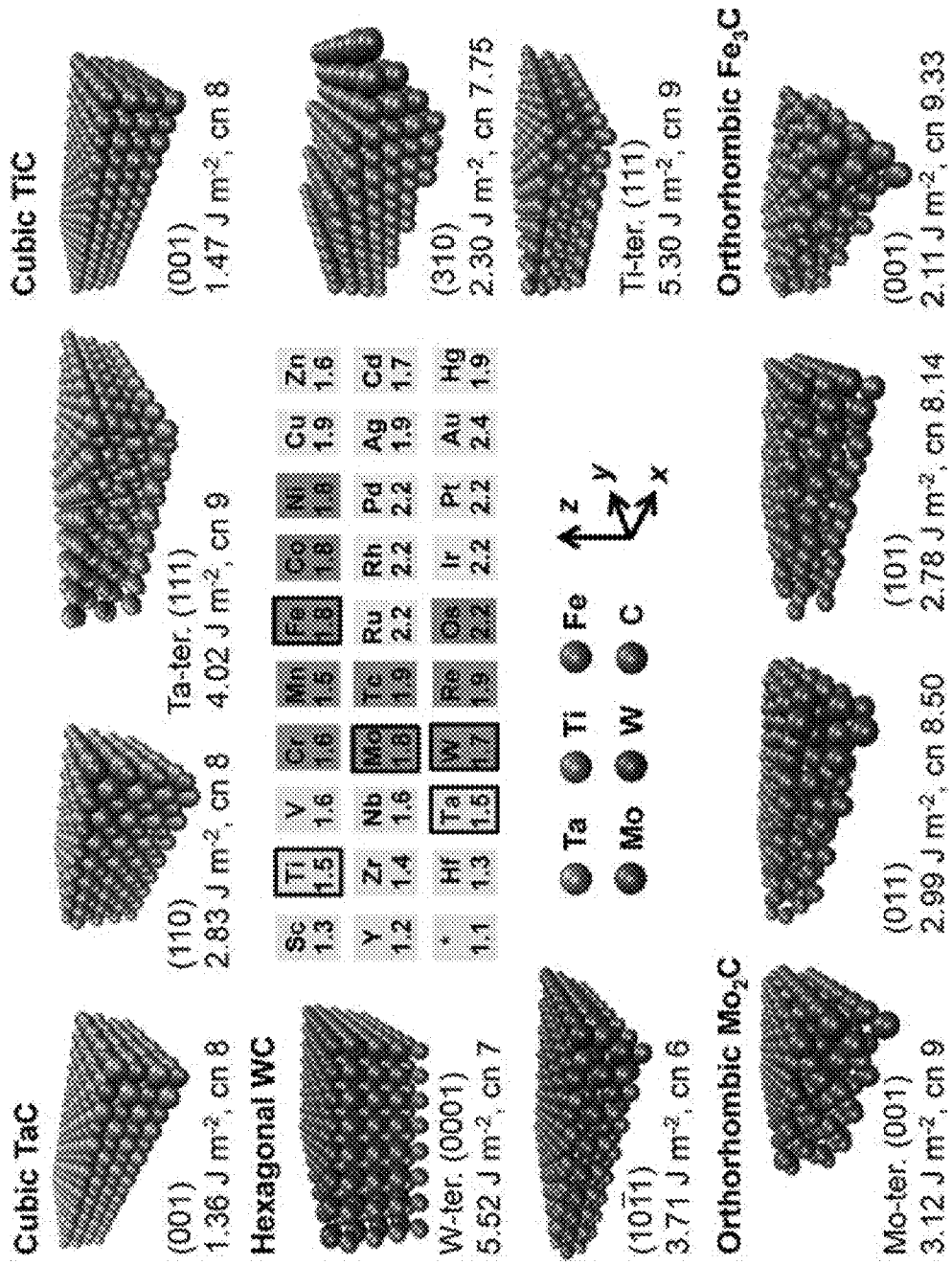
FIG. 9 shows a depiction of the surfaces of transition-metal carbide catalysts.
Figure 10:
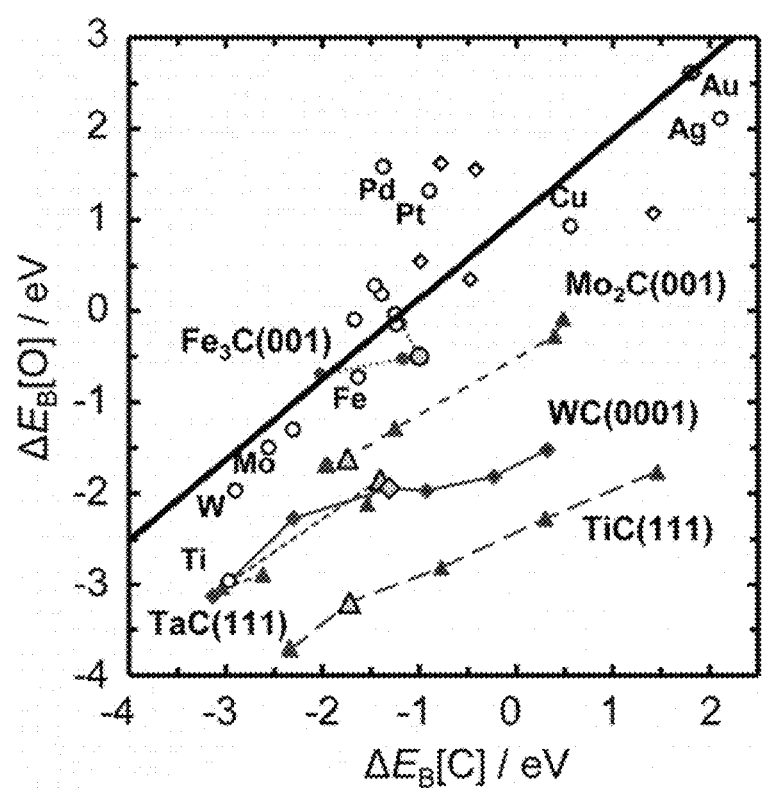
FIG. 10 shows a graph of the binding energies of carbon and oxygen on carbide and transition-metal surfaces.
Figure 11:
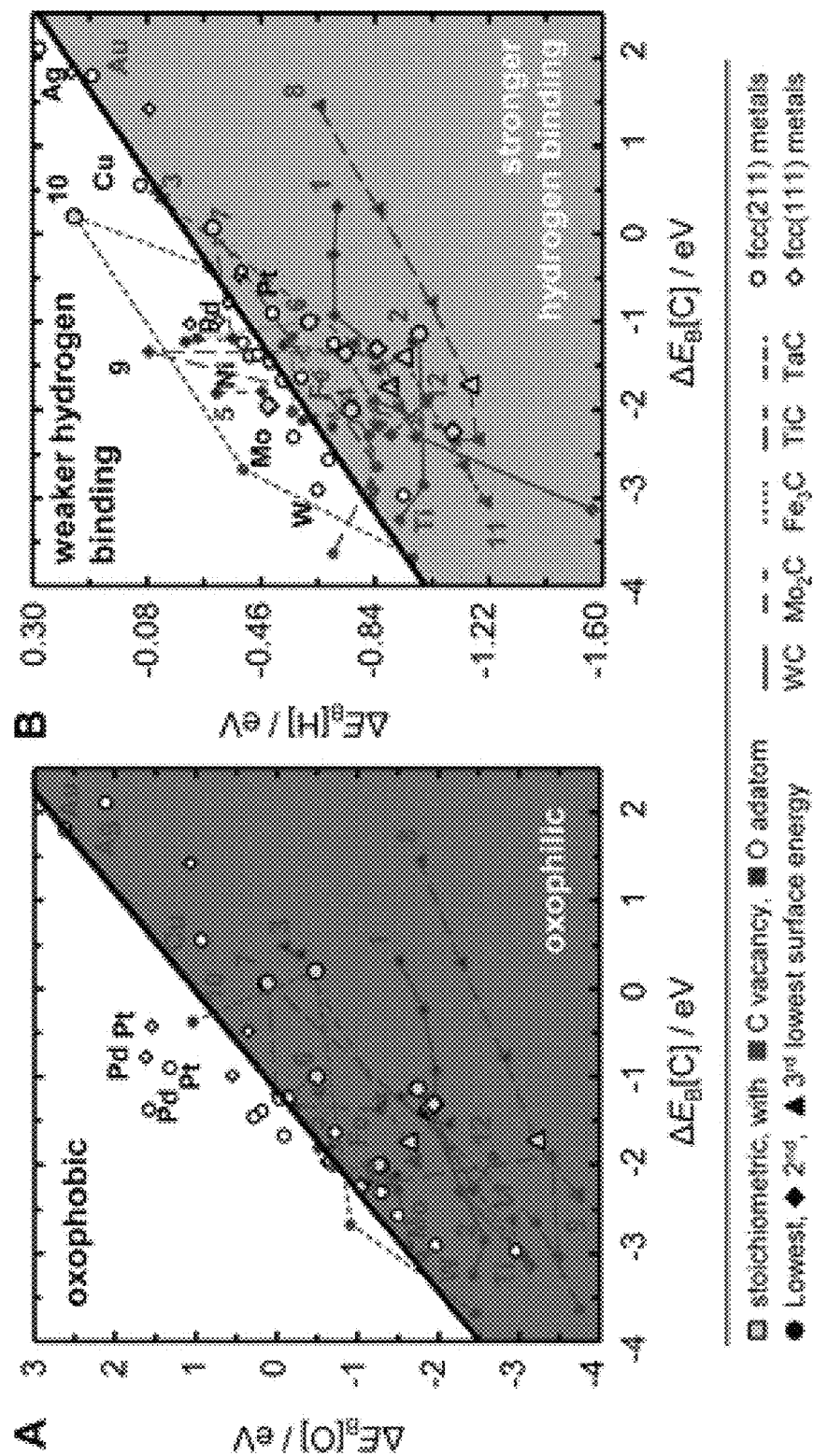
FIG. 11 shows graphs of the adsorption energies of oxygen (A) or hydrogen (B) vs carbon on carbide and transition-metal surfaces.
Figure 12:
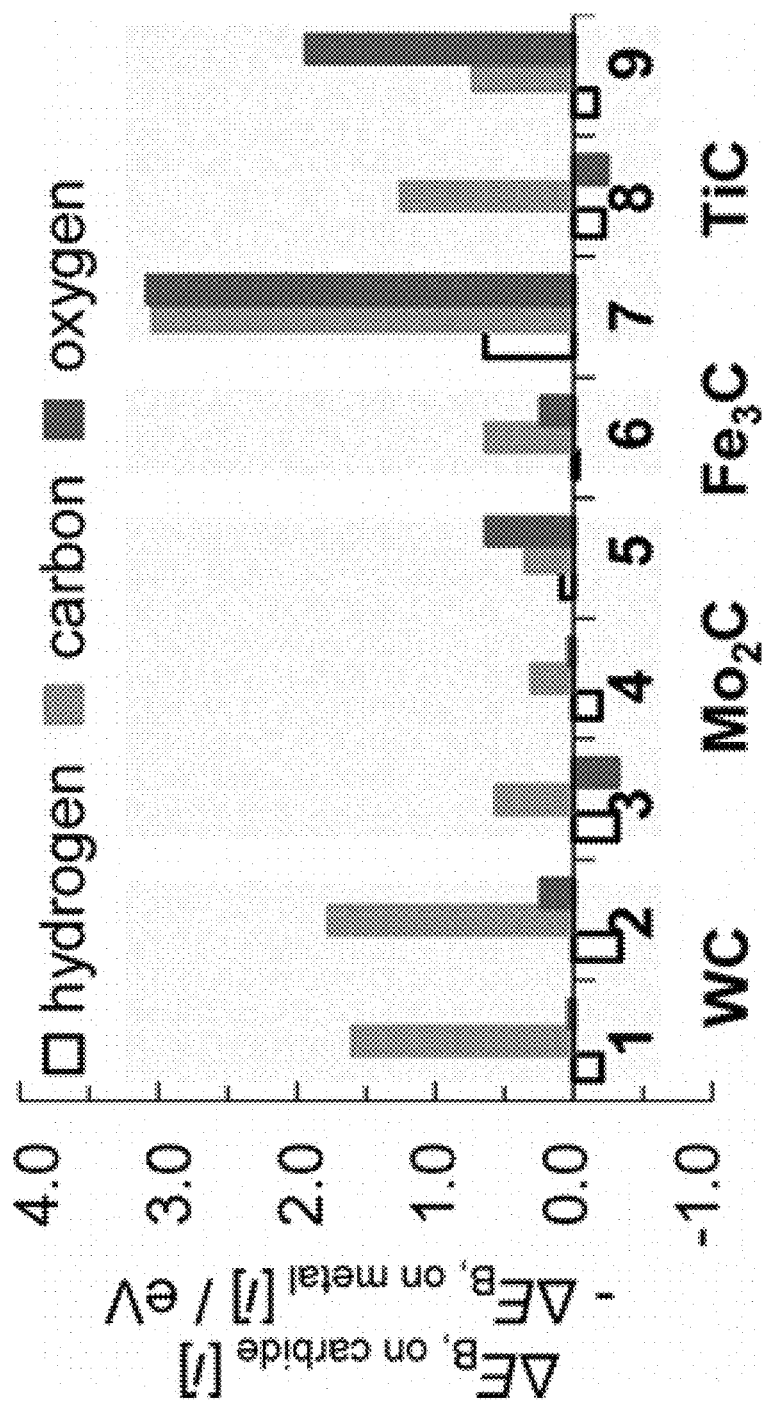
FIG. 12 shows a bar graph comparing the binding energy of C, H, and O on carbide surfaces versus on their parent (carbon-free) metals.
Figure 13:
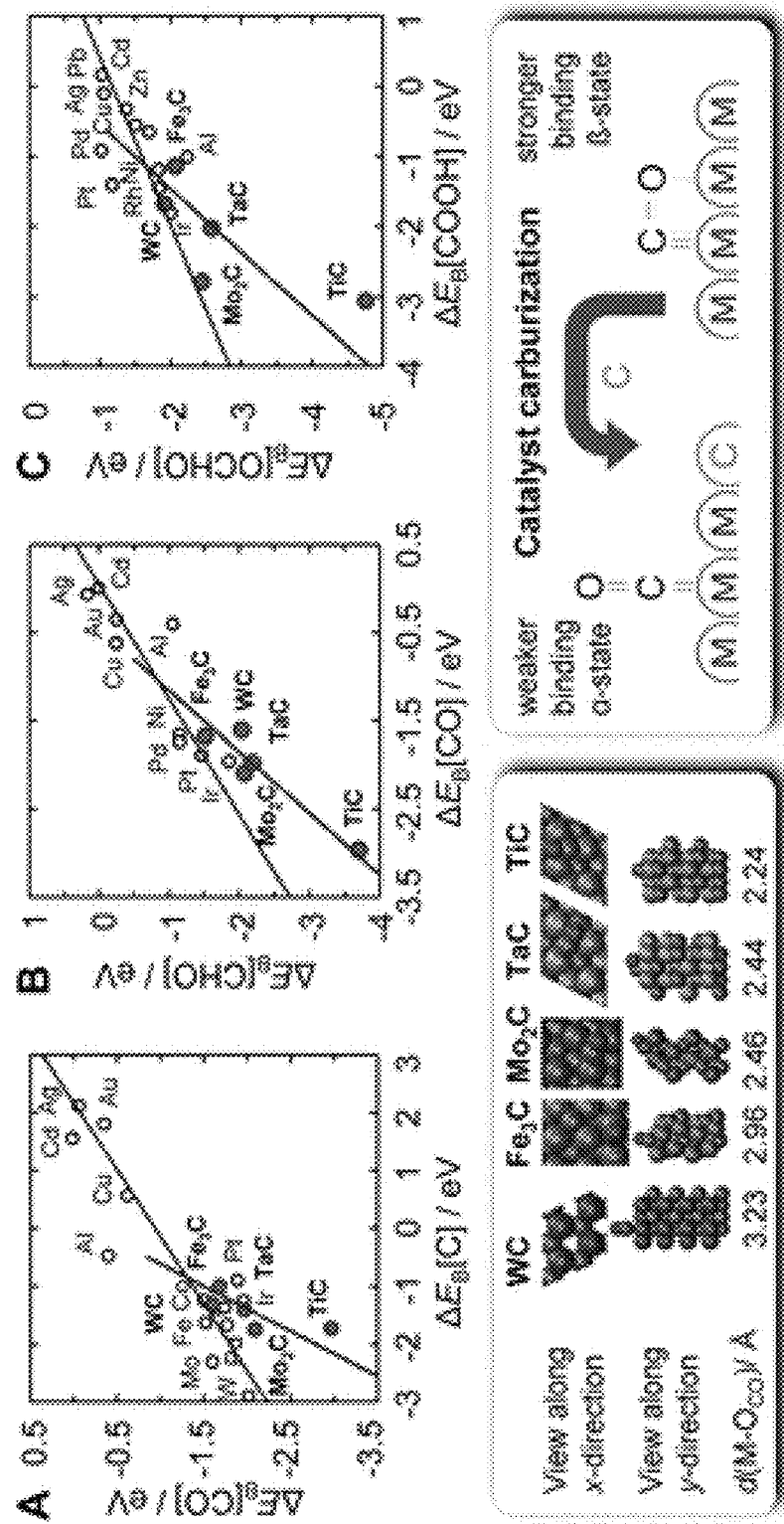
FIG. 13 shows chemisorption energies of molecular adsorbates that are limiting or relevant to CO2 electroreduction, i.e., (A) CO, (B) CHO (formyl), and (C) COOH (carboxyl) and OCHO (formate) on stepped metal (empty circles, black line) 3,8,18,61 or close-packed metal carbide surfaces (i.e., WC(0001), Fe$_3$C(001), Mo$_2$C(001), TaC(111), and TiC(111); filled circles, red line), respectively. The lower left panel shows the site preference of CO on carbide surfaces (carbon shown in gray, metals in brown) and the distance between the O of CO and the next-closest surface metal atom, d(M-OCO) in Å, that is, continuously increasing with weaker CO chemisorption, as shown schematically on the lower right panel.
Figure 14:
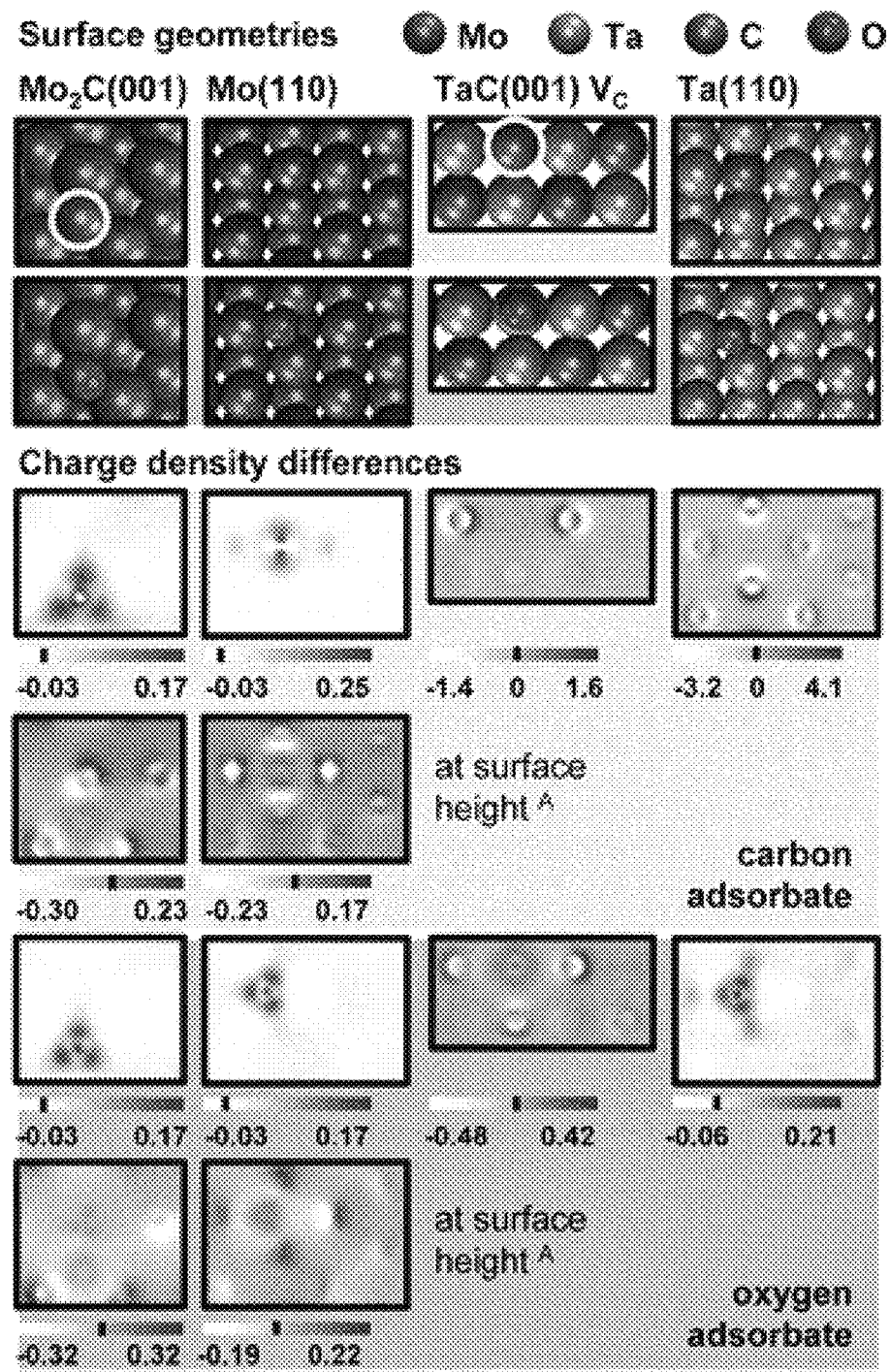
FIG. 14 shows a charge density differences (in units of the elementary charge per Å$^3$) of stoichiometric Mo$_2$C(001) and TaC(001) with 25% lattice carbon vacancies ($V_C$) or the bcc(110) parent metal surfaces. $^4$) The volumetric data are given at adsorbate height, i.e., slab cross sections at the z coordinate of the adsorbate or at "surface height" (indicated), i.e., 0.76 or 0.66 Å (the covalent radii of C or O) closer to the slab.
Figure 15:
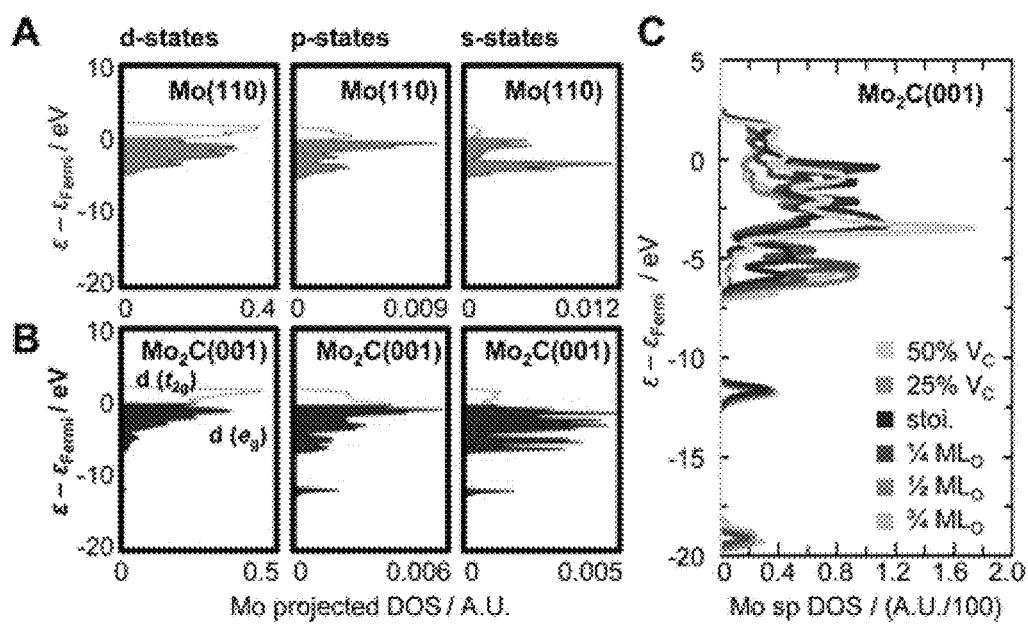
FIG. 15 shows a Mo-projected density of states (DOS) of stoichiometric (A) Mo(110) and (B) Mo$_2$C(001) (occupied states below the Fermi level are colored gray or maroon, respectively) and (C) Mo$_2$C(001) at various surface conditions.
Figure 16:
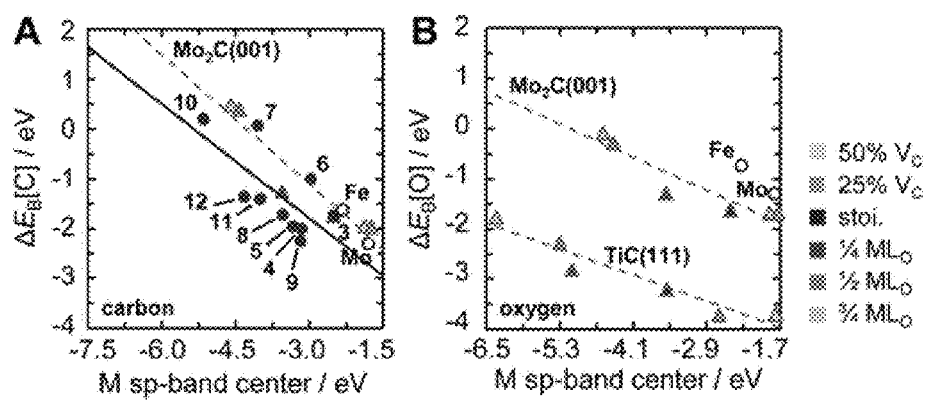
FIG. 16 shows (A) Correlation between the adsorption energies of carbon with the metal-projected sp-band center of the stoichiometric metal carbide surfaces and among surface conditions for Mo$_2$C (triangles). (B) Correlation between the adsorption energies of oxygen and representative metal carbide surfaces at various surface conditions for Mo$_2$C and TiC.
Figure 17:
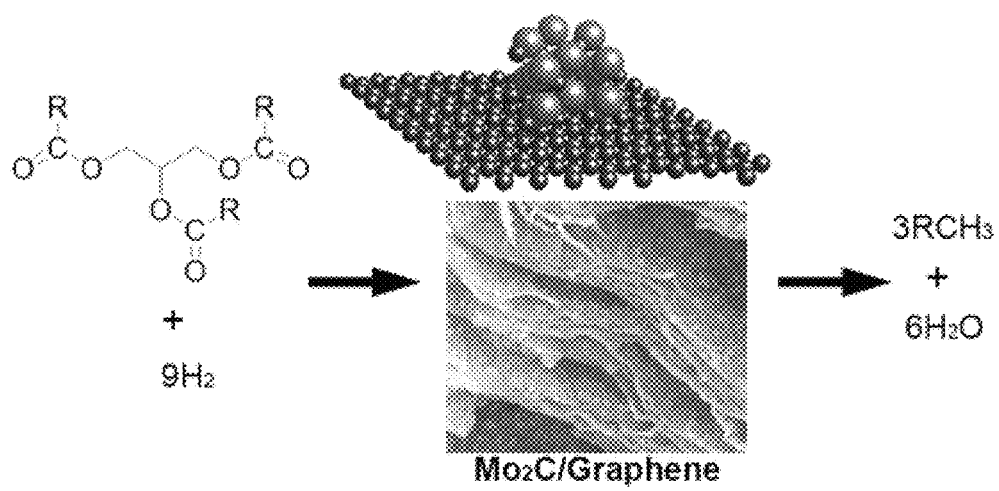
FIG. 17 shows a representation of conversion of natural triglycerides with a Mo$_2$C/Graphene catalyst yielding water and hydrocarbons without truncating the carbon skeleton of the reactant triglycerides.

Referring to FIGS. 8 and 9, computational studies were performed on metal carbides to rationalize the adsorption trends of C, H, and O on carbides as well as their relationship to adsorption energies on pure transition metals (see FIG. 10). Carbides were found to depart from there oxophilic nature, under a range of reactive conditions (as shown in FIG. 10-12. Most importantly, no systematic CO CHO correlation was found.

The activity of heterogeneous catalysts is often limited by a strong correlation between the chemisorption energies of reaction intermediates described by the "scaling relations" among the transition metals. Electronic structure calculations that suggest that metal carbides do not in general follow the transition-metal scaling relations and tend to exhibit a carbophobic departure relative to the transition metals, meaning they tend to bind carbon-bound species weakly compared to oxygen-bound species. This contrasts with the oxophobic departure exhibited by Pt and Pd. Relative to the parent metals, carbides tend to bind carbon and oxygen more weakly and hydrogen more strongly. The departures are rationalized with the adsorbate-surface valence configuration and the energy of the metal sp-states. These trends to aid in the understanding of various catalytic properties such as the high activity of iron carbides for Fischer-Tropsch synthesis and Pt-group catalysts for partial oxidation of methane. These findings extend beyond atomic probe adsorbates to molecular fragments of relevance to catalysis, making these generally useful for the theory-based design of catalytic materials.

The catalytic activity of a surface is largely dictated by the forming and breaking of chemical bonds between the surface and the reaction intermediates. The strength of such bonds, quantified as adsorption energies, can be estimated experimentally with surface science techniques (1) or computationally via electronic structure methods. In practice, adsorption energies of similar adsorbates tend to be highly correlated across surfaces, a phenomenon often referred to as "the scaling relations". In fact, correlated adsorption energies between reaction intermediates—and of transition states through Brønsted-Evans-Polanyi relationships—are believed to limit the activity of a number of industrially interesting catalysts.

An example is in the electrochemical reduction of CO$_2$ to CO. If Pt is used as an electrocatalyst, the reaction intermediates COOH and CO are bound strongly, enabling the low-overpotential activation of CO$_2$ to adsorbed CO; however, the CO binds too strongly to the Pt surface, slowing desorption. To make CO liberation more facile, the electrocatalyst can be changed to Au, which binds CO weakly. However, because the binding energies are correlated, Au also binds COOH relatively weakly; this results in the requirement of an overpotential to produce the weakly bound COOH. Similarly, in the electrochemical reduction of CO$_2$ to CH$_4$ in which the protonation of adsorbed CO is suggested to be the potential-limiting step, the CO/CHO correlation is believed to be responsible for the dearth of efficient electrocatalysts. In the oxygen reduction and evolution reactions, the correlation of O/OH or OH/OOH adsorption energies is considered the origin of the overpotential requirement, as even the best Pt-group metals miss perfect catalytic activity by ~230 mV. Correlated adsorption energies are suggested to also limit the synthesis of methanol and ammonia on monometallic catalysts and have motivated the design of bimetallic or metal compound catalysts.

The metal carbides are an interesting class of catalytic materials on which the scaling relations are relatively unexplored, as the scaling relations were originally developed for materials that tend to follow the d-band theory of adsorption. Carbide catalysts have received considerable attention starting with the suggestion that the carbided form of otherwise non-noble metals such as Mo and W exhibits certain catalytic activities comparable to noble metals; in particular, tungsten carbide has been studied as an alternative to Pt due to its H$_2$ dissociation characteristics. Similarly, insertion of carbon into Fe or Co yields carbide phases with increased or decreased activity, respectively, for Fischer-Tropsch synthesis, which may be due to effects such as the experimentally confirmed weakening of CO binding relative to the parent metal or the enhancement of CO dissociation over CH$_4$ liberation on vacancy versus surface carbon sites. Such characteristics explain the interest in carbide catalysts for the water-gas-shift reaction, the reduction of CO$_2$ or CO, Mars-van Krevelen-like Fischer-Tropsch synthesis (with carbon vacancy formation and replenishment), fuel hydroprocessing, or steam reforming of methane.

Motivated by the distinct adsorption trends calculated on Mo$_2$C relative to the transition metals, in the current work we present an electronic structure analysis of a class of representative carbide surfaces to understand adsorption trends on carbides as well as their relationship to adsorption energies on pure transition metals. While many phenomena, such as reconstruction, surface reduction and oxidation, spectator species, and size effects, will affect real applications, we strive to capture the trends under realistic conditions by examining adsorption trends for both atomic and molecular probe adsorbates on a number of different stoichiometric carbide surfaces as well as under expected reactive conditions, such as with carbon vacancies, with oxygen adatoms, and as oxycarbides. The utility of these trends is demonstrated for understanding adsorption trends of oxygenated or hydrogenated molecular fragments that are relevant to the heterogeneous or electrochemical reduction of CO=, including strengthened adsorption of CHO relative to CO, a useful design principle for the development of electrocatalysts for CO$_2$ reduction. The origin of these chemisorption trends is discussed in terms of surface geometry (bond valence) and electronic structure (splitting surface metal sp states).

The electronic structure calculations were performed in density functional theory (DFT) with the open-source plane-wave/pseudopotential code DACAPO with atomic manipulations handled in the Atomic Simulation Environment (ASE). Exchange-correlation interactions were treated by the revised Perdew-Burke-Ernzerhof (RPBE) functional of Hammer, Hansen, and Nørskov(56) derived in the generalized gradient approximation (GGA). A k-point sampling of 4×4×4 (for bulk calculations with periodic boundary conditions in all directions) or 4×4×1 (for surfaces periodically repeated in the directions parallel to the surface) was used for sampling of the Brillouin zone. A Fermi-Dirac smearing of 0.1 eV was used to achieve convergence, and results were extrapolated to 0 K. Calculations for Fe3C were spin-polarized. The linesearch BFGS algorithm within ASE was employed for relaxing atomic geometries until the maximum force on any unconstrained atom was less than 0.05 eV Å-1. The lattice parameters of the studied carbides were calculated by minimizing the total energy of the bulk carbides as a function of lattice constant.

All surface calculations were performed on periodically repeated slabs with 2×2×4 metal (i.e., noncarbon) atoms in the x, y, or z direction (except $Fe_3C$ with 2×3×4 metal atoms). To avoid reminiscent stress in the adsorption calculations, the lower two layers were constrained to the DFT-calculated bulk geometry, while the atoms in the upper two layers were unconstrained. Twelve carbide surfaces with metal- or mixed-termination were selected based on experimental and theoretical work confirming their stability near ambient conditions. The surfaces were modeled using 10 Å of vacuum in the direction perpendicular to the surface, and the electrostatic interaction between the periodic On some metal carbide surfaces with or without oxygen adatoms the hydrogen binding energies are relatively close to those of Pt, the single pure metal near the top of the HER volcano (i.e., with near-optimum hydrogen binding). (65) While hydrogen coverage effects are not accounted for in this work, weakening of hydrogen bonding due to hydrogen coverage (41) may partly justify Pt-like characteristics. This includes the ability to dissociate H2 in the presence of H2O at ambient conditions predicted for instance for WC (27) as well as the experimentally reported higher activity of WC for catalyzing the HER, relative to pure W. (66)

The different adsorption behavior of carbides as compared to transition metals suggests differing catalytic trends from those which may limit the reactivity of the transition metal catalysts. In particular, the carbophobic nature may suggest a relatively weaker binding of adsorbates that interact with the surface through carbon and relatively stronger binding through oxygen. Similarly, highly hydrogenated molecular fragments may bind stronger at the metal carbide relative to the parent metal surface.

In the context of Mars-van Krevelen (MvK) type reaction mechanisms in Fischer-Tropsch synthesis on iron carbide, (29, 35) although much debate exists about the mechanism, a recent study has suggested the two most endothermic surface reactions are the liberation of lattice carbon (ClatticeH* to CH2*; the asterisk denotes a surface-bound species) and the hydrogenation of lattice-bound carbon monoxide (ClatticeO* to ClatticeOH*) resulting in the breaking of the CO bond to replenish the lattice carbon (Clattice*+OH*). (35) We can use our results to qualitatively understand the desirability of the carbophobic nature of iron carbide catalysts within this mechanistic framework. The ideal MvK catalyst for Fischer-Tropsch synthesis must bind carbon weakly enough (carbophobic) to liberate the lattice carbon, while it has to bind O or OH strongly enough (oxophilic) to break the CO bond to replenish the defect.

The departures of the carbides from the carbon/oxygen scaling was established above with atomic probe adsorbates, which differ in the degree of undercoordination—i.e., 2-fold undercoordinated oxygen (two valence electrons in O p orbitals) vs 4-fold undercoordinated carbon (four electrons in C sp3 orbitals) vs 1-fold undercoordinated hydrogen (one electron in the H s orbital). We find much of this trend to be conserved with the equally undercoordinated OH and CH3 adsorbates, which indicates it is not solely an artifact of the choice of probe adsorbates. However, depending on its valence configuration, (4) a metal surface can be expected to reconstruct to accommodate adsorbates of different valences. The presence of carbon in the metal crystal lattice can alter or restrict this geometric rearrangement, resulting in the relatively weak adsorption of highly undercoordinated adsorbates. On Mo2C(001), with 33 mol % lattice carbon, both oxygen and carbon are stabilized with three metal-adsorbate bonds at equivalent 3-fold metal sites. However, Mo(110) reconstructs during the adsorption of carbon: the two more distant Mo atoms move 0.102 Å closer, while the two closer Mo atoms (vertical) move 0.144 Å further apart to facilitate the adsorption of carbon at a 4-fold site. The lattice carbon of metal carbides gradually restricts this surface reconstruction. On Fe3C(001), with only 25 mol % lattice carbon, adsorption of carbon at 4-fold metal sites is conserved in principle, but the biaxial symmetry of the adsorption site on Fe(110) is broken on Fe3C(001). We note that similar arguments may explain the tendency for formation of C—C bonds on surfaces that lack 4-fold or 3-fold M sites. In consequence, the oxophilic departure from the transition-metal scaling for adsorbates with low and equal valence, such as OH/CH3, is less pronounced relative to the O/C scaling but in principle preserved.

If lattice carbon is removed from a carbide resulting in an accessible surface vacancy, then carbon adsorbates tend energetically to fill these vacancies, while oxygen and hydrogen tend to form two metal-adsorbate bonds at metal-metal bridge sites. We note that the atomic hydrogen probe adsorbate has only one unpaired electron, increasing the "degree of freedom" in finding adsorption sites, and we tend to see more variability in its preferred binding site. The geometric preference of the adsorbates on most carbide surfaces varies only slightly upon addition of oxygen adatoms which indicates that the passivating effect of these adatoms is predominantly of an electronic nature.

Since the reactivity of metal carbide surfaces cannot be explained alone with bond valence arguments, a distinct difference in the electronic structure between transition-metal and metal carbide surfaces is plausible. Understanding such electronic structure details is useful when employing the above-described principles for the rational design of metal compound catalysts.

The d-band model, (42) which correlates adsorption energies to the central moment of the metal d band, has seen tremendous success in describing adsorption trends on transition metals. While these trends are seen to some degree—for example, stronger CO binding on TiC(111) or TaC(111) vs weaker CO binding on Mo2C(001) or Fe3C(001))—the atomic adsorption energies on metal carbides show little to no correlation with the d-band center, either across the stoichiometric surfaces or for a given surface at various reaction conditions. Although refinements to the d-band model and other understandings have been discussed, (5, 50, 64, 68-70) a low predictive power of the (unrefined) d-band theory for metal carbides may be expected since carbides violate the model's core assumption of approximate independence of the metal sp states.

On transition metal surfaces, the metal sp states are expected to contribute the larger fraction of the bonding between a surface and an adsorbate. (2, 3, 42) This can be expected to hold for metal carbides as well. However, unlike the transition metals, the metal sp-band center at a carbide surface shifts significantly with the parent metal. We find that this shift correlates strongly with the adsorption energies on carbide surfaces with varying parent metal and varying reaction conditions. Emptying the metal sp states—shifting the sp-band center up via, e.g., formation of carbon vacancies—correlates with stronger adsorption energies, which is evidence for the emptying of antibonding states. This correlation is strong on most close-packed surfaces and describes the adsorption of carbon generally better than the adsorption of oxygen. Also, the appearance of a dominant splitting of the M sp states into bonding states around −10 eV (hybridized with M d and C s states) and antibonding states near the Fermi level (that couple to the M d t2g states) may correlate with the carbophobic nature of the carbide surfaces. Although we note a correlation between the sp-band center and the binding energies of O and C, we note that this is perhaps less predictive than that of the d band model, which may be expected as we observe much less of a correlation between oxygen and carbon binding energies on the carbides than on the transition metals.

The chemisorption energies of atomic and molecular adsorbates on 12 representative model transition-metal carbide surfaces depart from the adsorption energy correlations on transition-metal surfaces. These oxophilic and carbophobic departures may help to explain the reactivity of carbide catalysts and may aid in the design of catalysts which intrinsically avoid the rate- and potential-limiting steps of many chemical reactions on heterogeneous catalysts and electrocatalysts, such as shown here for the hydrogenation of CO which limits the electrocatalytic reduction of CO2 into renewable hydrocarbon fuels.

The relations of atomic and molecular adsorption energies can be utilized to map metal and metal carbide surfaces in the catalytic activity space that is described by the strength of carbon, oxygen, and hydrogen binding at the surface. Generally, metal carbides tend to bind oxygen relatively strongly, relative to how strongly carbon is bound, which is an opposite departure from the behavior observed for Pt and Pd. This may guide the choice of these catalysts in applications such as CO2 reduction or deoxygenation reactions. The provided data of adsorption energies can be employed to establish Brønsted-Evans-Polanyi relations to predict catalytic activities of a given metal carbide catalyst for selected catalytic applications.

The surface reactivity of metal carbides can be partially rationalized with the valence configuration of the catalyst surface as well as the contributions of the metal-projected sp states to the adsorbate-surface bond. These origins of surface activity provide the beginning of a basis for the understanding of these complex catalyst materials and outline possible factors that modify the catalytic activity of metal carbide surfaces at the atomic scale, i.e., formation of carbon vacancies, partial surface oxidation, and filling or emptying of the metal d and sp band (e.g., when applying surface strain).

Detailed computational methods; database of adsorption and reference energies; OH/CH3 scaling relation; data for oxycarbide surfaces; adsorption geometries; surface energy correlations; electronic structure details; DOS analyses for metal and metal carbide surfaces; charge density details; C—C bond formation trends. Some of this material is available via the Internet at http://pubs.acs.org.uri.idm.oci-c.org.

Figure 18:
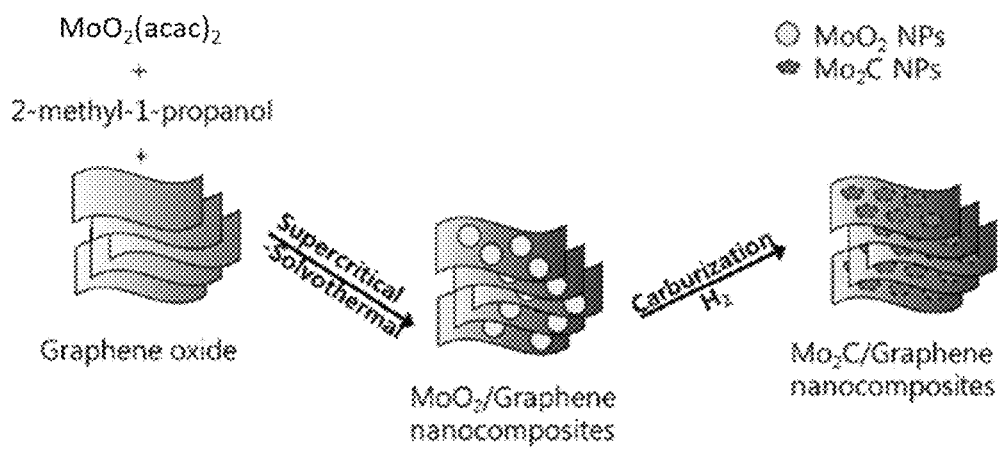
FIG. 18 shows a procedure to form Mo$_2$C/reduced graphene oxide catalysts.
Figure 30:
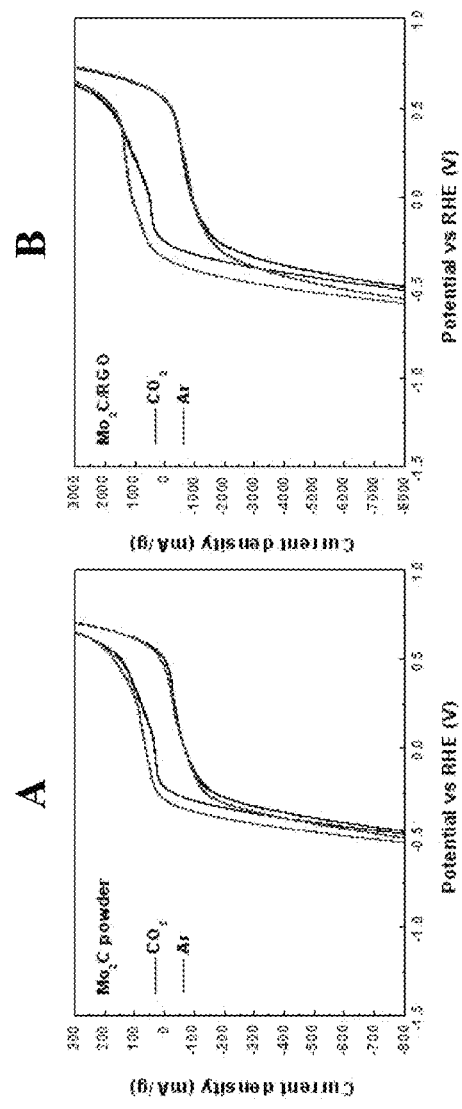
FIG. 30 shows polarization curves in Ar and $CO_2$ environments for (A) $Mo_2C$ powder (44 μm) and (B) $Mo_2C$/Graphene (10-20 nm $Mo_2C$ nanoparticles on reduced graphene oxide)
Figure 31:
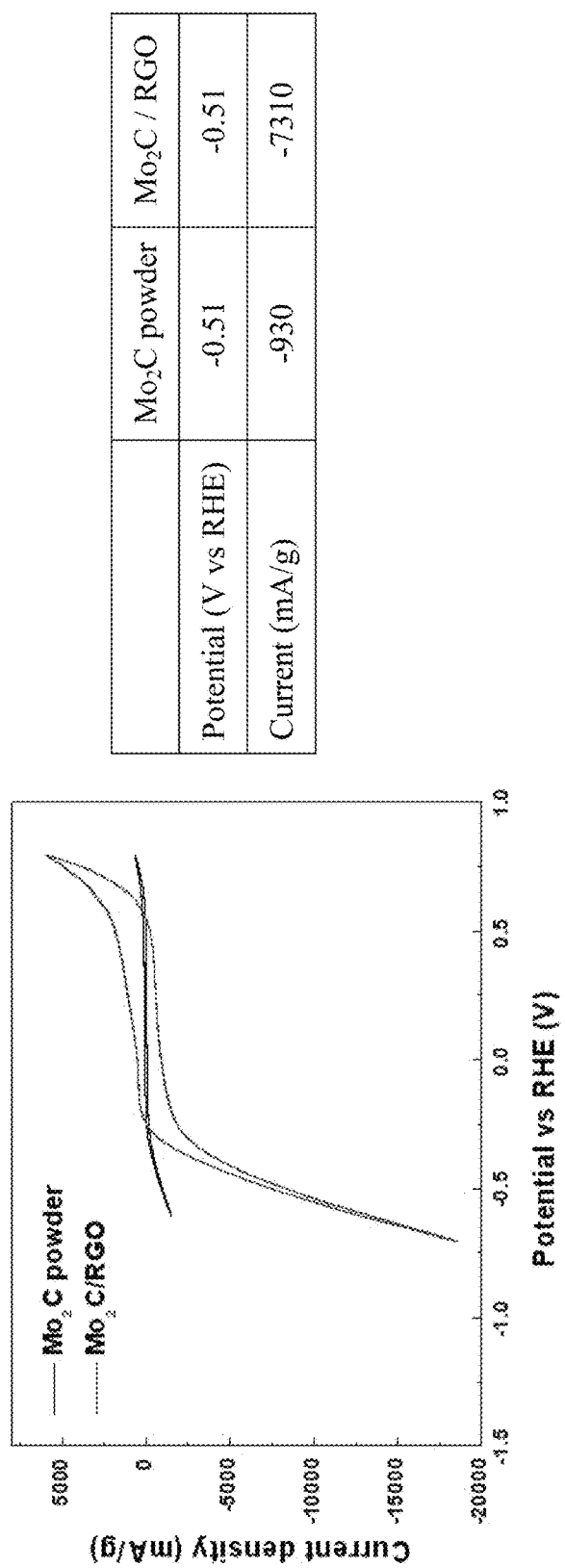
FIG. 31 shows polarization curves in of $Mo_2C$ powder and $Mo_2C$/Graphene in a $CO_2$ environment.
Figure 32:
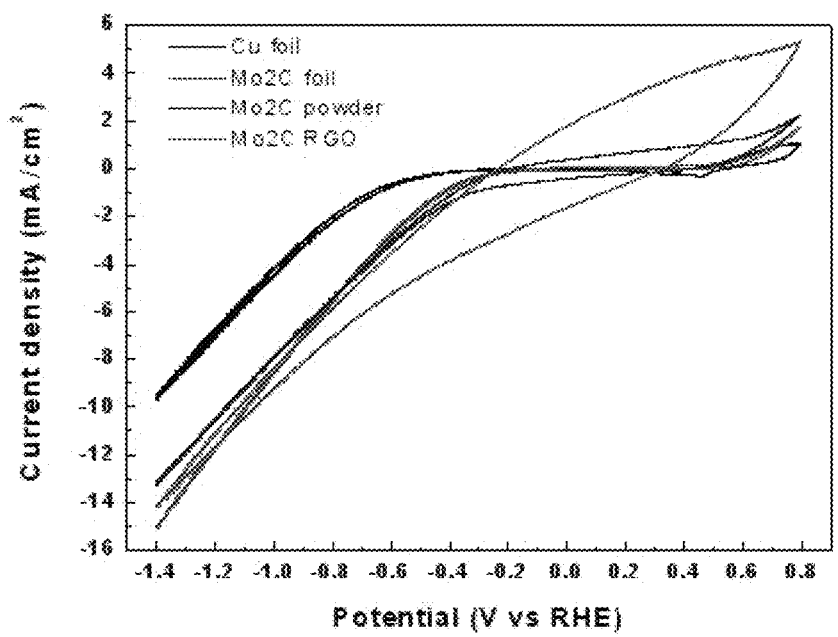
FIG. 32 shows polarization curves of Cu foil, $Mo_2C$ foil, $Mo_2C$ powder and $Mo_2C$/RGO.
Figure 33:
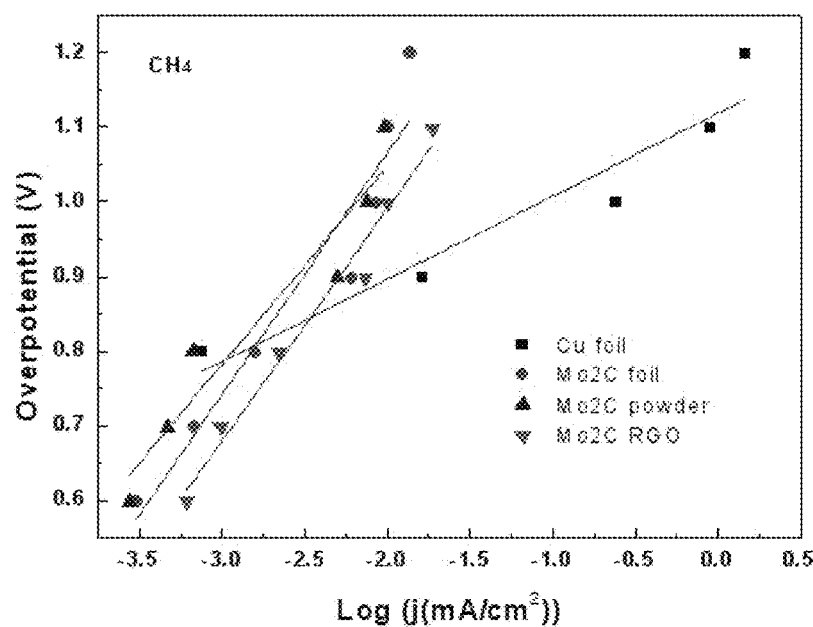
FIG. 33 shows Tafel plot for Cu foil, $Mo_2C$ foil, $Mo_2C$ powder and $Mo_2C$/RGO, showing the overpotentials for $Mo_2C$ is less than that of Cu.
Figure 34:
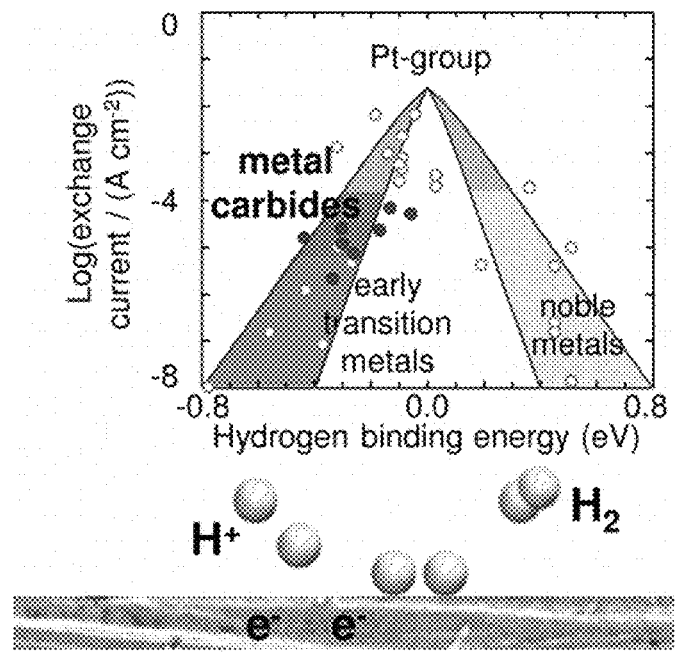
FIG. 34 shows hydrogen evolution reaction (HER) volcano plot depicting exchange current density ($i_0$) for the HER versus the free energy of hydrogen adsorption ($\Delta G_B$ [H])
Figure 35:
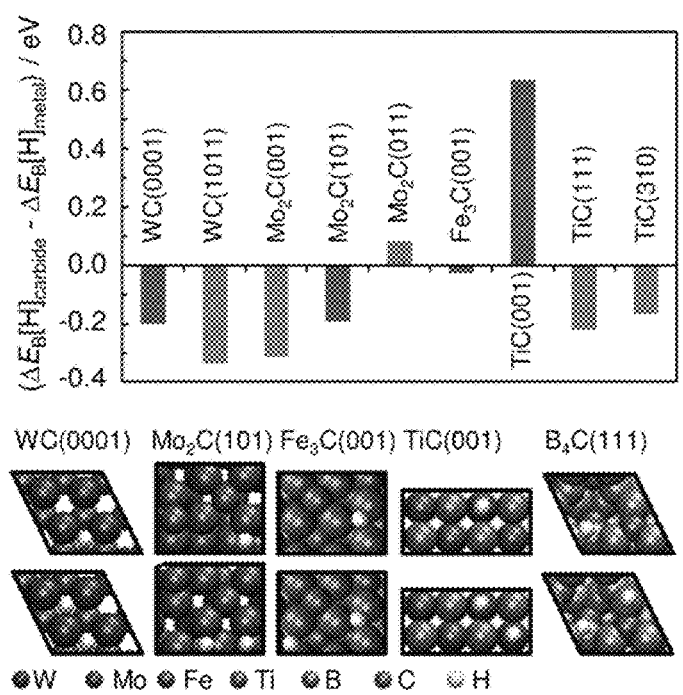
FIG. 35 shows a difference in hydrogen adsorption energies on various metal carbide surfaces relative to their stepped parent metal surface. The images below the graph, correlating to the red bars on the graph, show the optimal adsorption sites of H on selected metal carbide surfaces at either ¼ [⅙ on $Fe_3C(001)$] $ML_H$ (top row) or ½ [⅓ on $Fe_3C(001)$] $ML_H$ (bottom row). Binding energies for Fe(211), Mo(210), and W(210) are from the literature.
Figure 36:
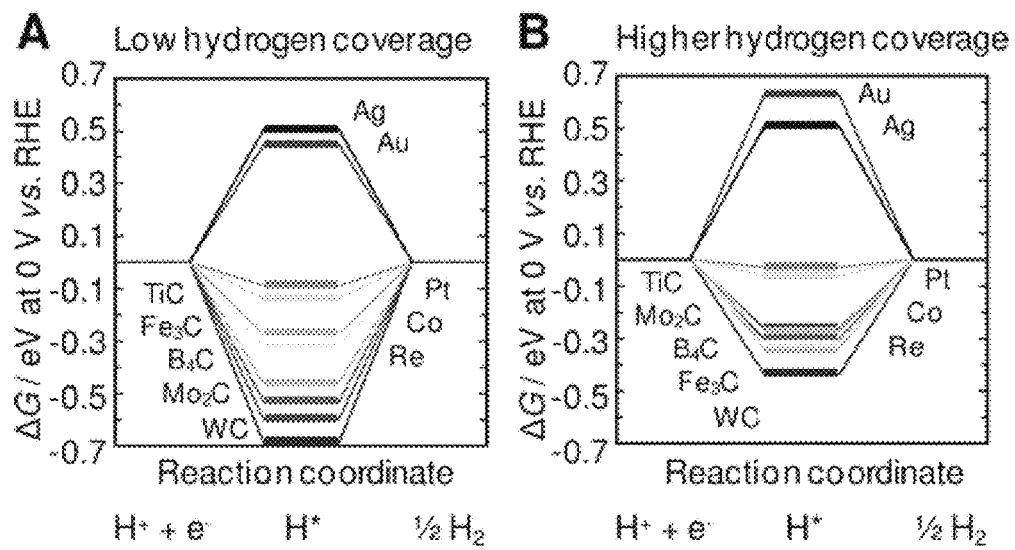
FIG. 36 shows free energy diagrams for the electrochemical reduction of $H^+$ at the equilibrium potential and under standard conditions (1 bar of $H_2$, pH 0, 298 K) on fcc(111) metal (gray lines) and metal carbide surfaces at (A) low coverage, i.e., ¼ $ML_H$ on all surfaces (except ⅙ $ML_H$ on $Fe_3C$), or (B) higher coverage, i.e., ½ $ML_H$ on carbide surfaces (⅓ $ML_H$ on $Fe_3C$) and 1 $ML_H$ on metal surfaces. Negative $\Delta G$ values mark exergonic reaction steps.
Figure 37:
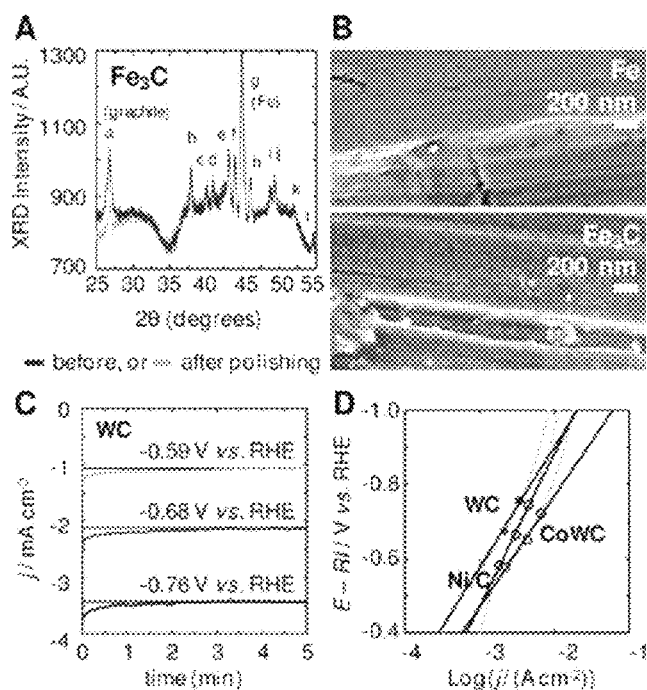
FIG. 37 shows $H^+$ reduction activity of metal carbide electrodes. Representative (A) XRD pattern of $Fe_3C$ before and after abrasive polishing [a-1 mark (020), (121), (002), (201), (211), (102), (031), (112), (131), (221), (122), and (230) facets of $Fe_3C$, respectively; ref ICDD 00-035-0772], (B) SEM images of Fe before (Fe) and after ($Fe_3C$) carburization, (C) polarization curves of WC (solid black lines mark the steady-state values), and (D) Tafel plots (dots and linear fits with black lines) and related cyclic voltammograms (light gray) in 0.05 M $K_2CO_3$ (pH 11.3) at 19±1° C.
Figure 38:
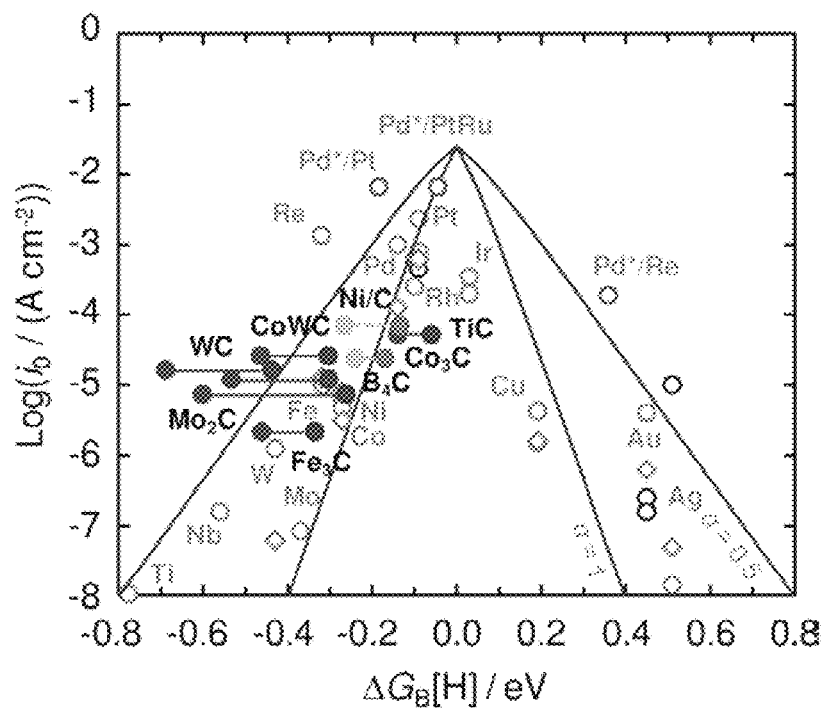
FIG. 38 shows volcano plot for the HER on polycrystalline (gray circles) or single-crystal (dark blue circles) transition metals (¼ $ML_H$) and Pd overlayers (denoted with Pd*/substrate, light blue circles, ¼ to ⅓ $ML_H$) from in acidic electrolytes or transition metals in alkaline electrolytes (gray diamonds) and metal carbides in an alkaline electrolyte at ⅙ to ¼ $ML_H$ (red circles) or ⅓ to ½ $ML_H$ (brown circles), connected with a solid line as a guide to the eye. The two solid curved lines show a microkinetic model, assuming transfer coefficients (α) of 0.5 and 1.0.
Figure 39:
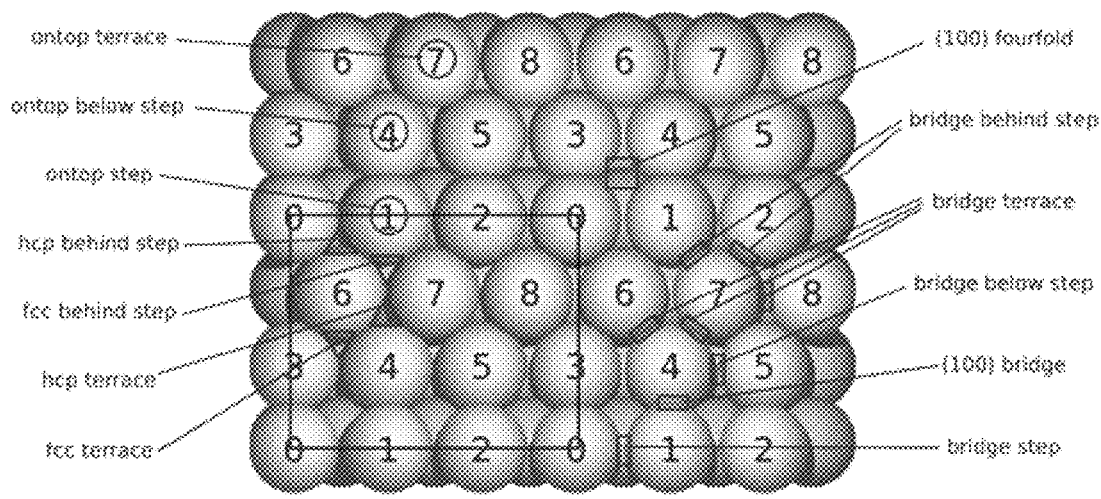
FIG. 39 shows the possible binding sites (with translational symmetries removed) for a single monatomic adsorbate on an fcc (111) surface.
Figure 40:
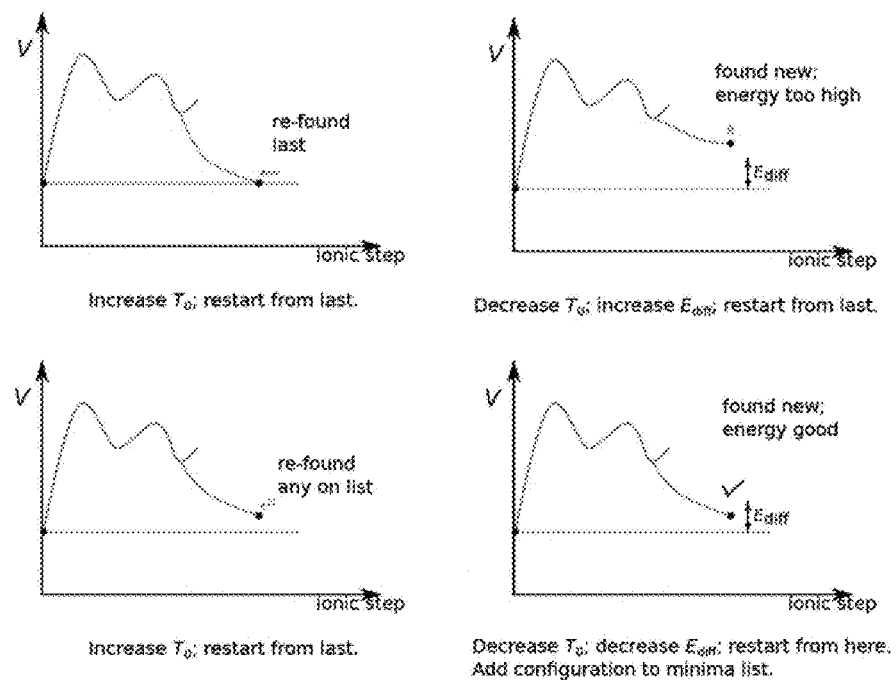
FIG. 40 shows possible outcomes of each step in the generalized minima hopping scheme.
Figure 41:
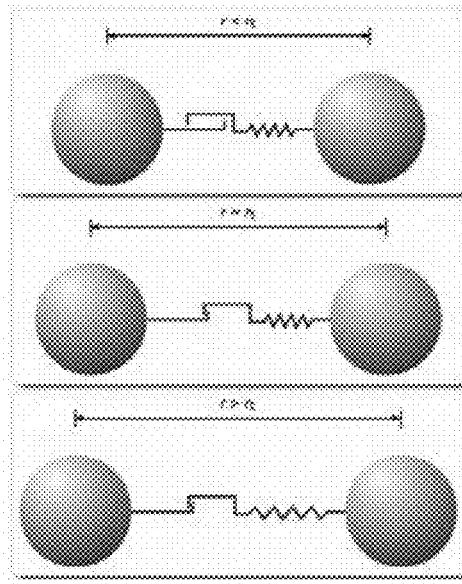
FIG. 41 shows mechanical schematic of the Hookean bond constraint described herein. The spheres represent two atomic positions. When the distance between these two atoms, r, is less than a threshold $r_t$, the constraint is completely inactive. The constraint turns on when r exceeds $r_t$, at which point the restorative force is proportional to the amount by which r exceeds the threshold, $(r-r_t)$.
Figure 42:
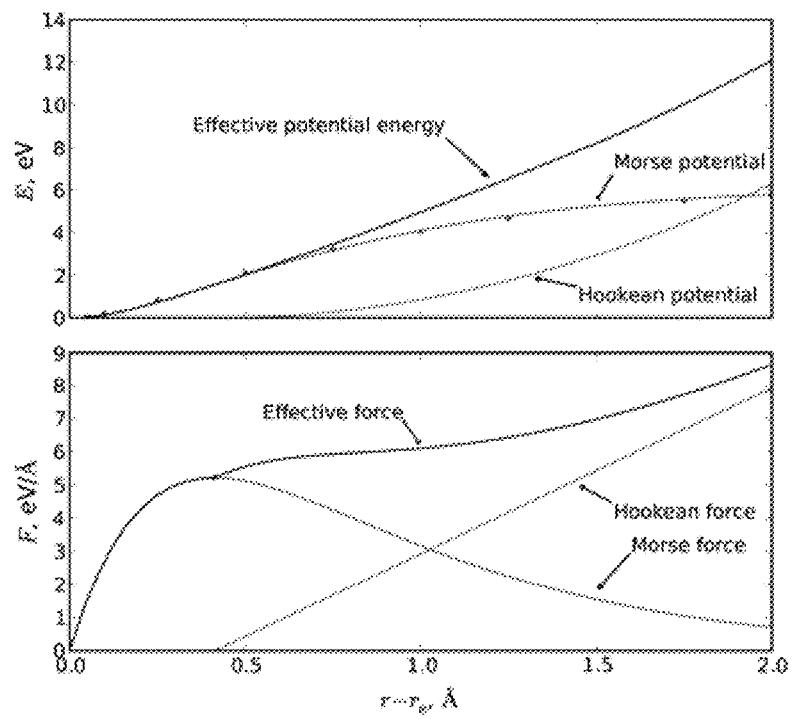
FIG. 42 shows (Top) Density functional theory (DFT) calculated potential energy for stretching the O—H bond in formic acid, shown as the data points, along with a Morse potential fit to this data. The energy added by the Hookean potential is shown in red and their sum, the effective potential, is shown in black. (Bottom) The equivalent force curves.
Figure 43:
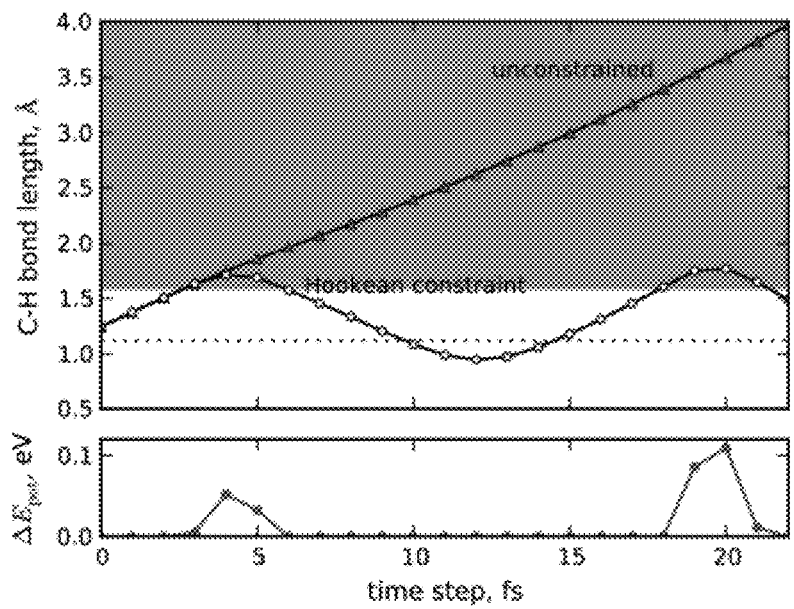
FIG. 43 shows (Top) Carbon-hydrogen bond distance in a CHO adsorbate on the Cu (211) surface with and without a Hookean constraint. The red triangles are the molecular dynamics without an identity-preserving constraint; the gray circles are with the Hookean constraint. The Hookean constraint only becomes active when the C—H bond length exceeds the threshold value, which in this case was 1.59 Å, signified by the blue region. The average equilibrium bond length for this adsorbate, 1.12 Å, is shown as the dashed line. (Bottom) Plot of the potential energy added when the constraint is active.
Figure 44:
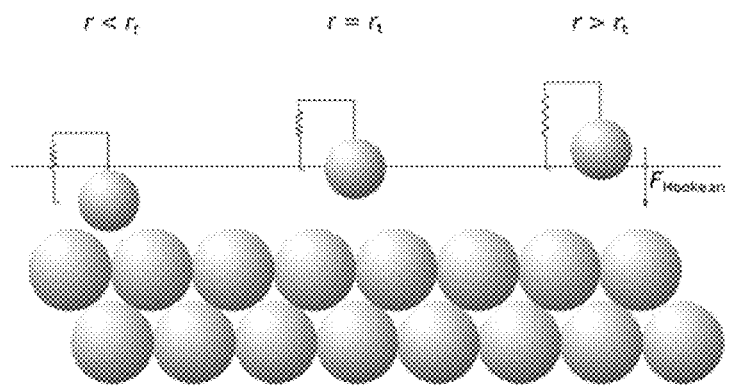
FIG. 44 shows mechanical schematic of the Hookean volatilization constraint designed to prevent desorption of adsorbates during molecular dynamics portions of the minima hopping method.
Figure 45:
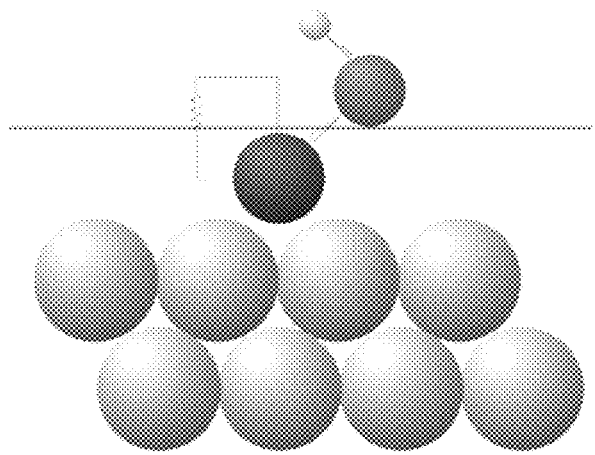
FIG. 45 shows the combination of Hookean bond constraints and a Hookean volatilization constraint is enacted to preserve adsorbate identity for the example of a COH adsorbate on a surface. The carbon atom, through which this adsorbate is expected to bind to the surface, is constrained to have a restorative force applied if its vertical height exceeds a threshold. The bonds C—O and O—H are also constrained to have a restorative force if their distance exceeds individually specified thresholds.
Figure 46:
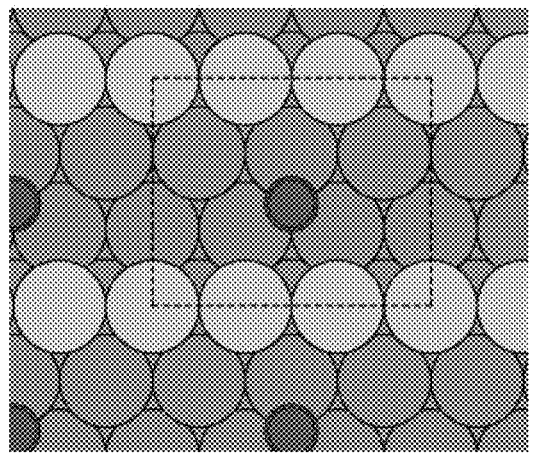
FIG. 46 shows example of initial adsorbate placement on the periodic slab surface, for the case of a CO adsorbate on Cu fcc (211). In this image, the unit cell used in the periodic calculations is indicated by the dashed lines. The copper atoms at the top of the step edge are shown in a lighter color.
Figure 47:
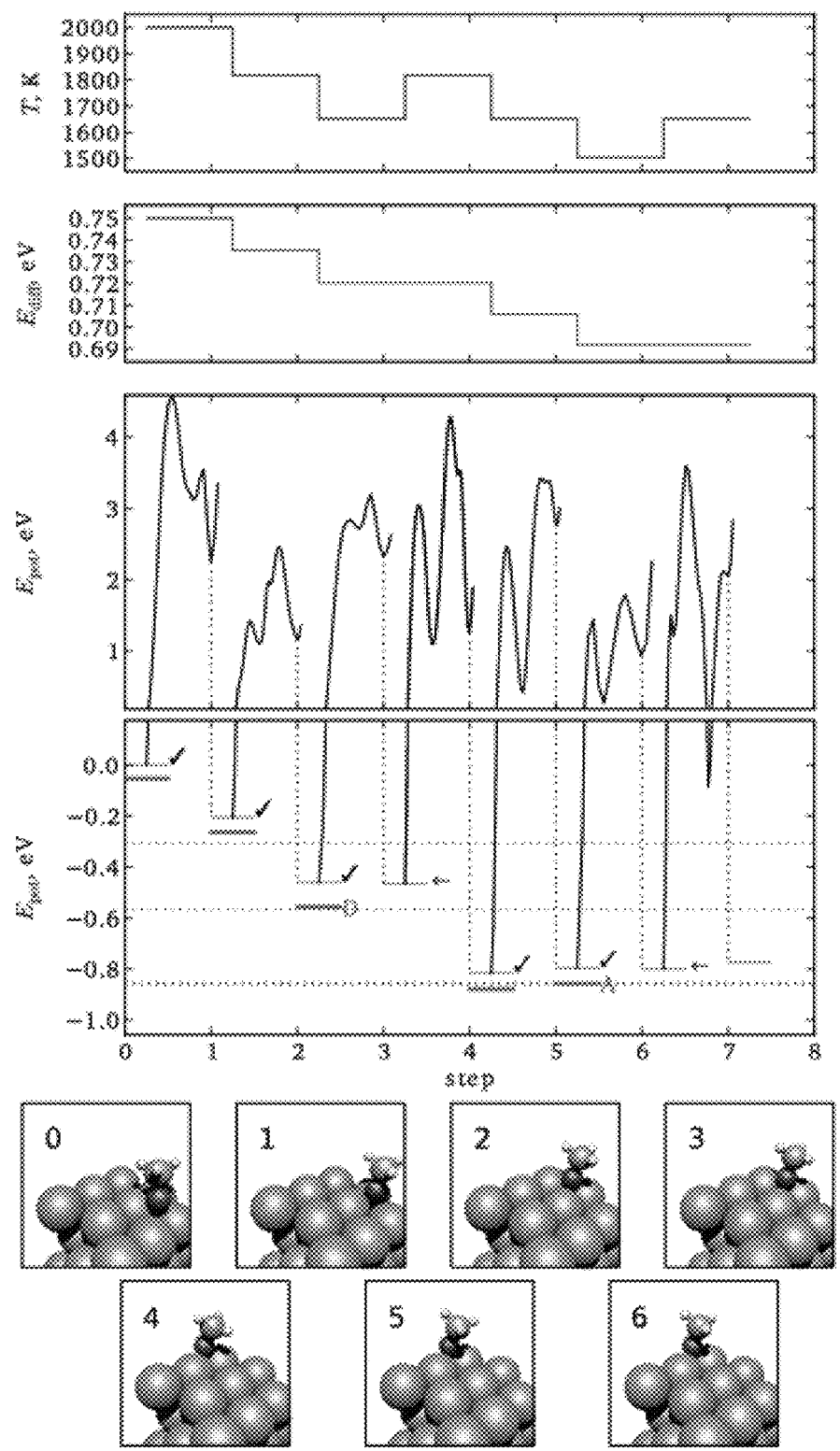
FIG. 47 shows example trajectory of the CMH method for $OCH_3$ on Cu (211). $T_0$ and $E_{diff}$ are the automatically adjusting parameters and $E_{pot}$ is the potential energy during the simulation. The green dashed lines indicate local minima found in previous studies using the brute intuition approach. The routine was carried out with the all Cu atoms fixed (black curves) and the local minima were re-relaxed with the top Cu layer unconstrained (green bars). Exact matches to previous minima are marked as 'A' and 'D'. Atomic configurations are shown (without periodic repetition) for each local minimum.
Figure 48:
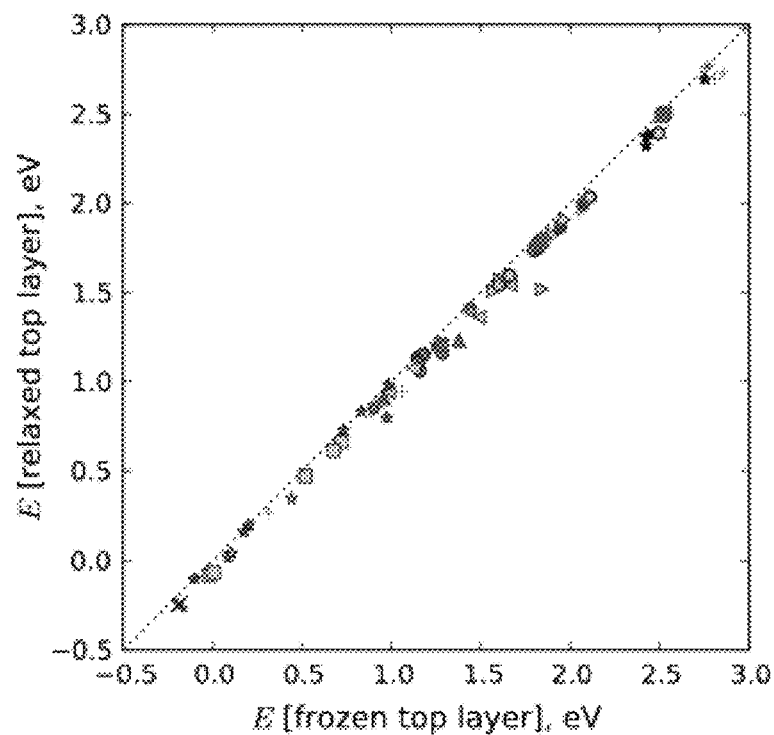
FIG. 48 shows plot of energies of all the conformers with the top layer of the slab frozen in its optimal adsorbate-free condition (abscissa) and relaxed with the adsorbate present (ordinate). All energies are relative to the clean slab (with one layer relaxed) and reference states of graphene, ½$H_2$, and $H_2O$—$H_2$ for each carbon, hydrogen, and oxygen, respectively.
Figure 49:
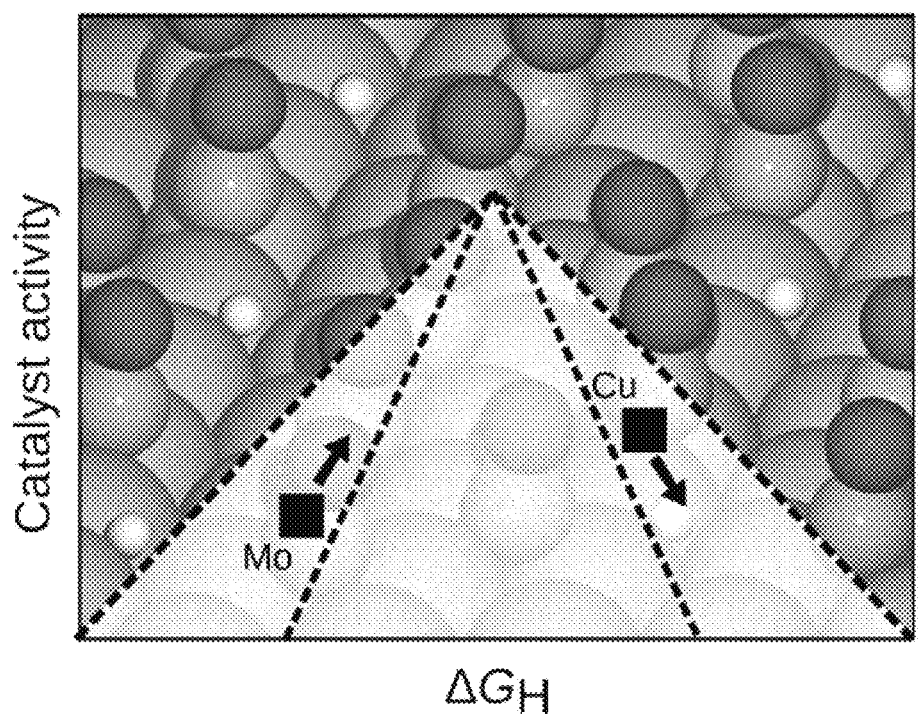
FIG. 49 shows hydrogen evolution reaction (HER) volcano plot describing the relationship between H binding energy and the corresponding hydrogen evolution catalytic activity.
Figure 50:
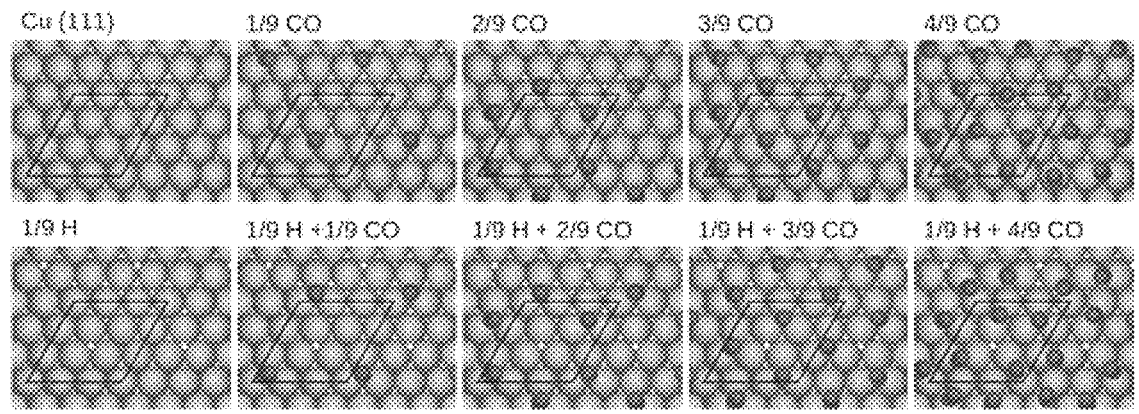
FIG. 50 shows Cu (111) surface with H adsorbates and neighboring CO spectators at the calculated thermodynamic stable configurations. Black lines indicate the size of the unit cell. The gray atoms are carbon; red are oxygen; white are hydrogen.
Figure 51:
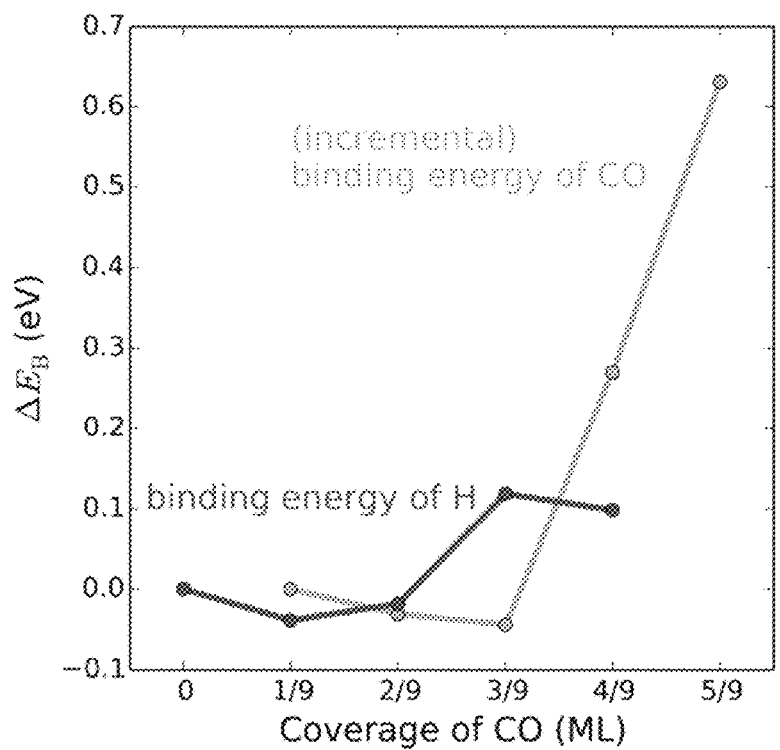
FIG. 51 shows relationship of incremental CO binding energy and CO coverage on Cu (gray) and the relationship of H binding energy and CO coverage Cu (red), both shown on the (111) surface. The binding energies of both CO and H are reported relative to the values on the clean copper surface: $\Delta E_B$ is defined as $\Delta E_B = E_B - E_B$[H or CO on clean surface]. The more positive $\Delta E_B$ is on the yaxis, the weaker the adsorbate binds to the copper surface.
Figure 52:
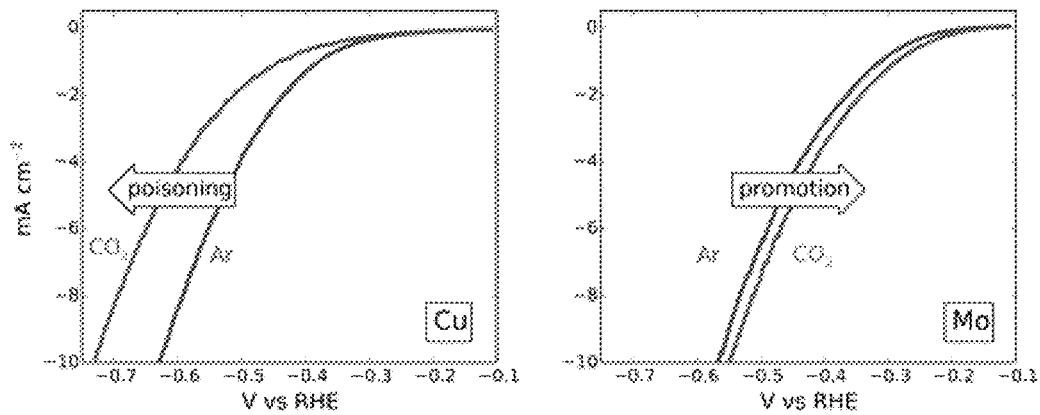
FIG. 52 shows polarization curves of Cu and Mo in argon versus carbon dioxide atmospheres. On Cu, the known poisoning effect of CO is observed, while on Mo the opposite is seen, presumably due to a weakening of hydrogen bonding by coadsorbed CO. Average positive-going sweeps at 5 mV/s are shown.
Figure 53:
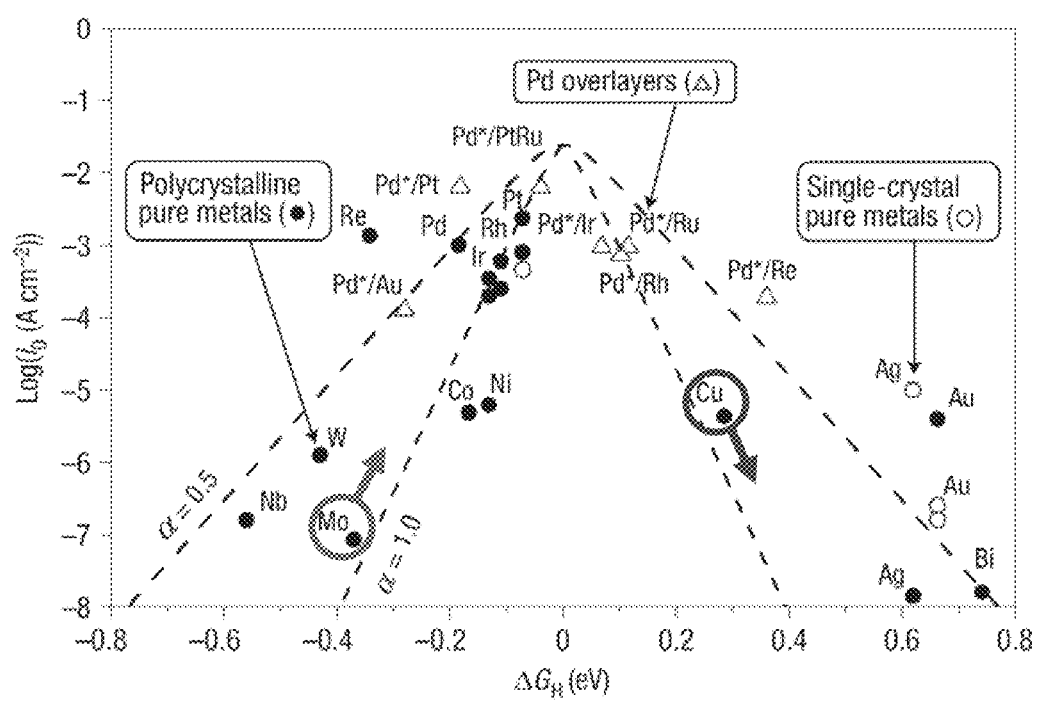
FIG. 53 shows hydrogen evolution reaction (HER) volcano plot.
Figure 54:
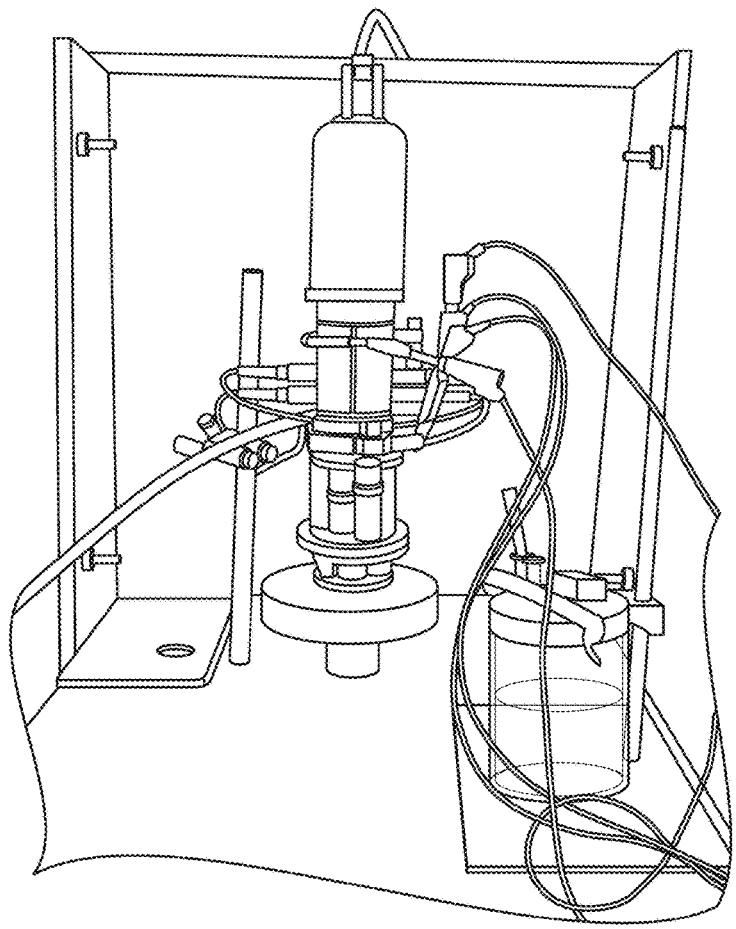
FIG. 54 shows rotating disk electrode (RDE) for cyclic voltammetry (CV) experiments on Cu and Mo electrodes.
Figure 55:
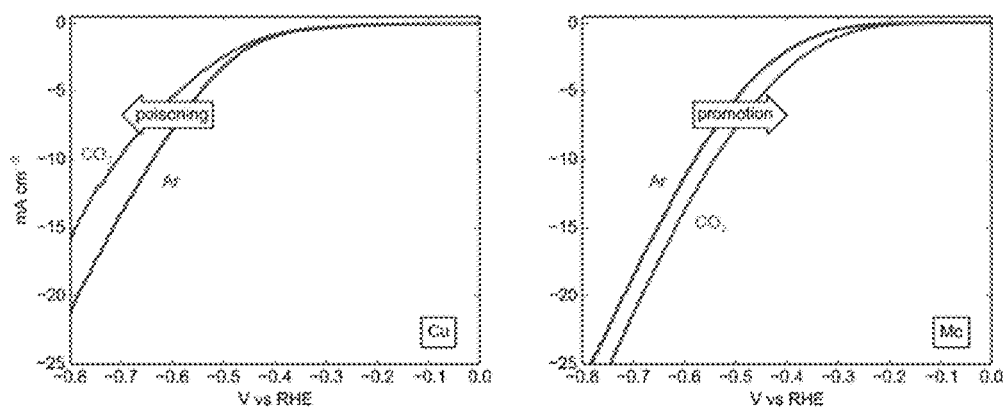
FIG. 55 shows individual polarization curves (positive-going) of Cu and Mo in argon versus carbon dioxide atmospheres.
Figure 56:
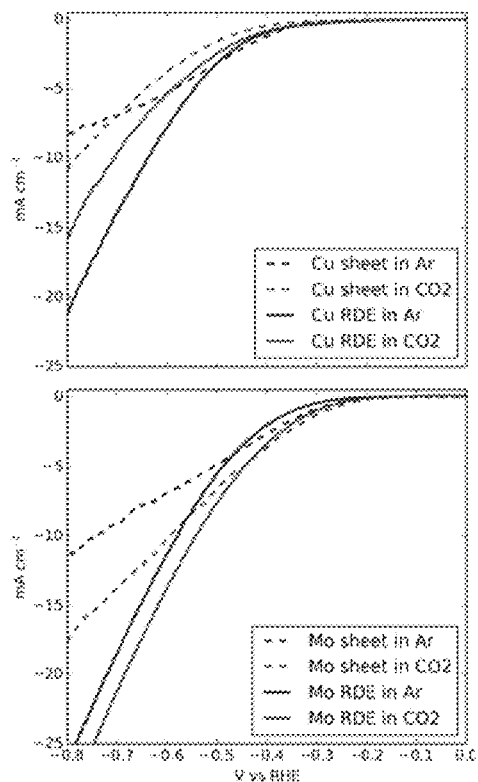
FIG. 56 shows the polarization curves of Cu sheet, Cu RDE, Mo sheet and Mo RDE in argon (blue) and red is in $CO_2$ (red)
Figure 57:
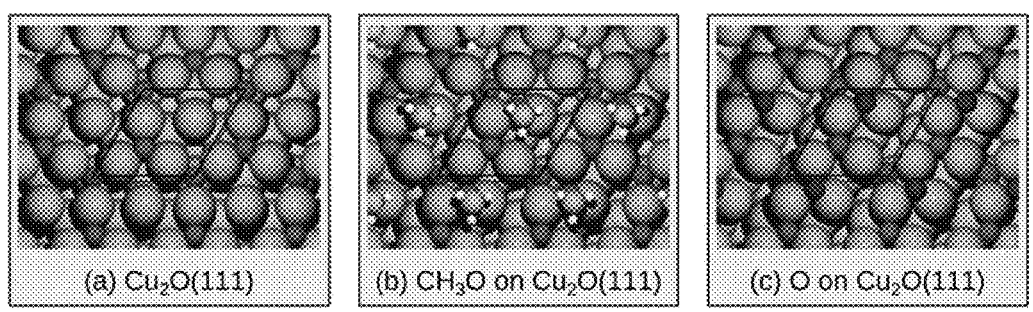
FIG. 57 shows top view of geometric configurations (a) without and with (b) $CH_3O$ or (c) O adsorbates on the bulk oxide terminated at the Cu2O(111) surface. Color scheme: C gray, O red, H white, Cu copper. The periodic unit cell is shown in black lines.
Figure 58:
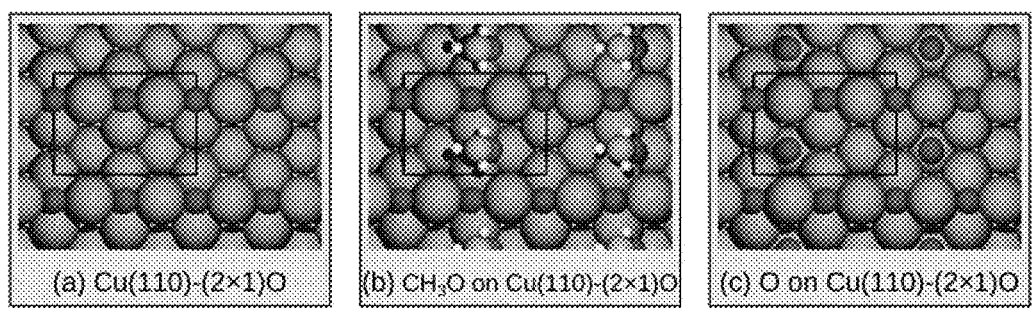
FIG. 58 shows top view of geometric configurations (a) without and with (b) CH3O or (c) O adsorbates on the surface oxide represented by Cu(110)-(2×1)O. Color scheme: C gray, O red, H white, Cu copper. The periodic unit cell is shown in black lines.
Figure 59:
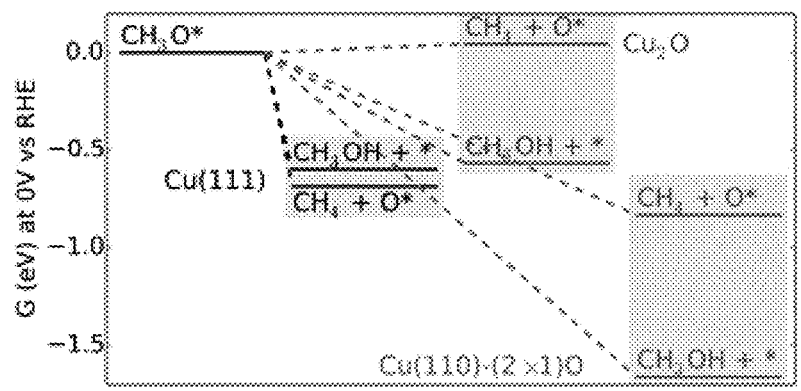
FIG. 59 shows free energy diagram of the electrochemical step from CH3O on Cu(111), Cu2O(111) and Cu(110)-(2×1)O. All data are plotted relative to the free energy of CH3O* for each surface. The step involves transfer of a proton and electron (H++e−) in the CHE model calculated at 0 V vs. RHE.
Figure 60:
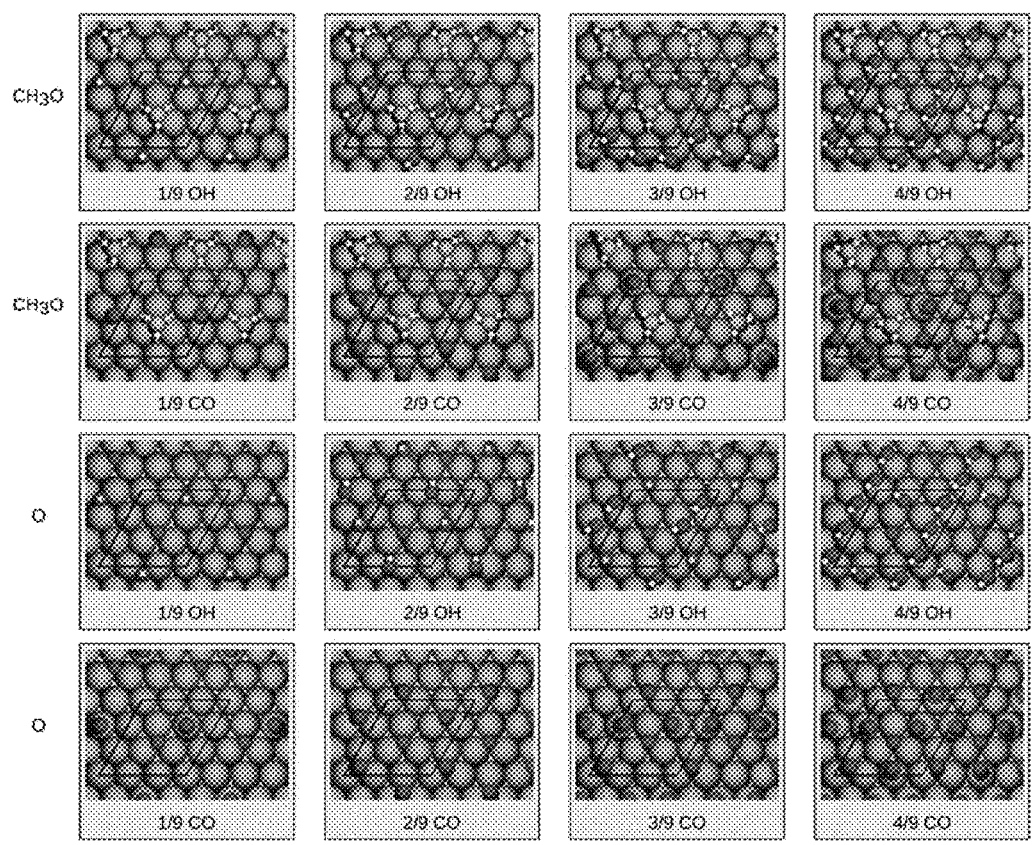
FIG. 60 shows top view of the geometric configurations of the Cu(111) surface with adsorbates CH3O or O and spectators OH or CO. Color scheme: C gray, O red, H white, Cu copper. The periodic unit cell is shown in black lines.
Figure 61:
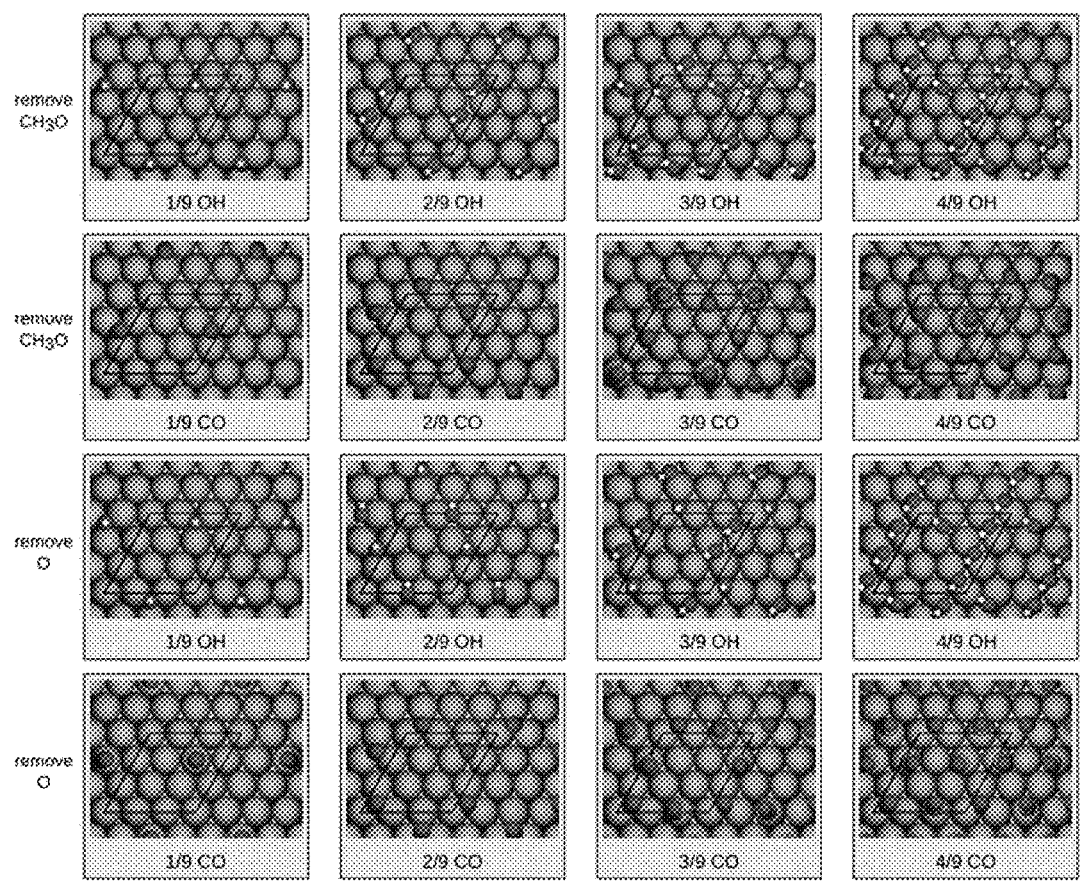
FIG. 61 shows top view of the geometric configurations of Cu(111) surface when adsorbate CH3O or O is removed. Color scheme: C gray, O red, H white, Cu copper. The periodic unit cell is shown in black lines.
Figure 62:
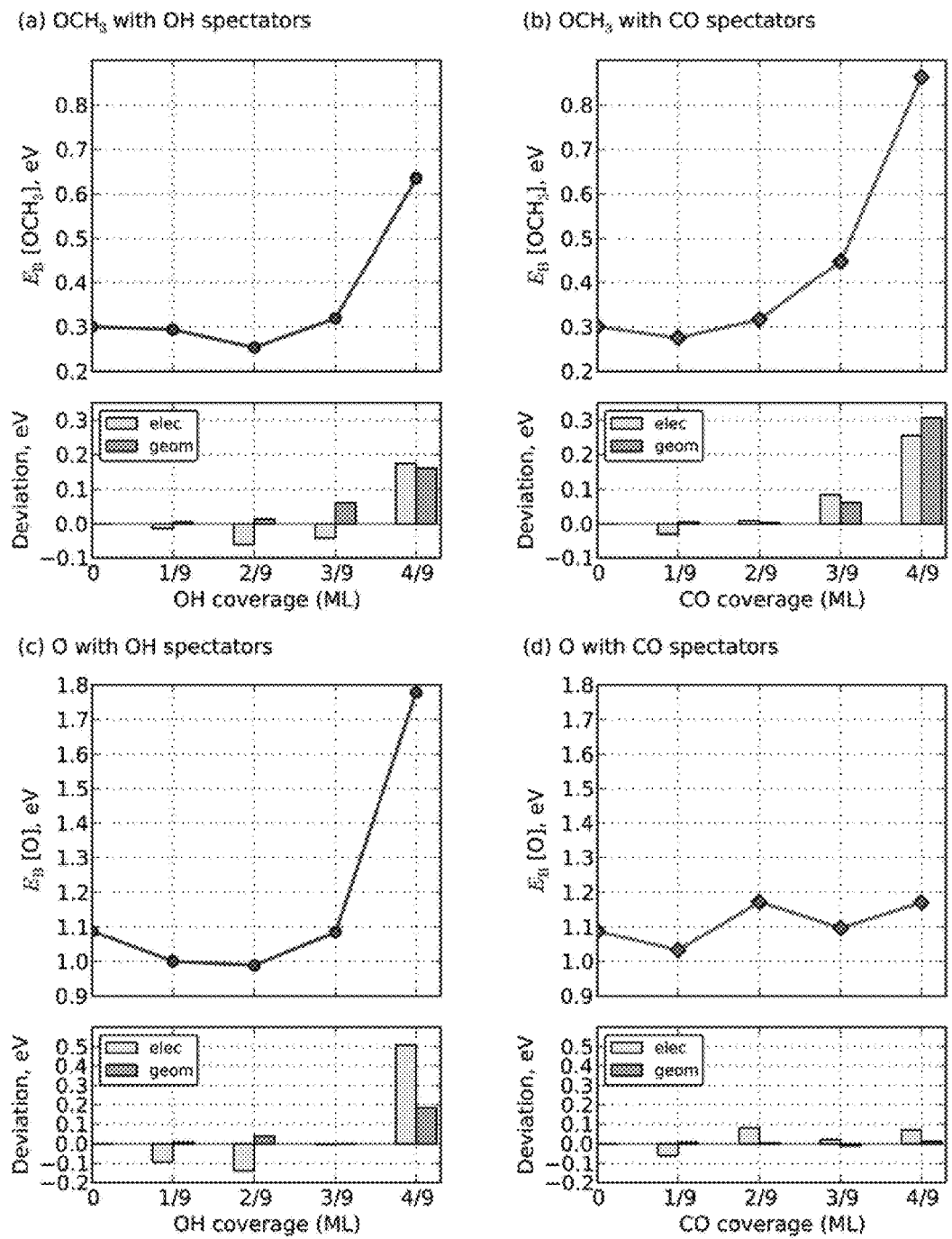
FIG. 62 shows binding energy of $CH_3O$ and O vs. the coverage, of OH or CO on Cu(111) surface. In the lower figures, the deviation of the energy from that in the absence of spectators is broken down into electronic ('elec') and geometric ('geom') effects, which sum to the difference between the binding energy at the specified spectator coverage and the binding energy without spectators. The electronic effect is the difference in binding energy when the adsorbate is removed without allowing the spectators to re-arrange; the geometric effect is the binding energy difference upon allowing for re-arrangement of the spectator species and the top surface layer.
Figure 63:
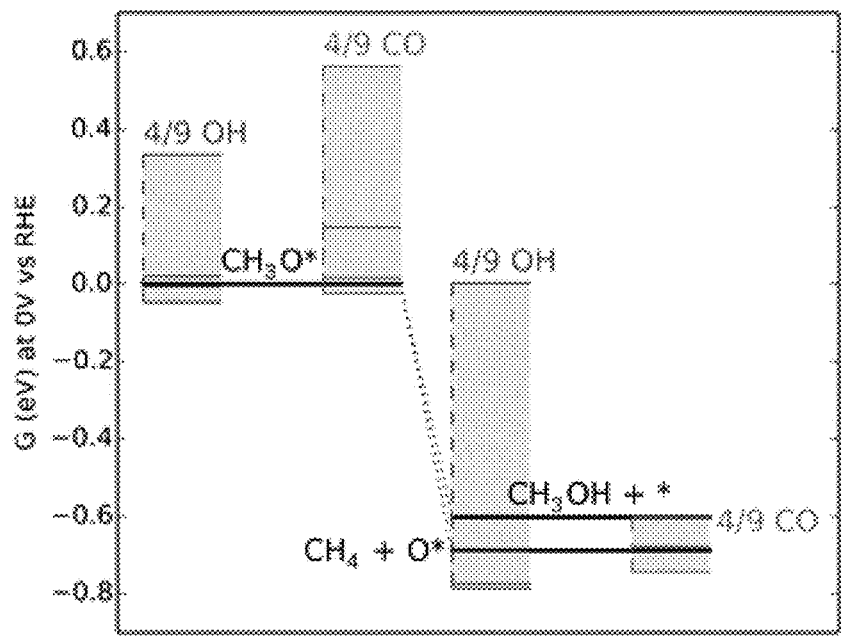
FIG. 63 shows Cu(111) surface coverage-dependent free energy diagram. Black lines are potential energies obtained on bare surface with no OH or CO spectator species; blue lines represent OH adsorbed; green lines represent CO adsorbed.
Figure 64:
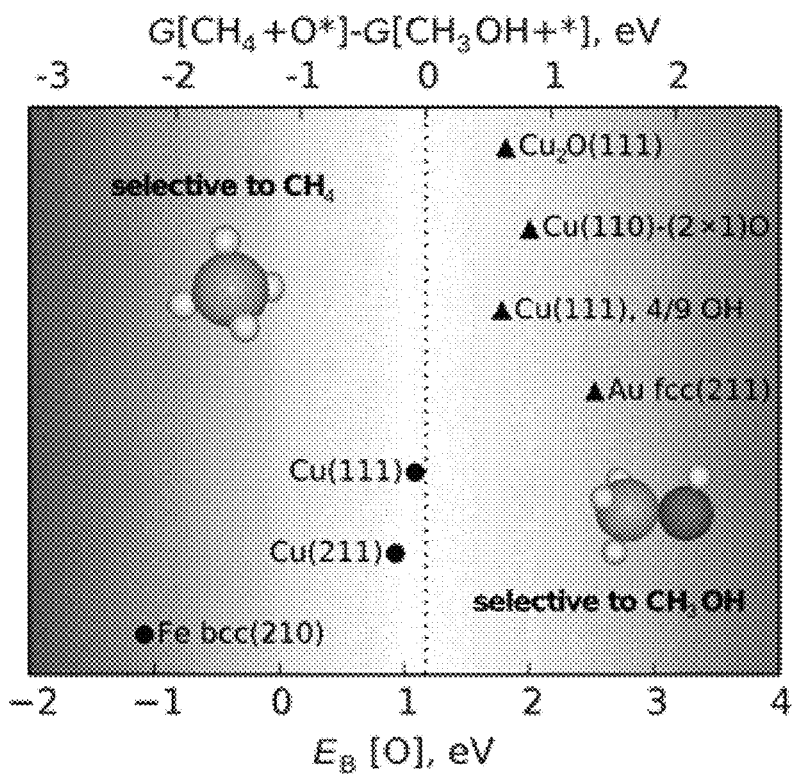
FIG. 64 shows oxygen binding energy as an activity descriptor for $CH_4/CH_3OH$ selectivity. Circle (●): selective to $CH_4$; triangle (▲): selective to $CH_3OH$. The dashed-line indicates the cutoff binding energy at which the thermodynamic selectivity of the elementary step changes between methane and methanol. Some $E_B[O]$ values come from literature: Cu(211), Fe bcc(210) and Au fcc(211). Experimental product observations have been reported by the following literature: reduced copper, copper oxides, Fe and Au.
Figure 65:
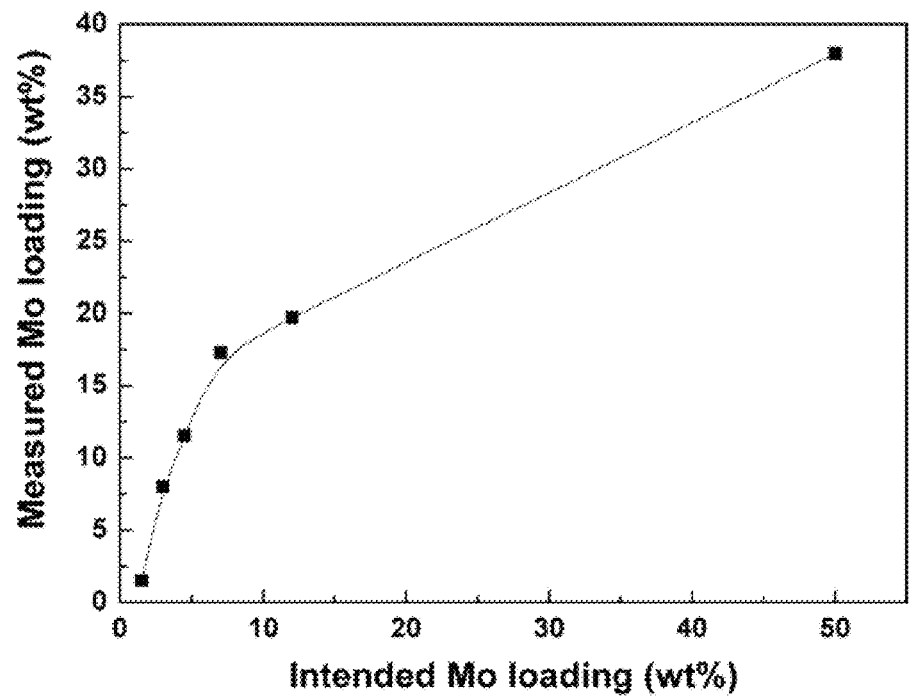
FIG. 65 shows measured amount of Mo deposited on the reduced graphene oxide versus intended amount.
Figure 66:
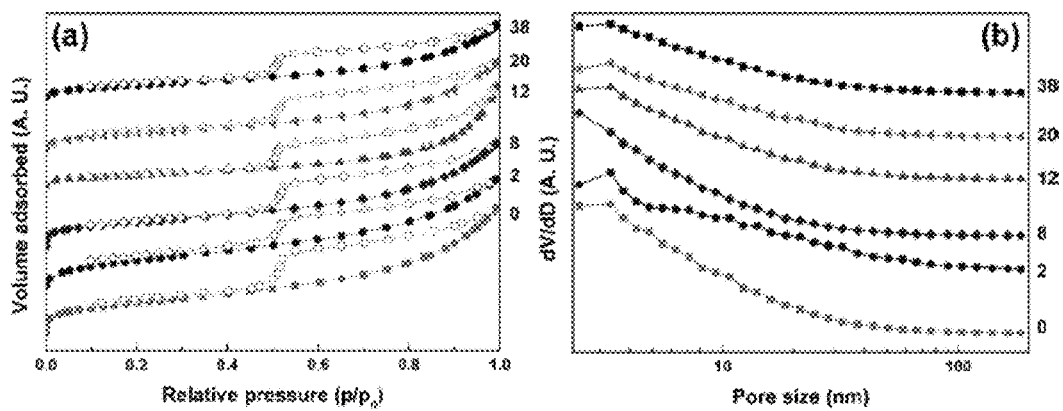
FIG. 66 shows (a) $N_2$ adsorption-desorption isotherm and (b) BJH pore size distribution of RGO-supported $Mo_2C$ catalysts. Numbers denote Mo wt %.
Figure 67:
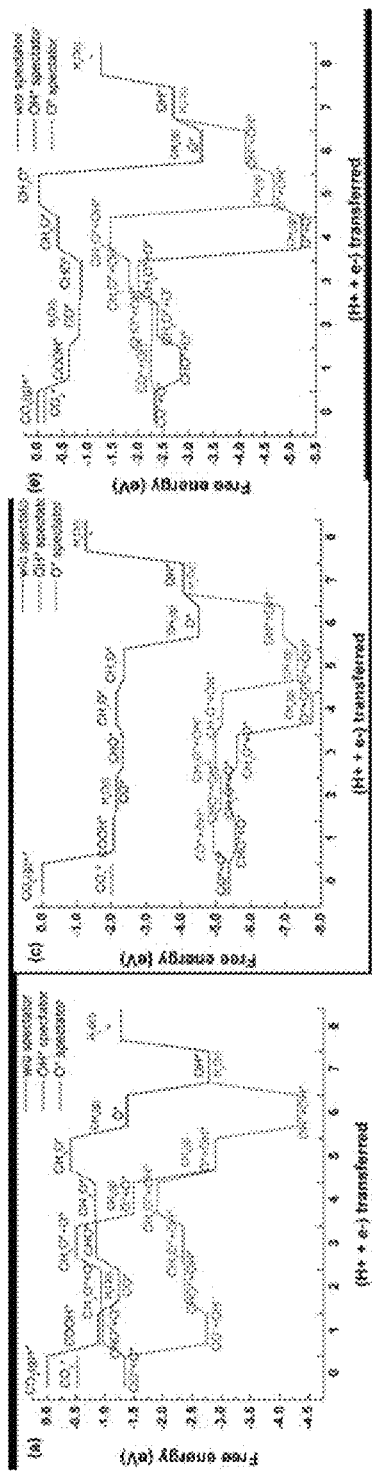
FIG. 67 shows free energy diagrams for the conversion of $CO_2$ to hydrocarbons.

Now referring to FIGS. 17-38, $Mo_2C$ powder and nanoparticles suspended in reduced graphene oxide were tested experimentally. Both systems had earlier onset in the $CO_2$ than in Ar (see FIG. 30). The nanoparticles also demonstrated high mass activity (see FIG. 31). For optimum catalyst surface exposure, $Mo_2C$ nanoparticles were embedded in reduced graphene oxide by the process depicted in FIG. 18. FIGS. 17, 19, and 21-23 are electron microscopy images of the $Mo_2C$ suspended in suspended in reduced graphene oxide.

$Mo_2C$/graphene nanocomposite is a hydrodeoxygenation catalyst for the production of diesel range hydrocarbons. Carbon-supported $Mo_2C$ nanoparticles were synthesized and used as catalysts for the deoxygenation of oleic acid and soybean oil to produce diesel-range hydrocarbons. Various carbon materials, such as reduced graphene oxide (RGO), glassy spherical carbon (SC), activated carbon (AC), and mesoporous carbon (MC), were used as supports to determine the effects of RGO in the deoxygenation reactions. The effects of the flow rate, Mo content of the catalyst, and the structure of the carbon support on the conversion and product selectivity were investigated. The morphology analysis revealed that Mo2C nanoparticles were well-dispersed onto the RGO ($Mo_2C$/RGO). Under moderate reaction condition (T=350° C., P=5.0 MPa, H2/oil ratio=4.5, LHSV=2 h−1), oleic acid was efficiently deoxygenated using the $Mo_2C$/RGO catalyst, which produced hydrocarbons with ≥85% yield and ≥90% hydrocarbon selectivity. This value was much higher than those obtained using the $Mo_2C$/SC, $Mo_2C$/AC, and $Mo_2C$/MC catalysts (yields=18.5-50.3%) under identical conditions. The higher catalytic activity of the RGO-supported catalyst originated from its large pore size, which facilitated transport of the reactants, and uniform deposition of the Mo2C nanoparticles on the RGO surface. Even over a short contact time (LHSV=8 h−1) and using natural triglyceride as a reactant, the $Mo_2C$/RGO catalyst exhibited ≥40% yield of hydrocarbons, whereas a commercial CoMoSx/Al2O3 catalyst produced ≤10% yield under identical conditions. The $Mo_2C$/RGO catalyst was highly selective toward C—O bond scission in the hydroxyl group, which produced water and hydrocarbons without truncating the carbon skeleton of the starting material. $Mo_2C$/RGO exhibited a prolonged catalyst lifetime for the deoxygenation of soybean oil (13% decrease in conversion after 6 h), compared with the commercial CoMoS/$Al_2O_3$ catalyst (42% decrease) (see FIG. 29).

The development of an efficient and economically viable process for the conversion of biomass into liquid hydrocarbons has been extensively studied because of the possibility of an eventual exhaustion of petroleum resources, the rapidly increasing demand for transportation, and to mitigate the emission of greenhouse gases. The catalytic deoxygenation of natural triglycerides to produce diesel-like hydrocarbons is the process closest to commercialization because of its potential application in the current petroleum refinery infrastructure. (1-3) Other advantages, such as the absence of metallic or acidic impurities, high energy density, and oxygen stability, have made renewable hydrocarbons, synthesized by deoxygenation of natural triglycerides, more amenable for replacing petroleum diesel, compared with the existing fatty acid esters that are obtained by transesterification. (4) Nevertheless, a number of drawbacks remain unresolved: excessive hydrogen consumption, harsh reaction conditions, rapid catalyst deactivation, and the environmentally hostile byproducts of sulfur-containing catalysts. (5) Therefore, considerable effort is being made to develop a highly active, reliable, and environmentally benign catalytic deoxygenation process that can produce a high yield of diesel-range hydrocarbons.

The most widely used catalysts for the deoxygenation of natural triglycerides are Mo-based sulfide catalysts (e.g., CoMoS/Al2O3 and NiMoS/Al2O3).(6-9) Although they exhibit a high deoxygenation activity, the use of a toxic sulfur source, such as H2S, is required to maintain their catalytic activity. (10) This eventually leads to the release of poisonous sulfur compounds into the environment. In this regard, various types of precious-metal catalysts, such as Ir, Ni, Pd, Pt, Rh, and Ru, which are supported on large-surface-area Al2O3, SiO2, or zeolites, have been extensively tested. These catalysts exhibited good deoxygenation activity without requiring the use of sulfides. (11-15) The advantage of using a precious-metal catalyst is the minimization of hydrogen consumption due to their predominant decarboxylation or decarbonylation activity, in which oxygen atoms are removed through the formation of $CO_2$ or CO, respectively. (16) However, the major drawbacks of the supported metal catalysts are numerous side-reactions, such as double-bond saturation, methanation, hydrocracking, and reverse water-gas shift reaction if the reaction conditions are not carefully optimized, and this often results in a decrease in the selectivity for the targeted hydrocarbons accompanied by unexpected hydrogen consumption. (14, 17) In addition, the high cost and scarcity of precious metals have prompted the development of new catalysts that consist of earth-abundant materials.

Among the catalysts recently developed for deoxygenation, $Mo_2C$ catalysts have shown potential usefulness because of their high activity of C—O bond scission and isomerization without causing an extensive saturation of the double bonds present in fatty acids. For example, Ren et al. found that porous Mo2C selectively converted C3 oxygenates into an unsaturated hydrocarbon, that is, propylene, even in a hydrogen-rich atmosphere (H2/reactant=10 mole fraction). (18) Han et al. synthesized $Mo_2C$ nanoparticles (NPs) supported by various carbon substrates, that is, activated carbon, carbon nanotubes, and ordered mesoporous carbon, for the hydrodeoxygenation of various natural triglycerides with a high selectivity for branched hydrocarbons (85-95% of the total hydrocarbon yield) in a hydrogen-rich atmosphere (H2/oil=120-720 mole fraction). (19-21) Although these and other developments in Mo2C catalysts (18-24) are invaluable, the roles of the Mo2C nanostructure, the supporting material, and their synergetic effect on the hydrodeoxygenation of natural triglycerides are still unclear, particularly with respect to the relative rates of individual reactions, including saturation, hydrodeoxygenation, and hydrocracking, etc.

Herein, $Mo_2C$ NPs supported on reduced graphene oxide (Mo2C/RGO) were synthesized via a supercritical alcohol route, and the synergetic effect of the Mo2C-graphene nanocomposite on the deoxygenation of triglycerides was systemically investigated using a continuous-flow fixed-bed reactor. Graphene has distinguished electrical, optical, and chemical properties (25, 26) and thus has been widely studied as a potential material for a broad range of applications, which include electronic devices, (27) optical devices, (28) hydrogen storage, (29-31) and Li+ ion storage. (32) In addition, the high theoretical specific surface area (~2600 m2/g) and the locally conjugated structure, which promotes surface adsorption, have made graphene a highly desirable material for catalytic applications. (33) However, graphene has not been explored as a support for hydrogenation or deoxygenation catalysts, with the exception of electro- or photocatalyst applications. To elucidate the beneficial effects of graphene as a support, the catalytic performance of Mo2C/RGO for the deoxygenation of oleic acid (OA, a probe molecule of triglycerides) was compared with Mo2C NPs supported by other carbon substrates, that is, activated carbon, AC; mesoporous carbon, MC; and glassy spherical carbon, SC. The effect of the space velocity of the reactants on the reaction intermediates was investigated to elucidate the reaction pathway of the deoxygenation of OA over the Mo2C/carbon catalysts. In addition, catalyst deactivation during the deoxygenation of a natural triglyceride, that is, soybean oil, using either Mo2C/RGO or a conventional CoMoS/Al2O3 catalyst, was examined in a continuous flow reactor to assess the practical applicability of the Mo2C/RGO nanocomposite.

The synthesis of the Mo2C/carbon catalysts was developed and optimized in the present study. The preparation method involved the following three sequential steps: (1) the oxidative treatment of the carbon surface, (2) the deposition of MoO2 NPs onto the carbon surface via the supercritical alcohol route, and (3) a carbothermal hydrogen reduction (CHR) to transform the MoO2 NPs into Mo2C NPs.

To prepare graphene oxide (GO), graphite powder (325 mesh, Sigma-Aldrich) was chemically exfoliated using a modified Hummer's method.(34, 35) Three other conventional carbon substrates (AC, particle size=150 μm, Sigma-Aldrich; SC, particle size=2-12 μm, Sigma-Aldrich; and MC, particle size <500 nm, Sigma-Aldrich) were oxidized in boiling concentrated nitric acid for 1 h. All the oxidized carbon supports were washed with distilled water until the filtrate was clear and had a neutral pH.

To simultaneously deposit MoO2 NPs and remove the oxygen functionalities on the carbon support surface, a calculated amount (0.025-0.50 g) of molybdenyl acetylacetonate (MoO2(acac)2, Sigma-Aldrich) was dissolved in 6 mL of 2-methyl-1-propanol (HPLC grade, Sigma-Aldrich). Subsequently, the oxidized carbon support (0.30 g) was dispersed in the MoO2(acac)2 solution using ultrasonication for 1 h to produce a suspension. The suspension was then introduced into an 11 mL Hastelloy C-276 reactor. After the reactor was sealed, it was immersed in a molten salt bath (KNO3/NaNO3/Ca(NO3)2, 46:24:30, w/w/w) that was held at a constant temperature of 400° C. for 30 min and subjected to horizontal shaking, which reduced the oxidized carbon substrates and transformed the $MoO_2(acac)_2$ into $MoO_2$. After the supercritical reaction was completed, the reactor was cooled to an ambient temperature by immersing it in a water bath. The MoO2/C suspension was centrifuged, washed, and filtered through a nylon filter paper (Pall Corp.) with methanol to remove soluble impurities and then vacuum-dried in an oven at 70° C. for 24 h.

The carburization step was conducted using a CHR method. The dried MoO2/C sample was heated in a tubular furnace, with a H2 flow rate of 50 mL/min, using a two-step heating ramp procedure. It was heated from ambient temperature to 450° C. at 5° C./min, and then to 650° C. at 1° C./min, where it was maintained for 2 h.

The CoMo/Al2O3 catalyst (2.8 wt % Co and 7.6 wt % Mo; BET surface area=246.1 m2/g) that was used for activity comparison was purchased from Strem Chemicals. Before it was used in the deoxygenation reaction, sulfurization was performed under flowing 15% H2S/H2 (v/v, flow rate=50 mL/min) at 400° C. for 2 h.

The activity of the catalysts for the deoxygenation of oleic acid (OA, >99%, Kanto Chemical) was evaluated at 350° C. under 5.0 MPa of H2 in a fixed-bed reactor (350 mm×7 mm id, volume=13.46 mL) containing 0.5 g of catalyst. The reaction condition was set to ensure sufficient hydrocarbon yield to investigate catalytic activity based on previous results. (36) The catalyst bed was located in the center of the reactor, and its volume was adjusted to 3.95 mL for each catalyst using inert SiC powder (400 mesh, Sigma-Aldrich). The catalyst was activated under flowing H2 at 400° C. for 1 h before the deoxygenation reaction. The liquid hourly space velocity (LHSV) of OA was varied from 2.0 to 8.0 h−1 to control the OA conversion, and the H2/OA molar ratio was fixed at 4.5. The reaction products were analyzed using an online GC (HP 7890, Agilent) equipped with a flame-ionization detector and a capillary column (DB-5, 30 m×0.25 mm id, 0.25 μm film thickness, Agilent).

To evaluate the catalyst activity for only the deoxygenation reaction, the hydrogen consumed through the hydrogenation of the hydrocarbon chains was excluded in the calculation of OA conversion (%), obtained by subtracting the sum of the amount of stearic acid (SA) and OA in the product stream from the amount of OA in the reactant stream using the following equation: where, ROA and POA are the moles of OA in the reactant and product, respectively, and PSA is the moles of SA in the product. We note that the saturation and hydrocracking reactions producing SA and fatty acids with smaller carbon chains, respectively, were negligible over the series of reactions conducted using the Mo2C catalysts.

The selectivity of product A, SA, is given by where PA is the moles of A in the product stream. The hydrocarbon (HC) yield was calculated using where SHC is the selectivity for hydrocarbons.

The catalytic activity for the deoxygenation of soybean oil (99.9%, MW: 876.38 g/mol, CJ Cheil Jedang Co.) was also tested using the reactor setup described previously. The LHSV for the soybean oil was 2.0 h−1 using a fixed H2/oil molar ratio of 30. The liquid product of this reaction was analyzed using a simulated distillation-GC (Arnel 3023, Clams 600, Perkin-Elmer) according to ASTM D-7213.(37) From the distillation profiles, the hydrotreating conversion was defined as the percentage of the heavy fraction of the feed that was converted into lighter products during the hydrotreatment: where reactant360+ and product360+ are the weight fractions of the components with boiling points greater than 360° C. in the feed and product, respectively.

The gasoline, jet fuel, and diesel selectivities were defined on the basis of their boiling point ranges: where reactantn-m and productn-m are the weight fractions of the components with boiling points between n and m° C. in the feed and product, respectively, that is, gasoline, 40-200° C.; jet fuel, 170-270° C.; and diesel, 180-360° C.

The amount of Mo deposited on the carbon substrates was measured using an inductively coupled plasma-atomic emission spectrometer (ICP-AES, PerkinElmer) after pretreatment with nitric acid at 90° C. for 12 h. X-ray photoelectron spectroscopy (XPS, PHI 5000 Versaprobe, ULVAC-PHI) was performed using monochromated Al Kα X-rays at 1486.6 eV under ultrahigh vacuum conditions. The survey and high-resolution scans were acquired with pass energies of 117.40 and 23.50 eV, respectively.

Figure 19:
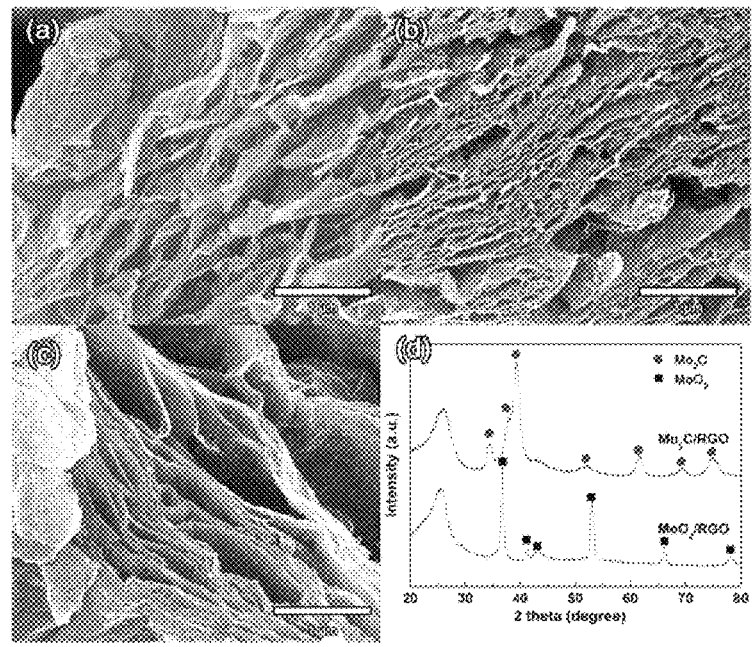
FIG. 19 shows a scanning electron microscope (SEM) images of (a) reduced graphene oxide (RGO), (b) 17 wt % MoO$_2$/RGO, (c) 17 wt % Mo$_2$C/RGO, and (d) the x-ray diffraction (XRD) patterns of 17 wt % MoO$_2$/RGO and 17 wt % Mo$_2$C/RGO.
Figure 20:
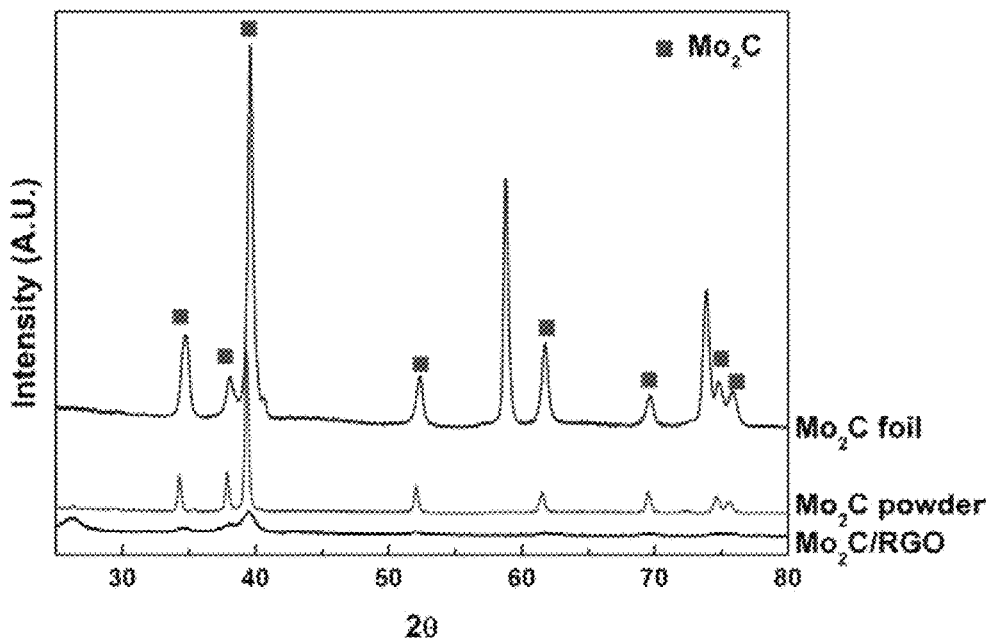
FIG. 20 shows an XRD patterns for Mo$_2$C foil, Mo$_2$C powder, and Mo$_2$C/RGO confirm the presence of Mo$_2$C in the foil, powder, and embedded in RGO by the characteristic peaks for Mo$_2$C at 2θ=34.3°, 37.7°, 39.4°, 52.2°, 61.6°, 69.2°, and 74.7°.
Figure 21:
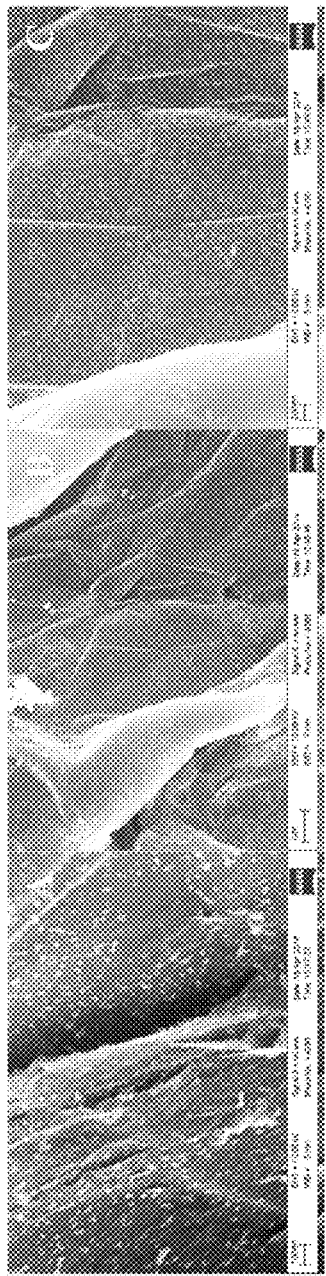
FIG. 21 shows SEM images of Mo$_2$C/RGO. The scale bars are as follows: A. 100 nm, B. 1 μm, and C. 200 nm.
Figure 22:
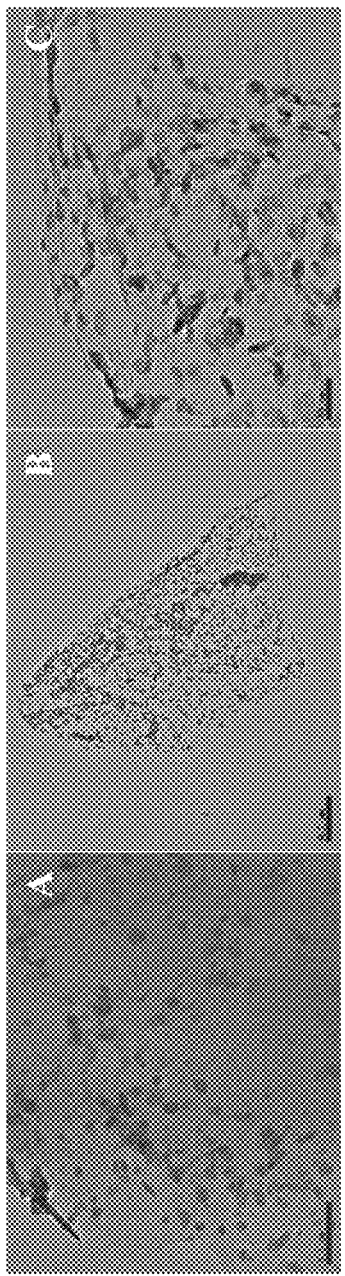
FIG. 22 shows high-resolution transmission electron microscope (HR-TEM) images of Mo$_2$C/RGO. The scale bars are as follows: A. 0.1 μm, B. 0.2 μm, and C. 50 nm.
Figure 23:
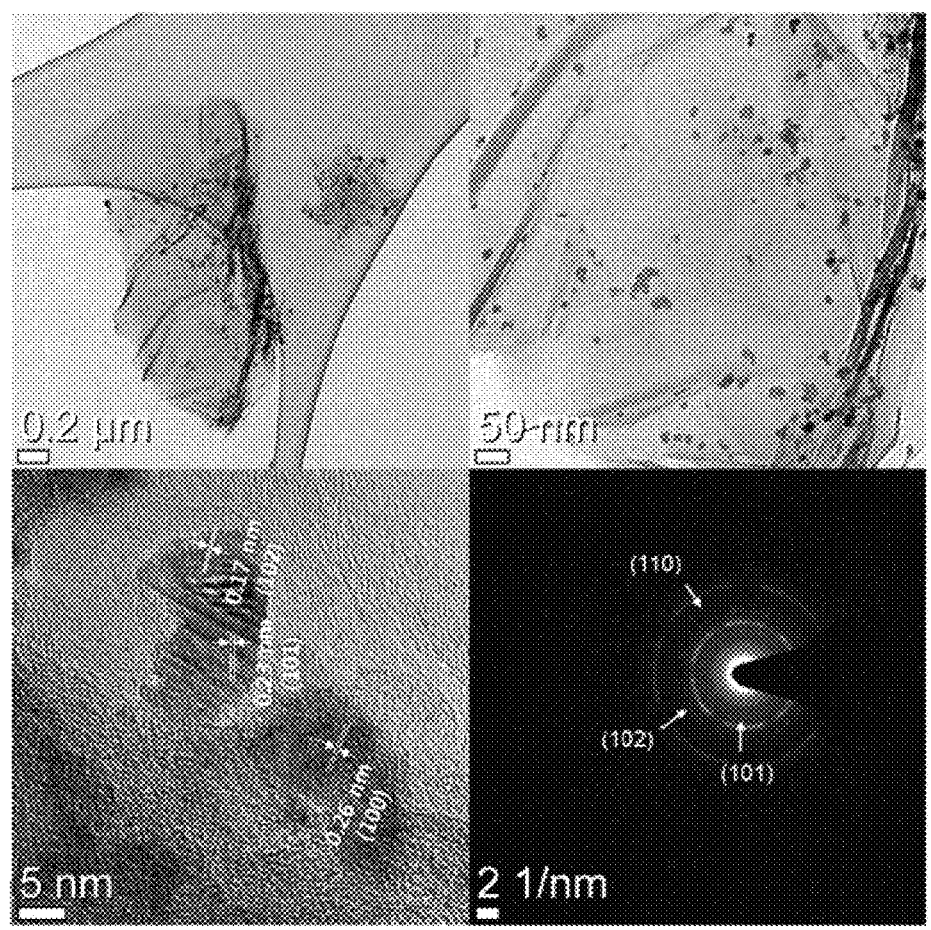
FIG. 23 shows HR-TEM images and the selective area diffraction pattern of 17 wt % Mo$_2$C/RGO.
Figure 24:
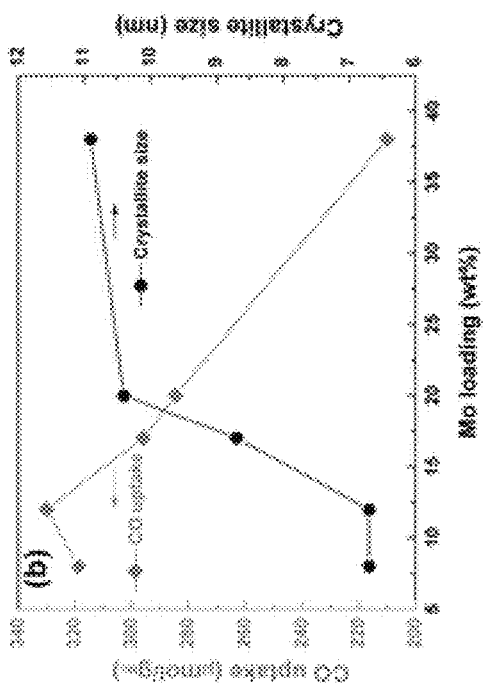
FIG. 24 shows Effect of Mo loading on (a) hydrocarbon (HC) yield at various space velocities (LHSV=2-8 h$^{-1}$) and (b) CO uptake (μmol/g$_{Mo}$) and crystallite size of Mo$_2$C (nm) calculated using XRD. Reaction conditions: T=350° C., P=5.0 MPa, and H$_2$/OA molar ratio=4.5. RGO, reduced graphene oxide.
Figure 24:
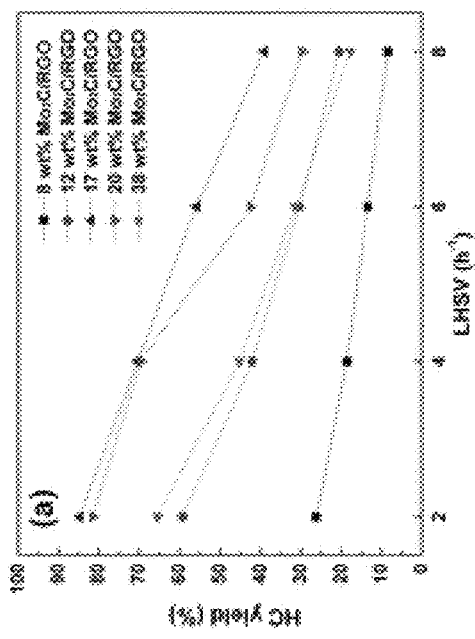
Figure 25:
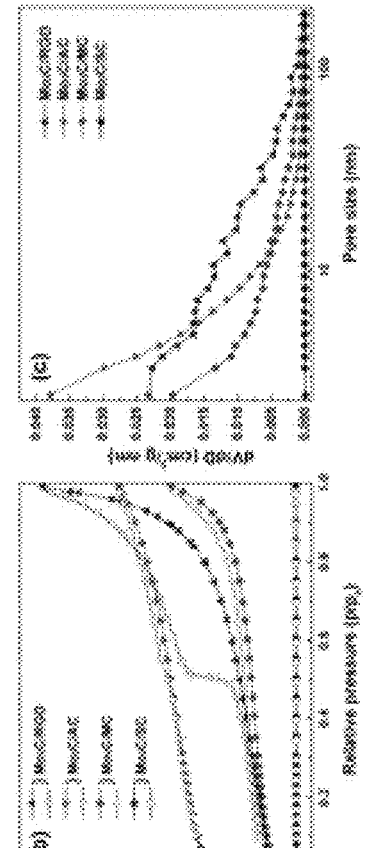
FIG. 25 shows effect of the carbon support on (a) hydrocarbon (HC) yield at various space velocities (LHSV=2-8 h$^{-1}$), (b) N$_2$ adsorption-desorption isotherm, and (c) BJH pore size distribution. Reaction conditions: T=350° C., P=5.0 MPa, and H$_2$/OA molar ratio=4.5. RGO, reduced graphene oxide; AC, activated carbon; MC, mesoporous carbon; and SC, spherical glassy carbon.
Figure 25:
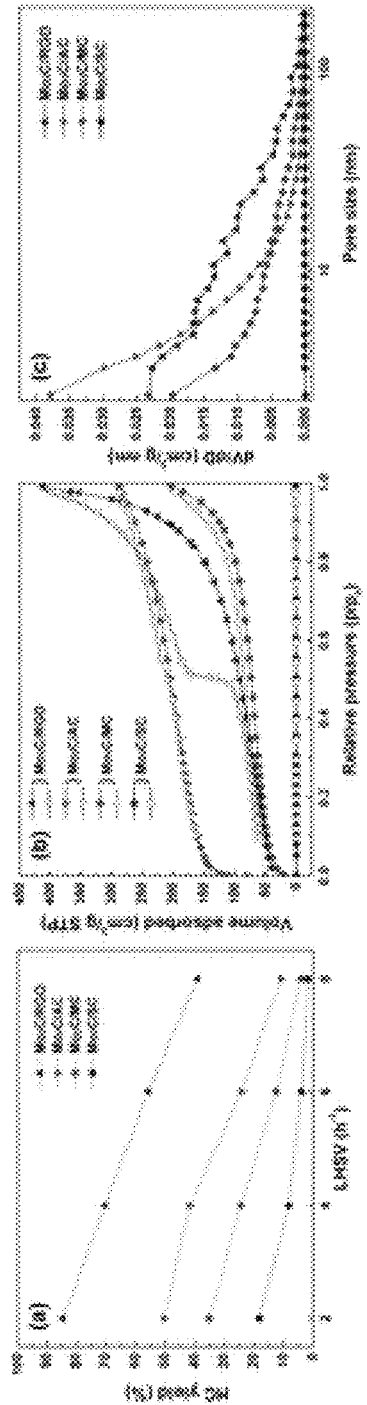
Figure 26:
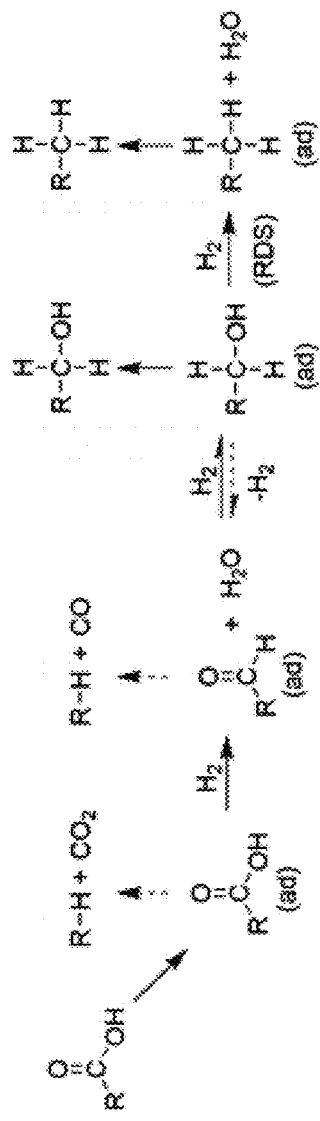
FIG. 26 shows proposed hydrodeoxygenation mechanism using carbon-supported Mo$_2$C catalysts. Adsorbed species are denoted as (ad). Unfavorable reactions are shown as dashed arrows.
Figure 27:
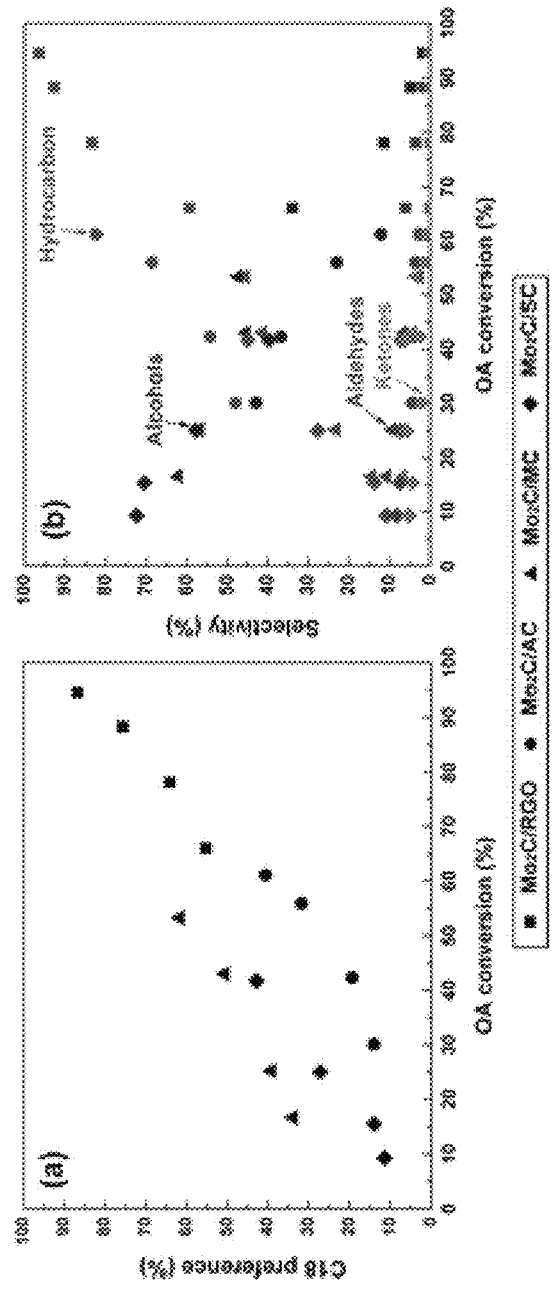
FIG. 27 shows (a) C18 preference (C18/(C17+C18)) vs oleic acid (OA) conversion. (b) Product selectivities versus OA conversion. RGO, reduced graphene oxide; AC, activated carbon; MC, mesoporous carbon; and SC, spherical glassy carbon.
Figure 28:
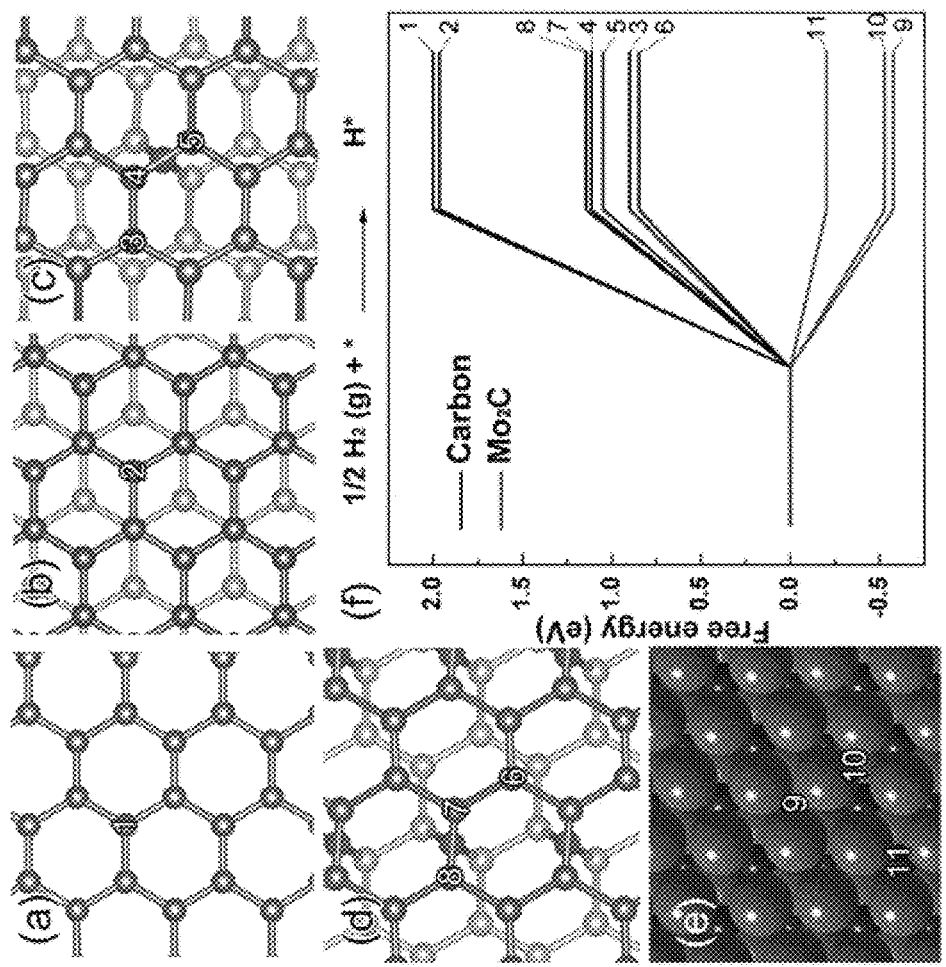
FIG. 28 shows adsorption sites for atomic hydrogen on (a) graphene, (b) graphite, (c) graphite with ⅛ ML C intercalated, (d) graphite with ¼ ML C intercalated, and (e) a Mo$_2$C (100) surface. The first (brown) and second (yellow) layers with intercalated carbon atoms (red) are presented for parts b-d. All structures were taken after relaxation. (f) Free energy of the dissociative adsorption of hydrogen on the corresponding sites at T=350° C. and P=5.0 MPa.
Figure 29:
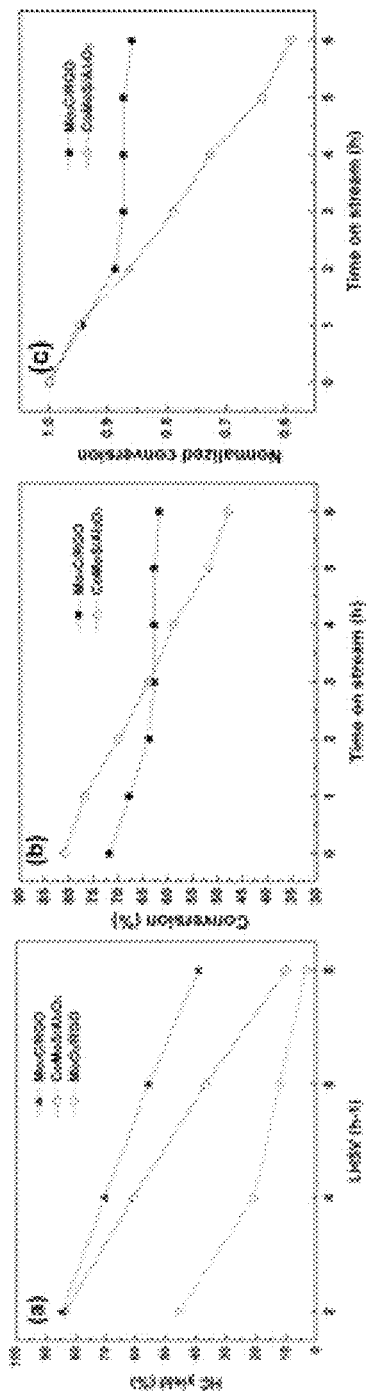
FIG. 29 shows (a) The hydrocarbon (HC) yield obtained using Mo$_2$C/RGO, CoMoS/Al$_2$O$_3$, and MoO$_2$/RGO. Reaction conditions: T=350° C., P=5.0 MPa, and H$_2$/OA molar ratio=4.5. (b) Hydrotreating conversion of soybean oil as a function of reaction time for Mo$_2$C/RGO and CoMoS/Al$_2$O$_3$. Reaction conditions: T=350° C., P=5.0 MPa, LHSV=2 h$^{-1}$, and H$_2$/soybean oil molar ratio=30.0. (c) Conversions normalized with initial value.

The structure and crystallite size of the $Mo_2C$/C catalysts were analyzed using powder X-ray diffraction patterns (XRD, D/Max-2500 V/PC, Rigaku) (see FIG. 19-20). The morphology of the catalysts was observed using a field emission scanning electron microscope (S-4100, Hitachi) and a high-resolution transmission electron microscope (HR-TEM, Tecnai-G2, FEI). For the HR-TEM measurements, the samples were dispersed in dimethylformamide using ultrasonication, and then dropped onto a copper grid with a perforated carbon film. The Brunauer-Emmett-Teller (BET) surface area, total pore volume (using N2 at P/P0=0.99), and the Barrett-Joyner-Halenda (BJH) pore-size distribution were measured using a Belsorp-mini II (BEL) apparatus.

The amount of CO adsorbed onto the catalyst surface was measured using a pulsed titration technique with a BEL-CAT-B catalyst analyzer (BEL) equipped with a thermal conductivity detector (TCD). A 0.05 g sample of the catalyst was pretreated under flowing H2 at 400° C. for 1 h and then cooled under flowing He. The flow rates for both the H2 and He in the pretreatment step were 25 mL/min. Afterward, CO (17 mmol) was injected every 10 min onto the sample catalyst at ambient temperature under a constant He flow rate of 40 mL/min until the saturation of the surface with CO was confirmed using the TCD. The data were processed to calculate the amount of CO adsorbed per gram of catalyst.

The calculation of the free energies for the dissociative adsorption of H2 onto the carbon and $Mo_2C$ (100) surfaces were performed using density functional theory (DFT) with a plane-wave basis set implemented in the Vienna ab initio simulation package(38, 39) with a kinetic cutoff energy of 350.0 eV. The interactions between the ions and electrons were modeled using projector-augmented wave potentials (40) with Perdew-Burke-Ernzerhof exchange-correlation functional (41) parametrization within a generalized gradient approximation. The Kohn-Sham equations were solved self-consistently using an iterative matrix diagonalization scheme. (42) The van der Waals interactions resulting from the dynamic correlations between fluctuating charge distributions were included in these calculations according to the DFT-D2 method, (43) within 35.0 Å of the cutoff radius for pair interactions. The global scaling factor and damping parameter were set to 0.75 and 20.0, respectively. The dispersion coefficient and van der Waals radii of C, H, and Mo were adopted from those used in the empirical force-field. (43) The convergence criterion for the electron density between the electronic steps was 1×10−4 eV for all calculations.

The surface structures for graphene and graphite models were generated on the basis of bulk graphite. The lattice parameter of bulk graphite was estimated to be 2.462 Å (C—C bond length=1.423 Å) with an interlayer distance of 3.160 Å. This value was lower than the real interlayer distance of 3.35 Å. This indicated that the DFT-D2 method has some degree of limitation when describing van der Waals interactions between carbon layers. Other carbon allotropes (sp2+sp3 hybridization), which contrast with graphene (sp2 hybridization only), were modeled by intercalating carbon atoms with ⅛ or ¼ monolayer (ML) between the graphite layers. This caused an expansion of the lattice constant from that of pure graphite to 2.523 and 2.563 Å, with reduced interlayer distances of 3.107 and 3.001 Å for ⅛ and ¼ ML, respectively. A 2×2 surface unit cell for graphene was used in the modeling. The graphene was modeled as a fully relaxed, single layer of graphite with a 12-Å vacuum. The graphite and the ⅛ ML and ¼ ML-carbon-intercalated graphites were modeled using slabs of four carbon layers separated by 12-Å vacuums. The top two layers were allowed to fully relax during the geometry optimization, whereas the bottom two layers were fixed at the theoretical bulk-terminated geometry. All calculations were performed using the Γ-centered Monkhorst-Pack grids of 8×8×1 for k-point sampling except those for the bulk calculations. The lattice constants obtained from the bulk α-Mo2C (orthorhombic, Pbcn) calculation were a=4.74, b=6.05, and c=5.22 Å, which were very close to the experimentally determined values (a=4.73, b=6.02, and c=5.20). (44) A metal-terminated α-Mo2C (100) slab (4×4×3 metal unit cell) with a periodic repetition was employed for the surface. The top two layers of the Mo2C slab were fully relaxed, whereas the bottom layer was fixed.

The resultant $MoO_2$/RGO nanocomposites were subjected to CHR, which converted the $MoO_2$ NPs into $Mo_2C$ NPs through the migration of carbon atoms from the RGO. (20) The scanning electron microscopy (SEM) images of RGO, $MoO_2$/RGO, and $Mo_2C$/RGO and the XRD patterns of $MoO_2$/RGO and $Mo_2C$/RGO. The XRD patterns confirmed that phase-pure MoO2 NPs (2θ=36.8°, 41.3°, 42.9°, 53.4°, 66.3°, and 78.4°) were formed during the supercritical alcohol reaction and that the MoO2 NPs were successfully transformed into $Mo_2C$ NPs (2θ=34.3°, 37.7°, 39.4°, 52.2°, 61.6°, 69.2°, and 74.7°) after the CHR. The crystallite sizes of $Mo_2C$ and $MoO_2$ NPs were calculated using the XRD patterns and the Scherrer equation. Interestingly, the $Mo_2C$ NPs had a smaller crystallite size (8.7 nm) than the $MoO_2$ NPs (17.1 nm), which might originate from individual particle reconstruction by replacement of lattice oxygen by carbon during the CHR. A reduction of the particle size during the transformation from $MoO_2$ to $Mo_2C$ was observed in the SEM images.

To investigate the effect of Mo content on the particle size and its accompanying catalytic activity, $Mo_2C$/RGO composites with varying Mo contents were prepared. The actual Mo deposition was up to 14 wt % higher than the intended amount because of weight loss from the substrate, which resulted from the removal of the oxygen functionalities present in GO. However, the actual Mo content was limited to 38 wt % for a 50 wt % $MoO_2(acac)_2$ suspension. In this case, the surface area of RGO might not be large enough to support such a large Mo content, which canceled out the effect of the oxygen removal.

$Mo_2C$ NPs were also deposited onto other carbon substrates, that is, SC, AC, and MC, using a similar procedure. Their actual Mo contents were adjusted to 17 wt % to compare to the optimum hydrocarbon yield obtained using $Mo_2C$/RGO (vide infra). In addition to their deposition on the carbon substrates, some degree of particle agglomeration was observed for the Mo2C NPs.

The BET surface area, CO chemisorption, and Mo2C crystallite size On the basis of a unit weight of the catalyst, the BET surface areas of Mo2C/RGO (m2/gcat) and the pore volume (cm3/gcat) decreased from 223.1 to 103.3 m2/g, and 0.81 to ~0.60 cm3/g, respectively, upon increasing the Mo content from 0 to 38 wt %. Because Mo2C is much denser than the carbon support, increasing the Mo content resulted in a lower surface area and pore volume. Thus, based on a unit weight of the support, the BET surface area (m2/gsupport), and the pore volume (cm3/gsupport) were re-estimated. This BET surface area decreased from 223.1 m2/gsupport to 160 m2/gsupport upon increasing the Mo content from 0 to 17 wt %. A further increase in the Mo content beyond 17 wt % did not result in an additional decrease in the BET surface area of the support. The total pore volume based on a unit weight of the support (cm3/gsupport) did not show a trend upon increasing the Mo content up to 20 wt %. However, when the Mo content further increased to 38 wt %, a large increase in the total pore volume (1.00 cm3/gsupport) was observed, which suggested an enlargement of the interlayer space wherein many Mo2C particles were inserted.

Although the active site of $Mo_2C$ for deoxygenation is not fully understood, previous studies using Mo2C NPs catalysts for hydrodesulfurization or hydrodenitrogenation showed that CO titration could be used to evaluate the surface exposure of Mo2C NPs. (48-50) The CO uptake for the Mo2C/RGO catalysts (μmol/gcat) increased from 1.7 to 79.8 μmol/gcat upon increasing the Mo content from 2 to 38 wt %. When the CO uptakes were re-estimated on the basis of the actual Mo content (μmol/gMo), the value increased from 85.0 to 330.0 μmol/g upon increasing the Mo content from 2 to 12 wt %, but it then decreased to 210 μmol/gMo upon further increasing the Mo content to 38 wt %. The crystallite size that was calculated from XRD pattern of the Mo2C increased from 6.7 to 10.9 nm upon increasing the Mo content from 8 to 38 wt %. The relationship between the particle size, CO uptake, and catalytic activity will be discussed in next section.

When other carbon supports were used to prepare the Mo2C/carbon catalysts, the crystallite size decreased in the following order: Mo2C/SC (25.0 nm)>Mo2C/AC (11.1 nm)>Mo2C/RGO (8.7 nm)>Mo2C/MC (4.7 nm) at identical Mo contents (17 wt %). The largest crystallite size, which was observed for Mo2C/SC, was due to the small surface area of the SC (1.03 m2 g−1) because heterogeneous nucleation of MoO2 on the surface of the substrate during the supercritical alcohol reaction was limited. A decrease in the BET surface area was observed after Mo2C content on the AC and MC supporting materials. The CO uptake on Mo2C/AC and Mo2C/MC was similar to that of the 17 wt % Mo2C/RGO, which implied that each catalyst might have similar active sites on the Mo2C NPs for the hydrodeoxygenation reaction. Thus, the differences in the catalytic activity of these three catalysts resulted from other factors, such as the physicochemical properties of the substrates.

The N2 adsorption-desorption isotherms were examined to elucidate the superior HC yield of the Mo2C/RGO catalyst. The shapes of the hysteresis loops indicated that Mo2C/RGO has a typical slit-like structure without rigid aggregates, whereas the AC- and MC-supported catalysts were composed of narrow slit pores that included micropores.(51) The pore size distributions also indicated the presence of a relatively larger portion of meso-to-macro pores with sizes in the range of 10-100 nm and a larger average pore size of 9.7 nm in the Mo2C/RGO catalyst when compared with Mo2C/AC and Mo2C/MC, which had average pore sizes of 1.4-2.7 nm). The other RGO-supported catalysts with various Mo loading (0-38 wt %) showed similar N2 adsorption-desorption isotherms and pore size distributions. The presence of larger pores might be responsible for the enhanced OA deoxygenation performance. The limit of the reaction rate within a porous catalyst is closely related to the size exclusion effect of the pore diameters. The large pore sizes of the Mo2C/RGO catalyst relative to OA molecules (with a molecular diameter of 0.8 nm) were expected to facilitate internal transport of the OA molecules. In contrast, the pore sizes of Mo2C/AC and Mo2C/MC are only 2-3 times larger than the size of OA, which might result in the reaction being limited by the diffusion of the reactants into the pores of the catalysts. Mass transfer limitation issues in the reactions of large molecules, such as triglycerides or fatty acids in which the activities and selectivities were significantly improved by using catalysts with larger pore diameters(52) or by employing supercritical fluid media to enhance the effective diffusivity of the reactant(5) have been previously reported.

Another plausible reason for the improved deoxygenation of OA when using the Mo2C/RGO catalyst might be the uniform distribution of the nanosized Mo2C particles onto the surface of the RGO. The GO, which was rich in oxygen functionalities, led to the uniform decoration of Mo2C nanoparticles onto the RGO surface by enhancing heterogeneous nucleation and growth, and therefore each Mo2C nanoparticle was readily accessible to perform the deoxygenation reaction. In contrast, the active sites of the micrometer-sized porous Mo2C aggregates on the AC and MC surfaces, which were formed in the fluid phase by a homogeneous nucleation and growth mechanism, might not be as widely accessible.

To understand the effect of the carbon substrates on the electronic structures of $MoO_2$ and Mo2C, which were supported by RGO, SC, AC, and MC, they were analyzed by XPS. After the CHR, all of the catalysts showed an increased intensity of the Mo2+ peaks because of the formation of Mo2C from MoO2. This result suggested that the electronic structure of the Mo2C/C catalysts was not affected by its carbon support structure.

The oxygen molecules present in OA could be removed by forming either carbon oxides (CO2 and CO) or H2O as reaction byproducts. The former two pathways are known as decarboxylation and decarbonylation, respectively, and are the result of C—C bond scission. The latter pathway is known as hydrodeoxygenation and is the result of C—O bond cleavage.(17) The hydrocarbons produced through the decarboxylation or decarbonylation of OA have a carbon chain length of 17 (C17), whereas those produced through hydrodeoxygenation have a carbon chain length of 18 (C18). Here, the ratio of C18/(C17+C18) of the hydrocarbons in the liquid product was designated as the "C18-preference" and was plotted versus the OA conversion when using the Mo2C/C catalysts. All of the catalysts showed a similar trend in that the C18-preference increased with OA conversion. These results suggested that decarboxylation or decarbonylation occurs to some extent under the condition that the OA conversion is low, but hydrodeoxygenation was preferred as the reaction proceeded to high OA conversion under the reaction conditions used herein, that is, 350° C., H2 pressure=5.0 MPa, and H2/OA=4.5. The alcohol species were determined to be the primary reaction intermediate, and the formation of alcohol showed a negative correlation with hydrocarbon production. A similar relationship between hydrocarbon and alcohol selectivity was observed for the other Mo2C catalysts.

Previous mechanistic studies on the metal-catalyzed deoxygenation of fatty acids in hydrogen-rich atmospheres revealed that the rapid hydrodeoxygenation of carboxylic acids (R—COOH) into their corresponding aldehydes (R—CHO) occurred in the initial stage of the reaction, which was followed by either decarbonylation induced by C—C bond scission (R—CHO→RH+CO), or further hydrogenation to the alcohol (R—CH2OH). (53, 54) For the Mo2C/C catalyst used herein, the initial hydrodeoxygenation to the aldehyde and its subsequent hydrogenation to the alcohol were rapid, as in the case of supported metal catalysts. However, the C—O bond of the alcohol then underwent another hydrodeoxygenation (R—CH3+H2O) rather than dehydrogenation to aldehyde followed by decarbonylation. The latter hydrodeoxygenation rate appeared to be slower than the former, which resulted in the accumulation of the intermediate alcohol (see Scheme 1). The observation of a faster C—O bond scission than C—C bond scission when using Mo2C catalysts was consistent with previous studies. (18, 55, 56)

To elucidate the effect of the carbon supports on the deoxygenation reaction, a series of DFT calculations were performed. Because hydrogen participates in the deoxygenation of OA, the free energies of the dissociative adsorption of hydrogen onto the surface of the catalysts were calculated using the assumption that the hydrogen absorption occurs within the reaction conditions used herein, that is, temperature=350° C. and pressure=5.0 MPa. We also assumed that the RGO was composed of only sp2-hybridized carbon atoms, whereas the other carbon allotropes also contained some sp3-hybridized carbon atoms. This assumption was supported by the XPS results of the GO and RGO as discussed in the previous section.

The dissociative adsorption of hydrogen onto graphene and graphite were endergonic processes (+1.9 eV). When carbon atoms were intercalated between graphite sheets with ⅛ and ¼ ML, the adsorption free energies were lower than those on the graphene and graphite (from +0.84 to +1.1 eV); however, this was still energetically implausible. The adsorption of hydrogen atoms on the three different Mo2C sites was much more energetically favorable, with free energies of −0.20, −0.52, and −0.57 eV. Therefore, under our reaction conditions, the dissociative adsorption of hydrogen over carbon-supported Mo2C catalysts should occur only on the Mo2C surfaces, not onto the carbon substrates, regardless of their structure.

Thus far, no prominent chemical properties of either the Mo2C or the carbon-support structure have been found that explain the superior performance of the Mo2C/RGO in the OA deoxygenation. The only meaningful difference between Mo2C/RGO and the other carbon-supported Mo2C catalysts was its larger pore size and unique slit-like structure, which allowed the effective transport of the large OA molecules, and its uniform distribution of nanoparticulate Mo2C. However, more structural characterizations, such as porosity and tortuosity, are required for quantitative investigation on the internal mass transfer limitation of Mo2C catalysts prepared in the present study.

The catalytic deoxygenation of a natural triglyceride, that is, soybean oil, over the MoO2/RGO and a commercial CoMo/Al2O3 catalyst was tested. The MoO2/RGO catalyst was prepared using the same method as the Mo2C/RGO catalyst but without the CHR step. The CoMo/Al2O3 catalyst was sulfurized to form CoMoSx/Al2O3 using H2S before the reaction. The MoO2/RGO catalyst had some deoxygenation activity, but it only resulted in low hydrocarbon yields of 45.7% and 20.8% at LHSVs of 2 and 4 h−1, respectively. The hydrocarbon yield of the CoMoSx/Al2O3 catalyst was similar to the Mo2C/RGO catalyst when the LSHV was 2 h−1; however, at higher LHSVs from 4 to 8 h−1, the HC yields from Mo2C/RGO were 9.5-29.0% greater than those of the CoMoSx/Al2O3 catalyst, which indicated that the Mo2C/RGO catalyst exhibited higher activities at higher space velocities.

The usual combustion process used for catalyst regeneration could not be applied to the used Mo2C/RGO because the carbonaceous RGO would also combust. Because the coke formed during the deoxygenation of the triglyceride is classified as "soft coke", which has a high hydrogen content, (57) alternative methods to the conventional combustion, which include the extraction of the coke species using supercritical fluids (58) or simple oxidation using strong .OH radicals, such as hydrogen peroxide, (59) could be used to recycle the Mo2C/RGO catalysts. Supercritical fluids, with or without an entrainer to enhance solubility, might be promising media for the removal of coke or coke precursors (or both) deposited onto the surface of used catalysts because of their low viscosity, zero surface tension, high diffusivity, and high solubility of organic species.

The RGO-supported Mo2C catalysts prepared herein exhibited hydrocarbon yields comparable to those of the other Mo2C catalysts, even though a significantly lower hydrogen/reactant molar ratio was used and solvents were not required. This might be because of the efficient transport of hydrogen and reactants from the fluid phase to the active sites of Mo2C within the RGO support.

Herein, Mo2C/RGO was synthesized using a supercritical alcohol route, which was followed by carbothermal hydrogen reduction. For the hydrodeoxygenation of oleic acid, the use of RGO as the catalyst support resulted in approximately 30-60% higher hydrocarbon yields when compared with other carbon materials under the identical reaction conditions (T=350° C., P=5.0 MPa, H2/OA molar ratio=4.5, LSHV=2 h−1). For the hydrodeoxygenation of soybean oil, the $Mo_2C$/RGO catalyst also exhibited an ~19.2% higher yield of hydrocarbons when compared with a commercial sulfurized CoMoSx/Al2O3 catalyst (under the same conditions as above except H2/oil molar ratio=30.0). The dominant mechanism for the deoxygenation of oleic acid over Mo2C/RGO was the selective C—O bond scission in the hydroxyl group, producing H2O as a byproduct, without a reduction of the carbon chain length by C—C bond cleavage. During the deoxygenation of soybean oil for 6 h, the $Mo_2C$/RGO catalyst exhibited only a 13% decrease in conversion, whereas the commercial sulfurized CoMoS/Al2O3 catalyst exhibited a 42% decrease in conversion. Physicochemical, morphological, and DFT analyses suggested that the higher hydrocarbon yields for the $Mo_2C$/RGO catalyst originated from the uniform distribution of active Mo2C nanoparticles on the support, and the efficient transport of reactants because of its large pore size with a unique slit-like structure, rather than the chemical (or electronic) properties of Mo2C or the hydrogen absorption on the carbon support.

Now referring to FIGS. 30-56, experimentally, the onset overpotentials of $Mo_2C$ is up to 200 mV lower than those for Cu for the $CH_4$ production at detection limit. Overpotentials were also lower than any standard transition metal. Calculations suggest that high coverage susceptibility is likely responsible for the actual activity of carbides for $H_2$ evolution (see FIG. 34-36). Unfortunately, when carbides are categorized based on their hydrogen evolution reaction (HER) effectiveness they sit on the left of the HER volcano. This suggests that hydrogen evolution can be enhanced by the large numbers of spectators present on the carbide surface. This may partially explain the higher $H_2$ evolution (despite low overpotentials for $CH_4$) and the steep Tafel slopes.

Metal carbide catalysts are alternative nonprecious electrode materials for electrochemical energy conversion devices, such as for $H_2$ fuel cells or electrolyzers. In this article, we report the experimental exchange current densities for the hydrogen evolution reaction (HER) on eight mono- and bimetallic carbide electrocatalysts and correlate the current densities to hydrogen binding energies that we have calculated via electronic structure computations. We find these materials to have activities higher than those of their parent metals and intermediate between the catalytic activities of the Pt group and early transition-metal surfaces. Increased HER activities on metal carbides relative to their parent metals can be understood with a 3-fold higher sensitivity of metal carbides to the coverage-induced weakening of hydrogen adsorption relative to metal surfaces. The trends presented here can be useful for the design of bimetallic carbide electrocatalysts.

The electrocatalytic hydrogen evolution reaction (HER), which is the reduction of aqueous protons by electrons passed through a catalyst to liberate H2, is central to many electrochemical processes. When the electrical energy required to drive the reaction is derived from renewable or carbon-neutral resources such as photovoltaic electricity, (1) H2 can serve as a carbon-neutral feedstock for the synthesis of ammonia, (2, 3) as a reducing source for the deoxygenation of biofuels, (4) or as a fuel source for hydrogen fuel cells (5-7) for automotive(8) or stationary applications. In other electrochemical applications, the HER is a major side reaction that affects the product selectivity in electrocatalytic $CO_2$ reduction (9, 10) or the local pH and the development of structural properties during metal electrodeposition. (11) The activity of an electrocatalytic surface to catalyze the HER, including monometallic surfaces and bimetallic metal overlayers, can be described by the strength of the hydrogen-surface bond; this has been shown in acidic (12, 13) and alkaline (14) electrolytes. A so-called volcano plot (15) can be produced by plotting the exchange current density (i0) for the HER versus the free energy of hydrogen adsorption ($\Delta G_B[H]$), yielding a peaked correlation with Pt or Pt-group composite materials at the top (12-14) at which hydrogen binds just strong enough to cover the surface but weak enough to facilitate desorption of the H2 reaction product. (16) Beyond single-metal electrocatalysts, certain non-noble metal compounds and binary transition-metal alloys have been reported to catalyze the HER. The electrocatalytic activity of $MoS_2$ in the HER has been demonstrated to arise from the presence of edge sites at the metal sulfide surface, placing it near the top of the volcano, (17, 18) while the activity of CuW alloys in catalyzing the HER and its reverse, the hydrogen oxidation reaction (HOR), is reportedly controlled by surface composition and surface coverage effects. (17-19) In this work, we studied metal carbide catalysts as alternative electrocatalysts for the HER and assessed the effect of hydrogen surface coverage on catalyst activity.

Certain carbides, such as those made from W and Mo, have been famously reported to exhibit catalytic activities that can be similar to that of Pt, especially for catalysis of the dissociation of H2 in the presence of $H_2O$ under ambient conditions (20) or catalysis of the HER. (21-23) However, the lack of a fundamental understanding of the catalytic activity of metal carbide surfaces has limited the rational design of carbide catalysts. In particular, the previously reported generally stronger hydrogen binding energies on transition-metal carbides (24-26) relative to those on their parent metals—which are already on the left, or strong-binding, side of the volcano for the HER—intuitively conflict with the enhanced activity for the HER on metal carbides.

The relation is between the exchange current density for the HER measured with steady-state polarization experiments and the free energy of the hydrogen adsorbate determined from electronic structure calculations for a large number of transition-metal carbides as well as boron carbide. It will be shown that metal carbide surfaces are more susceptible to coverage effects, i.e., a weakening of hydrogen bonding due to the presence of other hydrogen adsorbates, than pure metals, which correlates with increased exchange current densities for the HER on metal carbides relative to the parent metal. Generally, the activity of carbide catalysts in the HER to be intermediate between the low activities observed for early transition metals and the high activities observed for Pt-group metals. While this work focuses on the carbide electrocatalysts (27-30) for the HER, understanding hydrogen binding characteristics of metal carbide surfaces is useful in a variety of other catalytic processes, including CO2 or CO reduction, (27, 28, 31-33) the water-gas-shift reaction, (34) steam reforming of methane, (35) and Fischer-Tropsch synthesis. (36)

The binding strength of an adsorbate (A) at a surface can be calculated via electronic structure calculations and expressed as a binding energy, $\Delta E_B[A]$: (1) where E is the total electronic energy of a given geometric arrangement of atoms and E[A] is a suitably chosen reference energy, taken to be half the energy of $H_2$ gas in the case of a hydrogen adsorbate. This is in qualitative agreement with the previous work by Kitchin et al. (24) and does not change significantly when taking the closely packed fcc (111) or bcc(110) metal surface as a reference (Supporting Information). The deviation of $\Delta EB[H]$ on TiC(001) can be explained by the tendency of reactive metals such as the early transition metals to form thermodynamically stable metal bulk compounds with highly anisotropic surface reactivities. (37)

To include coverage effects over a range of surface reactivities, we selected four carbide surfaces in addition to B4C(111) and calculated the free energy of the hydrogen adsorption (i.e., $\Delta EB[H]$ corrected for entropy and zero-point energies as described in the Supporting Information) at ⅙ to ½ MLH. All energies are plotted at the reversible potential of the HER, such that the free energies per H atom (the chemical potential) of the initial and final states are zero. (40) An "ideal" catalyst would exhibit zero free energy change throughout the reaction.

With the exception of TiC(001), H adsorbs stronger to all studied metal carbide surfaces than to the transition-metal surfaces, which intuitively contradicts the reported activity of metal carbides for the HER. However, at increased hydrogen coverages, hydrogen binding on metal carbides becomes 3-fold weaker [from 0.08 eV on TiC(001) to 0.34 eV on Mo2C(101); average of 0.21 eV] than on metal surfaces [from 0.02 eV on Co(111) to 0.18 eV on Au(111); average of 0.07 eV]. This suggests the activity of metal carbides for the HER can be understood in terms of surface coverage, an effect that is well-known and for instance experimentally observed during the adsorption of CO on Ru(001). (41) We note the varying site preference of the H adsorbate on carbide surfaces indicates that the origin of these hydrogen binding characteristics is presumably of an electronic nature (rather than geometric), i.e., because of the interference of the additional adsorbates with the electronic states at the surface of the catalysts.

To correlate the catalytic activity of metal carbides with the hydrogen chemisorption energy, we measured the exchange current density for the HER on eight metal carbide electrodes. All carbide electrodes are either dense metal carbide sheets (purchased), TiC nanoparticles supported on carbon fiber paper, or metals with an at-minimum several-micrometer thick layer of a polycrystalline carbide, as indicated by X-ray diffraction (XRD) before and after abrasive surface treatment and scanning electron microscopy (SEM). The unsteady baseline of the XRD pattern is due to integration of the intensity count recorded with a two-dimensional goniometer that was arrested at three or four fixed detector angles. The exchange current density was determined from steady-state polarization experiments used for the construction of Tafel plots.

The values of i0 and $\Delta GB[H]$ for fcc(111) metals and bcc(110) Mo, W, Nb, (12, 14) and metal overlayers, (13) i0 for Fe(43) and Ti,(44) and $\Delta GB[H]$ for Fe(111)(39) and Ti(1122)(25) were compiled from the literature. To search for an approximate trend, the adsorption energies of fcc(211) Ni and Co (13, 26, 38, 39) were used to approximate $\Delta GB[H]$ for Ni/C and Co3C and the $\Delta GB[H]$ for CoWC was estimated as the arithmetic average of $\Delta GB[H]$ for Co(211) and WC(0001). The correlation shows that including the effect of surface coverage yields the expected increasing exchange current density for the HER with weakened hydrogen chemisorption energies on metal carbide surfaces, relative to that of the parent metal surface. Relative to that of the parent metal, a higher coverage of a metal carbide surface with hydrogen adsorbates is plausible given the stronger hydrogen binding of the bare carbide surfaces relative to that of the bare parent metal surfaces. Generally, the activity of metal carbides for catalyzing the HER is intermediate between the low activities exhibited by early transition metals and the maximal activities inherent in Pt and Pt-group metal compounds. For the reverse reaction, we note it is conceivable that metal carbide surfaces are covered with oxygen adatoms (25) under the electrochemical conditions of the HOR that may alter their catalytic activity. (19) Determining the exchange current density of metal carbide electrodes for the HOR in the future would provide insight into the effect of oxygen adatoms on the catalytic activity of metal carbide electro catalysts.

While this analysis explains general trends in the reactivity of metal carbide surfaces, given the oxophilic nature of these materials (25) a better correlation of experiment and theory may be obtained when including hydroxyl co-adsorbates (from H2O cleavage) (12) in the calculation of $\Delta GB[H]$ because these may be expected to be present at the cathode surface under the studied conditions. Also, the data for the HER catalyzed by metal surfaces in alkaline electrolytes suggest that the overall trend is not significantly altered by the pH of the electrolyte. (14) This can be understood in terms of the adsorption energy scaling (e.g., of OH and H adsorbates) on transition-metal surfaces (38) that have been shown to apply in modified form for metal carbide surfaces, as well (25) (OH/H adsorption energy scaling on metal carbides is shown in the Supporting Information). Thus, independent of the mechanistic details of the HER at the metal carbide surface, the hydrogen chemisorption energy is found to be a useful and single descriptor of the HER on carbide catalysts if the coverage-dependent weakening of hydrogen chemisorption energies is being taken into account.

This work shows that the catalytic activity of monometallic carbide surfaces for the HER is intermediate between the low activities exhibited by early transition metals and the maximal activities inherent in Pt and Pt-group metal compounds. The exchange current density for the HER on metal carbides can be described with the energy of binding of hydrogen to the catalyst surface. Increased HER activities on carbide catalysts relative to their parent metals can be understood with a 3-fold higher sensitivity of metal carbide surfaces to the weakening of hydrogen adsorption due to surface coverage effects relative to transition-metal surfaces. These trends can be potentially useful for the design and understanding of bimetallic carbide electrocatalysts for various electrochemical applications in which the hydrogen evolution-oxidation reactions should be enhanced or suppressed.

Full details of the synthesis and preparation of the carbide electrodes and measuring H+ reduction activities are given in the Supporting Information. Fe3C, Co3C, Ni/C, Mo2C, and WC were synthesized via decomposition of CO, CH4, or C6H14 over metal precursors at 330-1000 K (Mini-Mite Tube Furnace, Lindberg Blue M), following procedures similar to those described in the literature. (45-49) The metal carbides were characterized (only Ni and graphite for Ni/C) with X-ray diffraction (XRD) and grazing incidence X-ray diffraction (GID) (Cu Kα radiation, 2θ range of 20-80°, scan rate of 1°/min, 3° GI angle, D8 Discover, Bruker), energy-dispersive X-ray spectroscopy (EDX), and scanning electron microscopy (SEM) on a LEO 1530 VP Gemini (Zeiss) instrument.

The carbide electrodes were assembled from carbide sheets (as-purchased, as-synthesized, or abrasively polished) or TiC nanoparticle (NP)/Nafion ink dried on carbon fiber paper. (50) Cyclic voltammograms and steady-state polarization curves were recorded using a one-chamber voltammetry cell (99.99% Pt counter and single junction Ag/AgCl reference electrodes) with 0.05 M K2CO3 (pH 11.3, 19±1° C.). Ar (9.0±0.9 mLSTP min−1) was used as purge gas analyzed via gas chromatography. No gaseous products (e.g., from conceivable carbide decomposition) other than H2 and O2 were detected. Electrochemically polished (at 2 V in 85% H3PO4)(51) polycrystalline Cu was used for reference measurements, which yielded a log[i0/(A cm−2)] value of −5.8±0.3, in agreement with the value of −5.8±0.2 reported previously for the HER on Cu in an alkaline electrolyte.(14) Voltages are converted to versus RHE and corrected for the uncompensated solution resistance.

Fe (99.9%), Co (99.95%), Ni (99.9%), Mo (99.98%), and W (99.98%) sheets were obtained from ESPI Metals. Cu (99.98%) sheets were obtained from Sigma-Aldrich. B4C sheets (99.5%, Ceradyne, Inc.), CoWC rods (10% Co, 90% WC, Ultra Carbide, Inc.), and TiC NPs (40 nm, 99%, Nanostructured & Amorphous Materials, Inc.) were gifts or were obtained commercially (purity given on a trace-metal basis). Gases for GC calibration, purge gas, or carbide synthesis were H2 (500 ppm), CH4 (500 ppm), C2H4 (100 ppm), CO (500 ppm), and CO2 (300 ppm), all by mole and diluted in air (BS Technical Service), 15 ppm by mole of various hydrocarbons in N2 (23470-U, Sigma-Aldrich), 60 mol % CO in N2 (MESA Specialty Gases & Equipment), and H2 (5 N), He (5 N), CH4 (3.7 N), CO (4 N), CO2 (5 N), Ar (5 N), and 1 vol % UHP O2 in N2 (Corp Brothers, Inc.). Acetone (99.7%), hexanes (99.9%), and a 5% aqueous Nafion solution (Ion Power LQ1150) were from Fisher Scientific. 2-Propanol (99.96%) was from Pharmco-Aaper. CH3OH (99.8%), H3PO4 (85%), and NaOH (98.7%) were from Macron Fine Chemicals. K2CO3.1.5H2O (98.5%) was from Acros Organics. The aqueous KCl solution (4 M) was from LabChem, Inc. H2O was deionized (>18.2 MΩ cm and <5 ppb total organic carbon) and degassed (Direct 16, Millipore).

Computational details are given in-depth elsewhere(25) and in the Supporting Information. Surface calculations on periodic facets of rhombohedral B4C, cubic TiC, (spin-polarized) orthorhombic Fe3C, orthorhombic Mo2C, cubic TaC, and hexagonal WC (the phases with dominant XRD and GID signals) were conducted via density functional theory employing the planewave pseudopotential electronic structure code DACAPO in the ASE environment. (52-56) Exchange correlation interactions were treated with the revised Perdew-Burke-Ernzerhof functional of Hammer, Hansen, and Nørskov. (57)

Now referring to FIGS. 39-64, according to calculations, catalytic surfaces can be expected to be predominantly covered in CO during $CO_2$ reduction. A global optimization technique was developed to automate these high-coverage calculations. CO has also been shown to limit HER.

The lowest energy configurations are shown on the Cu (111) surface with H adsorbates and neighboring CO spectators. A weakening of hydrogen adsorption energy of around 0.1 eV this corresponds nicely to the ~0.1 V shift observed by Hori. Rotating disk electrode (RDE) voltammetry experiments were performed with Cu and Mo electrodes suggesting an additional reason that Cu exhibits selectivity in $CO_2$ reduction because it sits on the right-hand side of the hydrogen evolution reaction (HER) volcano. In this situation, Cu electrode poisoning is desired. Therefore, for HER/HOR fuel cell or electrolysis catalysts one may give up on studiously avoiding poisons, and even consider deliberately poisoning. Higher area electrodes confirm the products are largely $H_2$ at the onset (separation) potentials.

The well-known hydrogen evolution reaction (HER) volcano plot describes the relationship between H binding energy and the corresponding hydrogen evolution catalytic activity, which depends on the species of metal. Under CO2/CO reduction conditions or in cases where CO impurities enter electrodes, the catalyst may exist under a high coverage of coadsorbed CO. We present DFT calculations that suggest that coadsorbed CO during hydrogen evolution will weaken the binding strength between H and the catalyst surface. For metals on the right-hand side (too weak of hydrogen binding) this should lead to a suppression of the HER, as has been reported for metals such as Cu and Pt. However, for metals on the left-hand side of the volcano (too strong of hydrogen binding), this may actually enhance the kinetics of the hydrogen evolution reaction, although this effect will be countered by a decreased availability of sites for HER, which are blocked by CO. We performed experiments in Ar and CO2 environments of two representative metals that bind CO on the far right- and left-hand side of the volcano, namely, Cu and Mo (respectively). On Cu, we find that the CO2 environment suppresses HER, which is consistent with previous findings. However, on Mo we find that the CO2 environment enhances HER in the kinetically active region. This helps to explain the outstanding performance of copper in CO2 reduction and suggests that searches for high-selectivity CO2/CO reduction catalysts may benefit from focusing on the right-hand side of the HER volcano. This also suggests principles for assessing the activity of catalysts for fuel cell and electrolysis reactions in which impurities such as CO may be present.

Electrocatalytic reactions are seen as a key technology for the energy industry, as they allow for the interconversion of chemical and electrical energy. Two key electrocatalytic reactions that can convert electrical energy into stored chemical energy are the hydrogen evolution reaction (HER) and the electrochemical reduction of CO2. The HER continues to attract attention for many reasons. In areas where the production of hydrogen gas is desired—such as for direct fuel usage in fuel cells or rockets, or as a feedstock for Fischer-Tropsch synthesis, Haber-Bosch ammonia synthesis, or biomass hydrodeoxygenation—robust, efficient catalysts for the production of hydrogen would help to enable these processes to switch from fossil-derived H2 to renewable H2.(1, 2) However, in some desired aqueous electrochemical processes, such as the electrocatalytic reduction of CO2 or the electrochemical synthesis of NH3, HER is competitive with the desired electrochemical reaction. Key products of CO2 reduction have equilibrium potentials close to that of hydrogen evolution, for example, −0.10 V for CO and +0.08 V for C2H4 (both reported versus reversible hydrogen electrode, RHE, which is the equilibrium potential for HER). This suggests that adjusting the reaction thermodynamics with voltage will have limited effects on tuning the selectivity, and instead catalytic selectivity must be employed. It is challenging to control the catalytic activity for these reactions, and this requires a better understanding of the catalytic mechanism in a practical environment.

From an atomic-scale perspective, HER on a transition metal surface is considered to proceed via an adsorbed H atom intermediate by some combination of Volmer, Heyrovsky, and Tafel steps, as shown for the two series below: (3-5) (1) (2) where * represents a vacant site on the surface, and H* represents a surface-bound hydrogen. In either reaction sequence, the single adsorbate of interest is a bound hydrogen atom, which suggests the binding strength of H to a catalyst surface will be a key predictor of performance.

Well before density functional theory (DFT) calculations were available to predict hydrogen bonding strength to surfaces, a volcano-shaped relation was suggested between the experimentally observed HER catalytic ability and the measured hydrogen adsorption heat; (6-8) in recent years, this was confirmed to be related to the strength of hydrogen bonding to the catalyst surface as calculated with electronic structure methods. (9-11) In the later works, DFT was employed to calculate the chemisorption energies on a variety of metals and relate it to the HER exchange current density from experiment. The correlation shows a "volcano plot" with Pt near the peak region where the H adsorption free energy is close to zero. This relationship can be explained by the Sabatier principle, which states that the interaction between a catalyst and the reaction intermediates should be "not too strong" and "not too weak" in order to give the best performance. In the case of HER, if H adsorbs to a surface too strongly, desorption steps will be slowed; if the adsorption is too weak, the energetics of forming the intermediate are difficult, which in either case results in a high overpotential requirement. This makes the binding strength of hydrogen a simple, useful descriptor of catalytic HER activity.

In addition to the catalyst composition and structure, the binding energy of a molecule on a metal surface is affected by the local surface environment. A well-known experiment carried out by Hori and co-workers (12) showed that with copper electrodes, a delay in the hydrogen evolution onset potential is evident when the atmosphere is changed from Ar to either CO or CO2, which can be attributed to CO "poisoning" of the catalyst surface. (We note that we use the term "poisoning" to indicate a degradation in catalyst performance, not a complete elimination of catalyst activity.) Because both CO2 and CO lead to the delayed onset of HER, this is in agreement with many experimental and theoretical studies that suggest that CO is the primary intermediate in CO2 electroreduction; (13-20) in other words, it is the presence of coadsorbed CO on an electrode surface during HER that delays hydrogen evolution activity. CO has been known to poison fuel cell electrodes and oxygen reduction materials by adsorbing to reactive sites. (21-26) However, in some reactions, CO can act as a promoter as well: for example, it has been suggested to facilitate the coadsorption of OH on a gold surface, leading to enhanced CO self-oxidation. (27) CO also promotes methanol oxidation on gold which has been suggested to be due to enhanced C—H bond breaking (28) Additionally, the decomposition of ethylene on an iron catalyst has been shown to be promoted by adsorbed CO, which has been attributed to CO-induced surface reconstruction. (29)

We hypothesized that the presence of coadsorbed CO will have two predominant effects on the HER activity of a metal catalyst: (1) it will weaken the binding energy of hydrogen, and thus change the exposed surface's inherent HER activity, and (2) it will block active sites, resulting in a lower portion of the catalyst surface available for HER. The former effect could either promote or poison HER, whereas the latter should only act to poison HER. We can therefore expect a material such as Cu—which sits on the right side of the HER volcano—to exhibit decreased HER activity during the process of CO2 electroreduction, as both effects act to decrease its activity. However, materials on the left-hand side of the HER volcano may exhibit a more nuanced response, with the two effects competing. Recently, Shi et al. (30) calculated just such a weakening in the hydrogen binding energy at high CO coverages on Pt (111) and showed that this delay was consistent with experimentally observed delays in onset potentials observed for HER on Pt electrodes under CO2 reduction conditions. They also speculated that the peak of the volcano would "shift" toward more reactive metals under high coverage conditions. Therefore, it would be interesting to understand how the CO coverage can affect the H binding energy on representative metal surfaces and to experimentally observe the response in practice.

Herein, we report theoretical and experimental approaches to explore these phenomena. We have used DFT calculations to investigate the H binding energy on copper and molybdenum surfaces in the presence of different coverages of CO; the results reveal the expected weakening in H binding energy with realistic CO coverages. We carried out electrochemical experiments with a rotating disk electrode to test limiting materials on each side of the HER volcano—namely, copper and molybdenum—in the presence of both Ar and CO2. By presenting the polarization curves and product analyses, we show that the HER catalytic activity can have opposite responses to coadsorbates when sampling materials from opposite sides of the volcano, as is predicted from theoretical calculations.

Copper and molybdenum surface models were built in the Atomic Simulation Environment (ASE) and electronic structure calculations were carried out using the planewave DFT calculator dacapo (31, 32) with the exchange-correlation interactions treated by the RPBE functional (33) and the core electrons treated with ultrasoft pseudopotentials. (34) The plane wave cutoff was set at 340.15 eV and the density cutoff at 500 eV with a Fermi smearing temperature of 0.1 eV. All surfaces were constructed with 3×3×3 copper atoms with the bottom two layers fixed and the top layer relaxed. Periodic boundary conditions were applied in all directions with 20 Å of vacuum used to separate vertically stacked slabs. A k-point sampling of (4×4×1) was used, and a dipole correction was included in the vacuum in the direction orthogonal to the slab surface. The line search BFGS algorithm was used to optimize geometric configurations until the maximum force on any unconstrained atom was less than 0.05 eV/Å. To avoid unrealistic coverage patterns that may be seen on highly stepped surfaces such as (211), we have chosen to study the low-energy close-packed (111) surface in order to estimate the effect of adsorbed CO on the binding energy of hydrogen. The (111) surface was cut from an fcc copper bulk crystal with a lattice constant of 3.7 Å, reflecting the DFT-optimized lattice parameters used in previous theoretical studies. (13).

Equation 3 was used to calculate the binding energy of a hydrogen atom adsorbed on a copper surface at various coverages of CO:

Cyclic voltammetry (CV) experiments were carried out with a rotating disk electrode (RDE) (Pine Research Instrumentation) in a three-electrode cell at room temperature. The working electrode was a pure, polycrystalline bulk metal disk electrode with a rotation rate of 2000 rpm. Bulk copper (Kurt J. Lesker Company, 99.99%) and molybdenum (Kurt J. Lesker Company, 99.95%) were manufactured as a disk by the Joint Engineering/Physics Instrument Shop at Brown University to fit the rotator with the same shape and a surface area of 0.196 cm2. The reference electrode employed was Ag/AgCl in 4 M KCl (Pine Research Instrumentation) and the counter electrode was a Pt wire. The electrolyte was a potassium phosphate buffer containing 0.1 M $KH_2PO_4$ (Sigma-Aldrich, ≥98%) and 0.1 M $K_2HPO_4$ (Sigma-Aldrich, ≥98%) prepared with ultrapure deionized water from Millipore. The electrolyte was pre-electrolyzed for more than 17 h with a 3×4 cm2 graphite foil (Alfa Aesar, 99.8% metals basis) as a cathode at a current density of 0.025 mA/cm2 in an argon atmosphere. After pre-electrolysis, experiments were carried out at a fixed potential (−0.9 V vs Ag/AgCl in 4 M KCl) on a clean graphite foil working electrode to be sure that the current did not increase with time, as an indicator of the removal of impurity metal ions. All reported voltages were adjusted to the RHE scale by adding 0.202 V to convert from Ag/AgCl (4 M KCl) to SHE and 0.059 V/pH unit to convert from the working pH to RHE. The measured pH of the buffered solution was 6.8 under Ar saturation and 6.7 under $CO_2$ saturation.

To keep the metal surface smooth and the surface area fixed, the working electrode was polished carefully with (in order) P600, P4000 sandpaper; 9 μm, 6 μm, 3 μm, 1 μm diamond slurry; and 0.3 μm, 0.05 μm alumina slurry; then finally washed with deionized water before each experiment. Polarization curves were obtained via a potentiostat (Autolab) in two different atmospheres, Ar (Corp Brothers, 99.999%) and $CO_2$ (Corp Brothers, 99.999%). To presaturate the solution, gas was bubbled for 10 min with a 0.25 L/min (20° C., 101325 Pa) flow rate before applying potentials and kept bubbling during voltammetry. To remove any trace oxides on the working electrode, five CV cycles from −0.7 V to −1.4 V versus Ag/AgCl (4 M KCl) were scanned first at a scanning rate of 50 mV/s, after which the polarization curves were stable and repeatable. Following, another five CV cycles were scanned at a lower scan rate of 5 mV/s, and the average value of the last three cycles is reported.

To determine the partial current density of HER (since $CO_2$ is also reduced at these potentials), electrochemical reduction products near onset potentials in both the gas and liquid phase were analyzed for composition and Faradaic balance. Gas chromatography (Agilent 7890A) with both flame ionization and thermal conductivity detectors (FID and TCD) was used to detect gas-phase products and 1D 1H NMR (400 MHz Avance III Ultrashield) was used to analyze liquid-phase products. As gas products generated from the tiny area of an RDE electrode at low current densities are difficult to observe quantitatively with a GC, electrolysis experiments were conducted on a 4 cm2 metal sheet working electrode (Cu: Sigma-Aldrich, 99.98%, Mo: ESPI Metals, 99.98%) in a typical H-shaped electrolysis cell, in which the working electrode and the counter electrode were separated by a Nafion membrane (Nafion NRE-212, thickness 0.05 mm). The reference electrode in these experiments was also Ag/AgCl (4 M KCl) (Pine Research Instrumentation) and the counter electrode was a Pt wire. The electrolyte solution was the same as that in RDE experiments. The working electrode compartment was stirred by a magnetic stirrer at 1600 rpm during electrolysis. Gas products were injected into the GC via a loop injector in a six-way valve at 10, 15, and 20 min during electrolysis and the average $H_2$ concentration (volume percentage) is reported. Faradaic efficiency (yield on a per-electron basis) of $H_2$ was calculated via the standard definition: where the volume percentage (% volume) was determined by GC, F depicts the Faraday constant, and γ represents the number of electrons transferred per mole of gas product, which is two for $H_2$.

The final electrolyte after electrolysis was collected and prepared as an NMR sample. For NMR characterization, 700 μL of electrolyte and 35 μL of D2O with 10 mM dimethyl sulfoxide (DMSO) internal standard were mixed. (37)

When considering interactions between coadsorbed carbon monoxide and hydrogen, it is rational to investigate configurations with a higher coverage of CO than H due to the much stronger binding of CO (relative to CO(g)) than H (relative to ½ H2(g)) on copper. To assess this, we can examine the coverage behavior of ⅑ ML of H in the presence of various coverages of CO. The H binding strength is nearly constant at very low coverages, but when CO coverage reaches or exceeds ⅗ ML, the binding strength of H is weakened by 0.12 eV compared to that on a clean copper surface. This weakening effect can be expected to affect the HER catalytic activity of copper, and is of the same order of magnitude as is predicted by the computational hydrogen electrode model (10, 40) to shift the voltage by the amount (−0.1 V) experimentally observed by Hori (12) and replicated in our measurements reported below.

Relative to an ideal HER catalyst such as platinum, numerous analyses have shown that copper binds hydrogen too weakly for optimum performance; as discussed in the introduction, it sits on the right-hand side of the well-known HER volcano, (8, 10, 41) and we can expect two competing effects on HER catalysis: (1) a weakening of the bonding of hydrogen to the surface, which could act to either promote or poison the HER, and (2) physical site blocking, decreasing the available surface area for the reaction. In the case of Cu, we would expect both effects to be deleterious to HER. Indeed, previous studies from the research group of Hori have shown this poisoning effect, in which the onset potential in $CO_2$ or CO is more negative than that in an inert argon atmosphere. (12) As transition metals share similar electronic configurations, we would assume that the weakening effect on H chemisorption strength can apply to other transition metals besides copper. In that case, CO on transition metals on the right-hand side of volcano plot will inhibit HER, like copper; while CO on transition metals on the left-hand side of the volcano—like molybdenum, which sits far to the left—should promote the kinetics of hydrogen evolution via weakening the binding between the H atom and the metal surface. But for metals on the left-hand side, the promotion effect from CO will be counteracted by the site-blocking effect, and the overall effect will be a competing result.

As CO adsorbs more strongly on Mo than on Cu, (42) we expect that the equilibrium coverage of CO on Mo would not be less than that on Cu. In order to confirm this, we again used the constrained minima hopping method (35) to calculate the incremental binding energy of CO, as well as the binding energy of H in the presence of CO coadsorbates. The result suggests that CO coverage on Mo should be at least ⅚ ML, at which point we calculate the H binding energy to be 0.18 eV weaker than on the clean Mo surface. The weakening effect on H binding caused by CO coverage was preserved on the Mo surface. Details of the calculations on Mo can be found in the Supporting Information.

In order to test for opposite effects of CO spectator species on HER, cyclic voltammetry experiments were carried out in both Ar and $CO_2$ atmospheres on a material from each side of the volcano plot: copper (weak binding) and molybdenum (strong binding). (41) Copper was chosen due to its relevance in CO2 reduction and existing literature data, whereas molybdenum was chosen because of its presence on the far-left of the volcano plot, in order to increase the likelihood of observing the binding energy (promoting) effect over the competing site-blocking (poisoning) effect. In an argon environment, we can expect only hydrogen evolution to take place in the electrochemical cell. In a CO2 environment, the reduction of protons and CO2 should occur simultaneously at negative voltages, leading to a surface covered in CO, as discussed earlier. We chose a potential negative enough to create a high coverage of CO on the working electrode surface; our CV potential ramp was set between −0.7 V and −1.4 V versus Ag/AgCl (4 M KCl). (14, 43) Given this potential range and a pH at 6.7 (in CO2) or 6.8 (in Ar), both copper and molybdenum are stable in their metal phase according to Pourbaix diagrams (Supporting Information). In order to compare the potentials under CO-poisoned surfaces (rather than examining the competing kinetics of CO formation on the surface), we show the positive-going sweep curves, comprising the scan from a more negative potential to a more positive potential, to decisively make the comparison between two gas environments.

For copper, we can clearly see a delay in the rise of the current density in CO2 relative to that in Ar; the presence of adsorbed CO apparently suppresses the total current. This result is consistent with Hori's previous work and our above hypothesis that a high coverage of CO on copper should inhibit the HER activity. For molybdenum, the onset potential of HER is around −0.3 V versus RHE and the current density in CO2 is clearly larger than that in Ar at potentials around the onset potential. When the voltage is more negative, both the current in Ar and in CO2 increase rapidly, but the current in CO2 stays larger. The promotion effect occurs in the CO2 environment, implying a coverage of CO enhances the HER. As the promotion effect is accompanied by the site-blocking effect by CO, the current density gap on Mo is much smaller than that on Cu.

To verify the composition of products in the range around the onset potentials, gas products were analyzed by gas chromatography (GC) to determine the Faradaic efficiency for hydrogen. Because both the current density at onset potentials and the RDE working electrode surface area (0.196 cm2) are small, it is difficult to reproducibly close a Faradaic balance at these conditions. To provide a more quantitative measure of the product yields, electrolysis was conducted in a two-chamber electrochemical cell with a metal sheet as a working electrode with a much larger surface area of 4 cm2. Potentiostatic experiments were conducted with copper foil electrodes at −0.4 V versus RHE in both Ar and CO2, whereas potentiostatic Mo experiments were conducted at −0.3 V versus RHE, both chosen to approximate their onset potentials. Before each electrolysis measurement, five cycles of polarization from −0.7 V to −1.4 V versus Ag/AgCl (4 M KCl) were first scanned at a scanning rate of 50 mV/s to provide a coverage of CO during electrolysis in experiments containing CO2. The H2 Faradaic efficiency was calculated using the H2 concentration determined by GC in each test.

Within the detection limit of the GC, the previously reported gas products for CO2 reduction on Cu surfaces at more negative potentials were not observed at −0.3 V versus RHE, such as CH4, C2H4, and CO. (14, 37) (Note that this is consistent with reports showing at low current densities, Cu produces mainly H2, not CO2 reduction products.) For Mo, only H2 was found in both Ar and CO2 atmospheres during the reduction reaction, which is consistent with previous researchers' reports. (44, 45) The liquid-phase electrolyte collected after 1 h of electrolysis was analyzed by 1D 1H NMR. No carbon-containing chemical peaks were found for either Cu or Mo. Therefore, it can be concluded that at the onset potentials for Cu and Mo, predominantly hydrogen is generated and contributes the vast majority of the current even in CO2 atmosphere, suggesting the validity of interpreting the shifts in polarization curves as shifts in the effectiveness of the catalyst for hydrogen evolution.

In the discussion above, we have presented data that confirms findings from the literature showing the HER current on Cu is markedly reduced in a CO2 atmosphere as compared to Ar; this correlates with electronic structure calculations that confirm the magnitude and direction of this shift. Conversely, we show that Mo—which sits on the left-hand, or strong binding, side of the HER volcano—shows just the opposite response, which can be explained by the weakening of the surface—hydrogen bond, pushing the catalyst into a more favorable position with respect to the peak of the HER volcano. Even at more negative voltages than the onset potential, the above trend remains intact in spite of other factors such as mass transport limitations, the beginning of CO2 reduction, and the site-blocking effect of CO. Thus, the experimental results support the theoretical suggestion that a high coverage of CO will weaken the binding of H on transition metal surfaces and this effect (in combination with other effects) can either decrease or increase the hydrogen evolution current density, depending on the metal's position in the volcano plot.

The presence of coadsorbates can have nontrivial effects on the efficacy of a catalyst for the hydrogen evolution reaction, as calculated in binding energy changes and experimentally suggested by changes in the performance of Cu and Mo in electrochemical CO2 reduction. Our DFT calculations show that the binding energy of H weakens with increasing coverages of CO on both the Cu fcc(111) and Mo bcc(110) surface. Specifically, it was calculated that the binding strength of a hydrogen atom will be weakened by about 0.12 eV when the CO coverage is ⅜ ML on Cu, which is a minimal CO coverage we might expect for CO2 reduction at room temperature and atmospheric pressure. On Mo surfaces, we expect a higher coverage of CO and an even greater weakening of the hydrogen binding energy. This weakening effect on H atom binding strength is expected to inhibit HER activity on metals on the right-hand side of the volcano plot (e.g., copper) and promote HER on metals on the left-hand side (e.g., molybdenum). This is combined with other effects, such as site blocking, that will change the kinetics of hydrogen evolution; experimentally, it is difficult to distinguish between the weakening effect on hydrogen binding strength discussed above and other effects. The site-blocking effect can be expected to enhance the poisoning effect on copper and undermine the promotion effect on molybdenum. Despite this, our CV experiments and product analyses have clearly shown that CO2 reduction conditions suppress HER on copper and improve HER on molybdenum.

The poisoning effect on HER from coadsorbed CO can give us some insights into the unique performance of copper in CO2 reduction. In aqueous electrolytes, the reduction of CO2 and the reduction of protons (to H2) are competing reactions. A high coverage of CO intermediates not only increases the rate of CO2 reduction but also reduces the catalyst's ability in hydrogen evolution. This is a critical reason why copper is so selective in CO2 reduction at negative potentials: it is reactive enough to bind CO but still noble enough to sit on the right-hand side of the HER volcano. This suggests a design principle: that future searches for optimum CO2 reduction catalysts may benefit from not only focusing on catalysts that are poor for HER, but that preferentially sit on the right-hand side of the HER volcano plot.

This also suggests the intriguing possibility that in the search for nonprecious hydrogen evolution and hydrogen oxidation catalysts, one may want to deliberately poison the catalyst rather than scrupulously avoid it.

Coverage can also effect selectivity. Oxygen-induced changes to selectivity-determining steps in electrocatalytic CO2 reduction. The state of the electrocatalyst surface—including the oxidation state of the catalyst and the presence of spectator species—is investigated on Cu surfaces with density functional theory in order to understand predicted ramifications on the selectivity and efficiency of CO2 reduction. We examined the presence of oxygen-based species, including the fully oxidized Cu2O surface, the partially oxidized Cu(110)–(2×1)O surface, and the presence of OH spectators. The relative oxygen binding strength among these surfaces can help to explain the experimentally observed selectivity change between CH4 and CH3OH on these electrodes; this suggests that the oxygen-binding strength may be a key parameter which predicts the thermodynamically preferred selectivity for pathways proceeding through a methoxy (CH3O) intermediate. This study shows the importance of the local surface environment in the product selectivity of electrocatalysis, and suggests a simple descriptor that can aid in the design of improved electrocatalytic materials.

The externalities associated with carbon dioxide accumulation in the atmosphere, the supply fluctuations of fossil fuels and biofuels, and the anticipated storage demands associated with intermittent electricity sources has sparked a flurry of interest into the conversion of carbon dioxide into fuels and chemicals.1-20 Electrochemically reducing CO2 is a promising method to turn this abundant yet undesirable greenhouse gas into useful fuels and chemicals, such as hydrocarbons and alcohols.

Control of product selectivity to liquid fuel products is especially attractive due to the heavy use of liquid fuels in our transportation infrastructure, but our current understanding on the product selectivity mechanism is limited. Recent theoretical studies have focused more on the fundamental reasons of the overpotential requirement, which dictates the energetic efficiency of the process. 21-24 To improve product selectivity is arguably as important and challenging as to lower the overpotential; particularly the selectivity among gas-phase fuels (such as methane and ethane), liquid fuels (such as methanol and ethanol), and chemical precursors (such as ethylene). Some transition metal catalysts show high selectivity towards carbon monoxide or formic acid, 2,25,26 but no catalyst has shown an excellent selectivity to liquid fuel products. On pure metallic copper, the most widely studied heterogeneous electrocatalyst for CO2 reduction, gaseous methane can be the dominant product (Faradaic efficiency, or FE, of ~40%) with very little liquid fuels, such as methanol. 14,27-29 When changing the operation potentials or the surface roughness and structure of copper electrocatalysts, larger quantities of ethylene29,30 or formic acid can be generated. 18,31

However, the production of methanol, a liquid product, seems to be preferred in the presence of oxygen on the copper surface. Frese 32 first reported that when the starting copper electrocatalyst material is intentionally oxidized, methanol will be observed while the catalyst surface remains in its oxidized state. Flake and colleagues also reported a preference in CH3OH generation (FE 38%) on electrodeposited cuprous oxide films. 11,33 As noted in these papers, 32,33 even though one would not expect long-term stability from these oxide layers on the copper surface under reducing conditions, the oxide layer is speculated to last long enough that the selectivity changes can be attributed to its presence. The existence of oxygen-containing spectator species, such as OH, may also play a similar role as the oxidized surface above. An interesting study by Schouten et al. 12 examined the reduction of formaldehyde (CH2O) and reported that methanol was more preferred than methane when scanning to a more negative potential. Although adsorbed CH2O has been suggested to be an intermediate in the pathway of CO2 conversion to CH4,21 the potential-limiting step is presumably different when the pathway starts from CH2O. For CO2 reduction on transition metals, it is considered that the hydrogenation of adsorbed CO, rather than the activation of CO2 itself, dictates the overpotential requirement. 23 This difficulty in CO hydrogenation should make it the most abundant spectator during CO2 reduction. If CH2O reduction follows the same pathway as suggested for CO2, the following steps comprise the lowest free-energy change mechanism to methane. 21

* represents a catalyst site or an adsorbed species. However, unlike in CO2 reduction, the potential-limiting step cannot be the hydrogenation of adsorbed CO, since CO is not present. Instead, the thermodynamic analysis from earlier papers would suggest that the potential-limiting step is the removal of adsorbed hydroxyl species (OH*). 21 This analysis would suggest the reduction of CH2O to take place at more positive potentials than that of CO2, consistent with the measurements of Schouten. 12 With OH removal as the thermodynamically most difficult step, we can expect that OH species are the dominant spectators on this surface. Because of this, we will also examine whether spectators such as CO and OH are capable of changing the predicted selectivity between CH4 and CH3OH.

In other areas of catalysis, changes in the selectivity of catalytic reactions have been reported to arise from modifications in the state of the catalyst surface, including surface structure, surface state (e.g., oxidized, reduced, carburized), and the presence of spectator species (often referred to as poisons and promoters). Examples can be found widely, such as the activation of iron oxide catalysts due to carbon deposition in Fischer-Tropsch synthesis of hydrocarbons, 34-36 supercritical-water methanation catalysis that activates when RuO2 is converted to Ru, 37,38 hydrogen evolution activity being poisoned or promoted due to a high coverage of CO spectators, 39 changes in the crystalline structure of copper electrodes in CO2 reduction, 40 and many well-known examples of sulfur or carbon monoxide poisoning in methanol oxidation and oxygen reduction materials. 41-49

In the current work, we used density functional theory (DFT) calculations to study how such a local surface environment modification can affect selectivity in electrochemical CO2 reduction. From a perspective of elementary energetics, we investigated the presence of several likely surface states of copper, including a clean metallic surface, surfaces under various states of oxidation, and surfaces covered with increasing quantities of OH or CO spectators. An analysis of the free energy diagram suggests that the selectivity preference switches to methanol in the cases when copper surface is fully or partially oxidized and when the surface is covered by OH with a high coverage. From this, we suggest a simple activity descriptor as a useful indicator of the selectivity between methane and methanol.

The Atomic Simulation Environment (ASE) was used to build surface models and DACAPO was employed to conduct DFT calculations 50,51 with the exchange-correlation interactions treated by the RPBE functional 52 and the core electrons treated with Vanderbilt ultrasoft pseudopotentials. 53 The planewave cutoff was set at 340.15 eV and the density cutoff at 500 eV. Fermi smearing of 0.1 eV and a k-point sampling of (4×4×1) were applied in all surface calculations. A dipole correction was included in the vacuum in the direction orthogonal to the slab surface. The line-search BFGS algorithm was used to relax geometric configurations until the maximum force on any unconstrained atom was less than 0.05 eV per atom. All surfaces were built with 20 Å vacuum between layers and periodic boundary conditions in all directions.

For oxidized copper surfaces, Cu2O(111) and Cu(110)–(2×1)O were examined. Cuprous oxide (Cu2O), has a space-group of Pn[3 with combining macron]m with the oxygen and copper atoms forming bcc and fcc sublattices, respectively.54,55 Experimentally measured lattice constants for cuprous oxide are in the range of 4.268-4.270 Å.56-58 Our optimized lattice constant is 4.413 Å with k-point sampling of (4×4×4), typical of lattice-constant discrepancies calculated in DFT. A copper terminated surface of Cu2O(111) was employed. In optimization the top (Cu) layer was relaxed with the subsurface atoms fixed. Cu(110)–(2×1)O was built based on Cu(110) surface by adding a surface oxide layer. Calculations on Cu(110)–(2×1)O were carried out with the bottom three layers fixed and the topmost layer relaxed.

For pure copper surfaces covered with spectator species, Cu(111) covered by OH and CO were investigated and compared. Copper surfaces were cut from an fcc copper bulk crystal with a lattice constant of 3.71 Å, corresponding to the DFT-optimum bulk lattice constant for these electronic-structure parameters. 21 A 3×3×3 (atoms) periodic cell was employed in our calculations, with the bottom two layers fixed and the top layer relaxed. Herein we focus on the Cu(111) surface for simplicity in deducing trends, as compared to more highly ordered surfaces such as (211) which may result in coverage patterns unique to the highly stepped periodic system.

With the electronic potential energies (Eelec) obtained from the above DFT calculations, free energies (G) at 25° C. were calculated by adding the contributions of zero-point energy (EZPE), heat capacity (Cp) and entropy, which were all calculated in the harmonic approximation with vibrational energies derived from a normal-mode analysis, as in:

$$G = Eelec + EZPE + \int CpdT - TS \quad (2)$$

where G is our consistently-referenced free energy of a species and T is the temperature.

The normal modes were calculated by a finite-difference approximation of the Hessian matrix with a displacement of 0.01 Å in three dimensions. The vibrational frequencies of each molecule and adsorbate are listed in our ESI.† Non-surface-bound species, such as CH4 and CH3OH, were treated as independent ideal-gas molecules in a 15×15×15 vacuum box at 101[thin space (⅙-em)]325 Pa. For adsorbates on a surface, the normal modes of an adsorbate were obtained from previous theoretical studies, and taken to be independent of the surface types and any surrounding spectators. 21,22 Changes in the vibrational contributions to the free energy of lattice and spectator species caused by the presence of our adsorbates were ignored.

The computational hydrogen electrode (CHE) model was applied when calculating the free energy change between two electrochemical steps involving a proton and an electron transfer. This method was proposed by Norskov et al. 59 and its application to CO2 reduction has been described in detail in previous work.

The task of finding the lowest-energy configuration in high-coverage scenarios is complicated by the combinatorics: there can be hundreds or even thousands of possible configurations. 60 We used a two-part strategy to search for these configurations. First, to evaluate the OH and CO coverage effects on the binding energy of O and CH3O, a "brute-force" optimization method was used to search for the lowest energy spectator configurations with O and CH3O at their preferred binding sites, similar to our approach in a previous work. 39 First, O (or CH3O) was allowed to bind to the (111) surface at all conceivable sites, and the structures were optimized. It was found that a three-fold fcc site is preferred by both adsorbates, consistent with previous studies. 22,61 Then, with the O (or CH3O) at its preferred site, a multitude of surfaces were set up with one O (or CH3O) and xOH (or CO) molecules at various sites on the (111) surface, for x=1, 2, 3, 4. These surfaces with O (or CH3O) and OH (or CO) groups were relaxed and their potential energies were obtained. For each set of x spectators with a particular adsorbate, the lowest energy configuration was selected, and its potential energy is denoted, for example, as E[O+xOH+*]. By removing O (or CH3O) from the lowest energy surface, we optimized the structure again and denote its potential energy without O (or CH3O) as, for example, E[xOH+*]. From these data, the binding energies of O (or CH3O) on surfaces with different spectator species present were defined as, for example $$EB[O;xOH] = E[O+xOH+*] - (E[xOH+*] + Eref[O]) \quad (3)$$

where CH3O can replace O and CO can replace OH. The arbitrary reference energies were taken as $$Eref[O] = E[H2O] - E[H2]$$

$$Eref[CH3O] = E[CH3OH] - \tfrac{1}{2}E[H2]$$

Coverages are reported in fraction of a monolayer (ML); a monolayer is defined as one adsorbate molecule per surface catalyst atom—that is, a ⅔ ML coverage of OH corresponds to 2 hydroxyl groups on a periodic 3×3 copper surface.

Simultaneously, a constrained minima-hopping algorithm60 was applied in order to search for the global lowest energy of each configuration. The results are used to compare with those found by brute-force optimization. Both approaches revealed the identical conformer as the global optimum. By the two-part method, there is a reasonable degree of certainty that the configurations and energies reported correspond to global optima within these constraints.

In order to assess effects from oxidized copper surfaces, we examined both a bulk oxide and a surface oxide of copper. For the fully oxidized bulk structure, we examined cuprous oxide (Cu2O), which is one of the principle oxides of copper and has been reported to reduce CO2 to CH3OH. 11,33,62 For the partially oxidized copper surface, we studied Cu(110)–(2×1)O. This structure was shown to be formed with oxygen molecules dissociatively adsorbed on a copper surface at room temperature. 63 Although it is not known if the continued production of oxygen adsorbates on a copper surface could lead to such a structure in the electrochemical environment, this system nevertheless provides a reasonable model system in the spectrum of copper surfaces with different levels of oxidation.

On the Cu2O(111) surface both CH3O and O favor the fcc three-fold site. On Cu(110)–(2×1)O, both CH3O and O tend to bind between top copper atom rows: CH3O stays near the bridge site and O locates in the center of the four-fold site. The electronic potential energy calculations provide the basis for the elementary thermodynamic free energy diagrams in the CHE model. The results are also compared with the free energy diagram of a non-oxidized Cu(111) surface. On the pure Cu(111) surface, the hydrogenation of adsorbed CH3O thermodynamically favors the generation of methane, which is 0.2 eV lower than the free-energy change for methanol generation. This is consistent with previous theoretical studies22 and experimental observations of CH4 formation on Cu(111) surfaces. 64 However, the thermodynamics are reversed on oxidized copper surfaces. On both Cu2O(111) and Cu(110)–(2×1)O, the free energy of (CH3OH+*) is 0.6-0.7 eV lower than that of (CH4+O*), suggesting that methanol is thermodynamically preferred by this pathway on oxidized copper electrocatalysts. These changes are directly related to the weakening of the surface-oxygen bond. This is consistent with the before-mentioned experimental observations of direct CO2 to CH3OH electrochemical reduction in aqueous solutions, which has been reported on intentionally oxidized copper surfaces.

To study the effect of co-adsorbed OH on the thermodynamically predicted pathways, we examined surfaces covered with increasing coverages of OH or CO spectators. We chose a surface covered in OH in order to understand the conditions that may result from a partially oxidized surface or in which OH removal is the limiting step, as it may be in formaldehyde reduction. We compare the energetics to those of a bare copper surface; however, a fairer comparison may be to CO-covered surfaces, as we would expect a high CO coverage if CO hydrogenation is the most difficult step. Thus, we also include CO-covered surfaces in our analysis.

We first describe the geometric configurations of OH on Cu, which shows that OH tends to self-stabilize moderate coverages by setting up a hydrogen-bonding network. CH3O binds to copper through its oxygen atom and the methyl group points away from the surface. Like the oxygen atom and the methoxy group, the OH spectators also tend to favor three-fold sites at most coverage levels. When OH is at ⅑ ML coverage, the O—H bond tends to be vertical to the surface. As the coverage of OH increases, a hydrogen bonding network starts to be established and the orientation of the O—H bond in OH starts to parallel the surface. Note that on surfaces with O adsorbed, some O—H bonds stay vertically oriented even when the OH coverage is ⅖ or ⅗ ML; while this does not occur on the surfaces with CH3O. This may be caused by the larger size of CH3O relative to O and a repulsion between hydrogen atoms in OH and CH3O.

The behavior of carbon monoxide (CO) spectators is different from hydroxyl, primarily because CO adsorbates tend to repel one another, 65-68 as opposed to the attraction in hydrogen binding networks. CO binds to copper through a carbon atom, and tends to favor both ontop sites and three-fold sites. Adsorbate-adsorbate hydrogen bonding does not exist in this case and the interaction between carbon in CO and oxygen in CH3O or O is much weaker than that between hydrogen and oxygen. Thus, CO prefers to be oriented away from the copper surface even when its coverage is high. This weak interaction makes CO spectators tend to distribute rather uniformly on a surface. It is also noted that the distance between CO and O is smaller than that between CO and CH3O, which can also be attributed to the size difference between CH3O and O.

For surfaces with spectators of OH, these calculations suggest that a high coverage of OH weakens the binding of both CH3O and O. As the coverage of OH increases from zero to ⅖ ML, the binding energy becomes slightly stronger, by less than 0.1 eV. At ⅗ ML coverage, OH spectators can build a strong hydrogen bonding network even if CH3O or O is not on surface. A line of OH is formed within these geometric constraints. The addition of a CH3O or O will not only destroy the tight network, but increase the repulsion between molecules as well, causing the binding energy to increase sharply at ⅘ ML of OH. In practice, we would expect the presence of liquid water to make this effect more pronounced.

Similarly, a higher coverage of CO will lead to a weaker binding energy of methoxy CH3O. This trend is consistent with previous studies on the CHO binding strength change with CO coverage on a Pt surface. 69 At low coverages of ⅑ ML and ⅖ ML CO, the interactions are weak and the binding energy changes of both CH3O and O are within typical accuracies of DFT. When CO accumulates on the surface, the binding energy of CH3O increases rapidly due to a forced change in CO binding sites. For example, at ⅘ ML, with CH3O on the surface CO molecules occupy two ontop sites and two threefold sites. However, after removing CH3O and re-optimizing the structure, one of the ontop CO adsorbates drifts to a nearby bridge site, effectively trying to adopt a uniform spacing on the surface. These steric effects on CO account for most of the incremental binding energy; this can be observed as the geometric effects in the binding energy. As a smaller adsorbate, an oxygen atom apparently has a much smaller steric effect on the CO distribution. The methoxy group has a larger CO-free zone surrounding it than does the oxygen. Although there are some ups and downs in the O binding energy when changing the CO coverage, they occur in a limited range (±0.1 eV), suggesting that CO doesn't have a significant effect on O binding energy at these coverages. This is in contrast to the results at high OH coverages.

To understand the effects on the binding energy in the context of the elementary reduction of *OCH3 to (CH3OH+*) or (CH4+O*). In agreement with earlier studies,22 on a clean Cu(111) surface the liberation of CH4 is more favorable than the liberation of CH3OH, suggesting a thermodynamic selectivity towards CH4. The blue and green lines indicate the revised potential energies by including the effect of OH and CO spectators on the Cu(111) surface. When CO2/CO is reduced, the main spectator on the surface is CO. The energy changes associated with CO coverage still point towards a weak-to-neutral selectivity preference of CH4 over CH3OH, suggesting that the high CO coverages that would be expected to be present in CO2/CO reduction do not qualitatively change the selectivity of a clean surface. On the other hand, as the coverage of OH spectators increases, the energy of (CH4+O*) becomes up to ~0.5 eV higher than that of (CH3OH+*). Therefore, as the OH coverage increases, CH3OH becomes thermodynamically more favorable at this step. This indicates that OH coverage is thermodynamically more than strong enough to flip the selectivity, while CO coverage is not.

The above changes due to the surface coverage conditions may give us some insights on the time-based changes observed in Schouten and Koper's work. While the equilibrated existence of methanediol (in addition to formaldehyde) in aqueous solutions may explain much of the methanol production under these conditions, 70 it is possible that oxygen-induced changes to the catalyst surface are responsible for the selectivity change observed from methane to methanol over the course of Schouten's reductive sweep. In the OLEMS (online electrochemical mass spectroscopy) spectra of formaldehyde reduction reported in their work the m/z=15 curve (fragments from CH4) separates from the m/z=29, 30, 31 curves (fragments from CH3OH) in the sweep region from −0.3 to −0.55 V vs. RHE. The experiment is carried out by changing the potential of the electrode from 0.0 to −1.0 V and back at 1 mV s−1. Although the OLEMS data do not quantify the amounts of CH4 and CH3OH produced in these experiments, they suggest a change in selectivity from CH4+CH3OH (early times) to predominantly CH3OH (later times). On the reverse sweep, the change in selectivity is not observed, suggesting that the selectivity changes correlate with time more strongly than potential. The simplest explanation for a time-based change from methane to methanol could be a change in the catalyst condition. Initially, the bare surface would have selectivity predominantly to methane. As hydroxyl groups gradually build up and form a network during formaldehyde reduction, the free energy of (CH4+O*) increases and finally exceeds that of (CH3OH+*). Thus the main product changes to CH3OH. Once the surface is sufficiently coated in OH spectators, it only takes a small amount of the methane-forming reaction occurring in parallel with the methanol-forming reaction in order to keep the surface coated in these species, and keep the selectivity predominantly towards methanol.

Although a full coverage-dependent kinetic Monte Carlo model in the presence of explicit water molecules might be necessary to make quantitative predictions on the potential-dependent reactive coverage of OH and CO species in the different reactive systems (CO2 reduction and CH2O reduction), we can use the trends in binding energies to make some qualitative conclusions regarding coverages of OH and CO under reactive conditions. At CO2/CO experimental reaction conditions (−0.8 to −1.0 V vs. RHE to generate CH4 primarily), the reactive conversion of CO to CHO is the most difficult step from an elementary thermodynamics standpoint and is just exergonic; similarly, at the CH2O reduction conditions (−0.4 to −0.7 V vs. RHE to generate CH3OH and/or CH4) the removal of OH is the most difficult step and is also just exergonic, by roughly the same value. Therefore, the inference of a reasonable OH coverage under CH2O-reducing conditions is equivalent, on the basis of these calculations, to the inference of a reasonable CO coverage under CO2/CO-reducing conditions. We can use the relative binding energies of these species as a function of coverage to give us an indication of the relative reactive coverages expected. We know that CO adsorbates tend to repel each other, 65-68 suggesting that a lower equilibrium coverage may be favorable, whereas OH adsorbates tend to stabilize each other through a hydrogen-bonding network 71-73 suggesting that under these comparable overpotential conditions, we should expect the coverage of OH under formaldehyde-reducing conditions to be at least as high as the coverage of CO under CO2 reducing conditions, if not higher. Water will also participate in the hydrogen-bonding network, further stabilizing hydroxyl species on the surface.

By examining the information above, it is apparent that the thermodynamically favored product of methoxy reduction is only related to the binding energy of oxygen on the surface. We therefore suggest that the oxygen binding energy of the active catalyst surface can be used as a first-order descriptor of the selectivity towards methane or methanol, at least among pathways that proceed through a methoxy intermediate. Pure copper facets sit below the cutoff binding energy of ~1.17 eV (dashed line) and prefer methane in CO2 or CO reduction; while oxidized and hydroxyl covered copper surfaces are above the cutoff line and prefer methanol as a reducing product. This is consistent with the experimentally observed trends. Interestingly, Kuhl and co-workers 76 performed CO2 reduction with high product detection sensitivity on a range of electrocatalytic materials and observed products more reduced than CO on a number of materials. Two of these materials showed a strong selectivity preference towards either methane or methanol (Fe and Au); we have added these data points to FIG. 8 as well, and they are consistent with the descriptor. We note that many other factors, such as pathway changes and elementary barriers, will also influence the selectivity; nonetheless, the simple descriptor of oxygen binding energy here adequately describes the experimentally-observed selectivities among the electrocatalysts examined. This descriptor was developed based on the assumption of a methoxy intermediate. However, this trend is likely to hold for other pathways, as a more reactive surface will be more likely to break the C—O bond prior to completely hydrogenating and liberating the gaseous species, similar to the principle discussed for the methoxy pathway.

The results of these calculations suggest that the thermodynamically predicted pathways in CO2 reduction can be affected by the local surface environment of the electrocatalyst, particularly by the state of oxidation of copper surfaces. Specifically, the intermediate CH3O* can lead to CH4 or CH3OH depending on whether the surface is a clean copper surface or one in which a surface or bulk oxide is present, or on whether OH or CO is the predominant spectator. A moderate amount of oxygen, manifested as oxide formations or hydroxyl spectator groups, has this effect by significantly increasing the electronic energy of (CH4+O*), leaving CH3OH as the thermodynamically preferred product under these conditions. This work, along with that by others, 12,69 highlights that the local surface environment of a catalyst surface can have a profound impact on the selectivity of elementary reaction steps. This suggests the importance of studying spectator coverage effects on the other crucial steps in CO2 reduction, such as the initial activation of CO2 or the hydrogenation of adsorbed CO, and suggests that such surface effects may cause deviations from the scaling effects that are thought to limit the efficiency of CO2 reduction. In further studies, calculations can be expanded to other possible spectators, such as carbon, which may also affect both Faradaic efficiency and the product selectivity in CO2 reduction. 77 Finally, an activity descriptor—the binding energy of oxygen to the catalyst surface—has been introduced which is expected to be useful in designing catalysts that selectively produce methanol versus methane from adsorbed methoxy in electrochemical reductions.

The term "overpotential" as used here refers to the voltage potential difference between a reactions thermodynamically determined reduction or oxidation potential and the experimentally observed potential. The term "nanostructure" as used here means at least one dimension of the structure is less than 1000 nm.

Now referring to FIGS. 53-68, carbides sit on the left hand side of the HER volcano, This suggests that hydrogen evolution can be enhanced by the large numbers of spectators present on the carbide surface. This may partially explain the higher H2 evolution (despite low overpotentials for CH4) and the steep Tafel slopes.

Examining free-energy diagrams of carbide catalysts, CO→CHO no longer limits the conversion of $CO_2$ to hydrocarbons, OH removal does. Stable $CO_2$ adsorption. Easy C—O scission at the initial state of the reaction. Reaction proceeds with O* or OH* spectator. OH removal is the most endergonic step. (solvation by water is thought to stabilize this species by −0.5 eV!). Spectator effects included only in low-coverage limit. Actual OH clearing energy will be less severe at higher reactive coverages.

For these reasons, we may want to reduce the prominence of water in the system, and are looking at non-aqueous electrolytes. Lowering water availability can reduce proton availability and reduce the stability of OH on the surface. Preliminary experiments on $Mo_2C$ and Cu in organic solvents with low water concentrations showed the hydrocarbon Faradaic yield increased 20× on $Mo_2C$ and hydrocarbon Faradaic yield decreased 17× on Cu. In both systems, CO production spiked. Note that $CO_2 \rightarrow CO$ in net requires no H2O consumption.

In summary, carbides exhibit desirable deviations from transition-metal behavior as a catalyst for $CO_2$ conversion to hydrocarbons. Based upon informant and belief, carbides produce $CH_4$ at potentials 200-300 mV lower than Cu. Fundamental insights into the competition with H2 evolution, and are working at ways to suppress this while maintaining CO2 reduction efficiency.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims. It would be appreciated by those skilled in the art that various changes and modifications can be made to the illustrated embodiments without departing from the spirit of the invention. All such modifications and changes are intended to be covered by the appended claims.

What is claimed is:

1. A method for producing hydrocarbons, comprising:
   forming metal carbide catalysts, the metal carbide catalysts including molybdenum carbide ($Mo_2C$), titanium carbide (TiC), tungsten carbide (WC), iron carbide ($Fe_3C$), and tantalum carbide (TiC);
   forming nanostructures of the metal carbide catalysts, the nanostructures of the metal carbide catalysts having at least one dimension that is less than 1000 nanometers;
   forming a carbon substrate to support the nanostructures of the metal carbide catalysts; and
   exposing the nanostructures of the metal carbide catalysts with sources of carbon dioxide or carbon monoxide.

2. The method of claim 1, further comprising forming the carbon substrate with graphene or graphene oxide.

3. The method of claim 2, wherein dimolybdenum carbide nanostructures are supported by the graphene or graphene oxide substrate.

4. A method for producing hydrocarbons comprising:
   forming metal carbide catalysts with one or more elements selected from the group consisting of molybdenum, titanium, tungsten, iron, and tantalum;
   forming nanostructures of the metal carbide catalysts, the nanostructures having at least one dimension that is less than 1000 nanometers;
   forming a carbon substrate to support the nanostructures; and
   exposing the metal carbide catalysts with carbon dioxide or carbon monoxide.

5. The method of claim 4 wherein the carbon substrate is formed with graphene or graphene oxide.

* * * * *